(12) United States Patent
Ishikawa et al.

(10) Patent No.: US 6,549,650 B1
(45) Date of Patent: *Apr. 15, 2003

(54) PROCESSING OF IMAGE OBTAINED BY MULTI-EYE CAMERA

(75) Inventors: Motohiro Ishikawa, Yokohama (JP); Katsumi Iijima, Hachioji (JP); Kotaro Yano, Yokohama (JP); Sunao Kurahashi, Kawasaki (JP); Katsuhiko Mori, Kawasaki (JP); Takeo Sakimura, Urayasu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/926,817

(22) Filed: Sep. 10, 1997

(30) Foreign Application Priority Data

Sep. 11, 1996 (JP) .............................................. 8-261207
Nov. 15, 1996 (JP) .............................................. 8-304666
Nov. 22, 1996 (JP) .............................................. 8-327821

(51) Int. Cl.$^7$ ................................................ G06K 9/00
(52) U.S. Cl. ........................ 382/154; 382/291; 345/419
(58) Field of Search ................................ 382/154, 291; 348/42, 43, 46, 47, 49, 50, 51, 52, 53, 54, 55, 56, 57, 58, 59, 60, 705, 706; 345/419, 139, 435, 113, 114, 115, 116; 356/12, 13

(56) References Cited

U.S. PATENT DOCUMENTS

| 4,539,701 A | * | 9/1985 | Galbreath et al. .......... 382/154 |
| 4,982,438 A | * | 1/1991 | Usami et al. ................ 382/154 |
| 5,084,763 A | * | 1/1992 | Naradate et al. .............. 348/51 |
| 5,617,334 A | * | 4/1997 | Tseng et al. ................. 708/203 |
| 5,675,377 A | * | 10/1997 | Gibas .......................... 348/47 |
| 5,703,961 A | * | 12/1997 | Rogina et al. .............. 382/154 |
| 5,734,743 A | * | 3/1998 | Matsugu et al. ............ 382/154 |
| 5,745,156 A | * | 4/1998 | Jain et al. ................... 382/154 |
| 5,793,375 A | * | 8/1998 | Tanaka ....................... 345/426 |
| 5,825,915 A | * | 10/1998 | Michimoto et al. ......... 382/154 |
| 5,903,303 A | | 5/1999 | Fukushima et al. |

FOREIGN PATENT DOCUMENTS

| EP | 0 642 275 A2 | 3/1995 |
| JP | 07007747 | 1/1995 |
| JP | 07110505 | 4/1995 |

OTHER PUBLICATIONS

European Search Report, mailed Dec. 10, 1997.

* cited by examiner

Primary Examiner—Samir Ahmed
Assistant Examiner—Vikkram Bali
(74) Attorney, Agent, or Firm—Morgan & Finnegan, LLP

(57) ABSTRACT

There is disclosed a binocular camera which can realize panoramic view and stereoscopic view during image sensing. There is also disclosed a binocular camera which has two image sensing optical systems, a circuit for synthesizing right and left sensed parallax image signals to a panoramic image or a three-dimensional image, and a display for displaying the synthesized image signal.

29 Claims, 50 Drawing Sheets

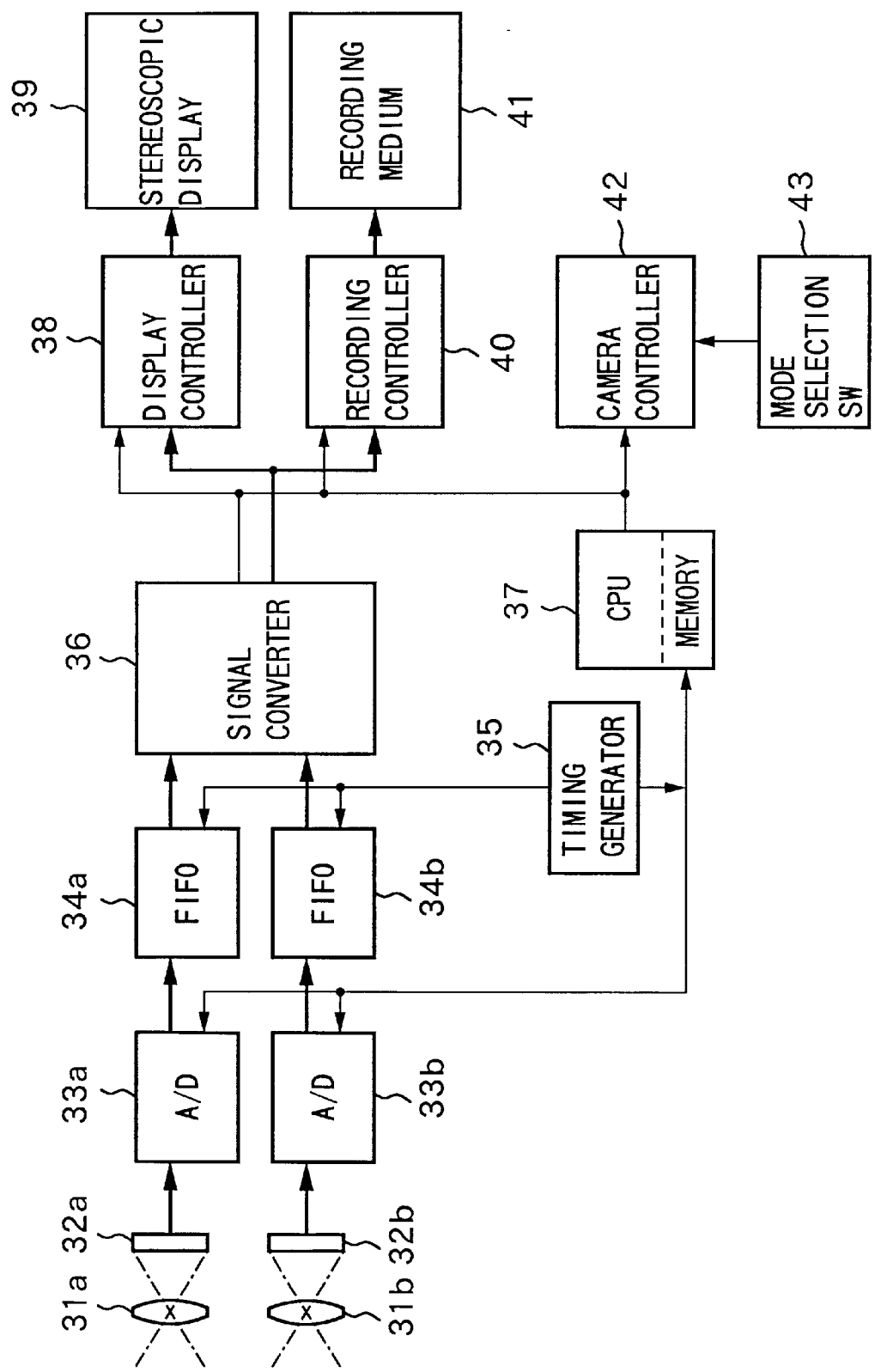

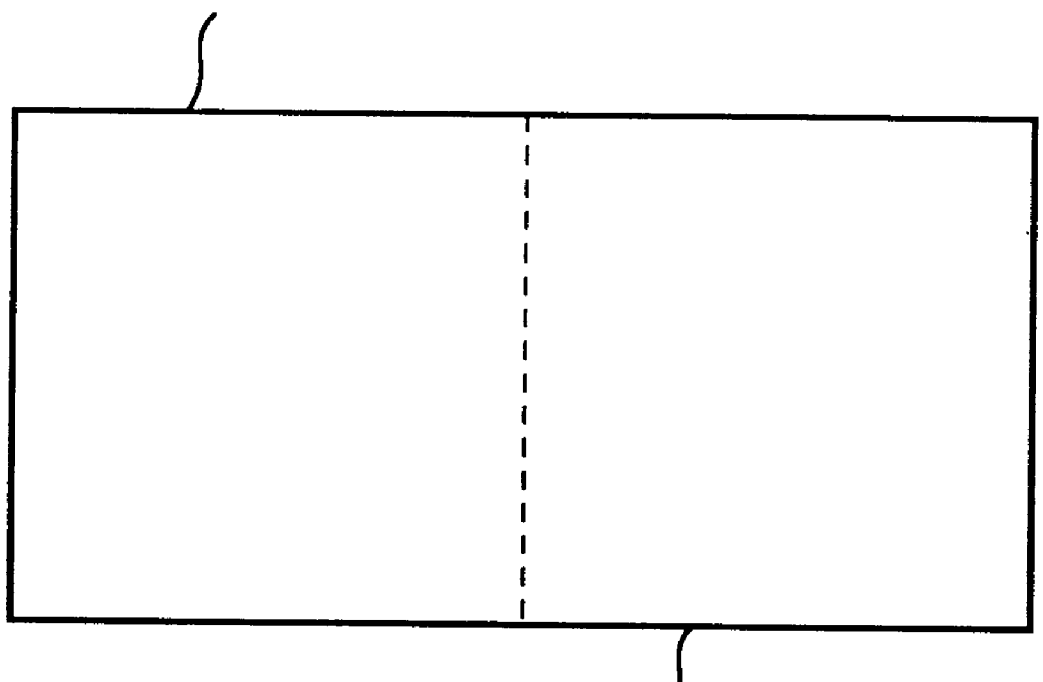

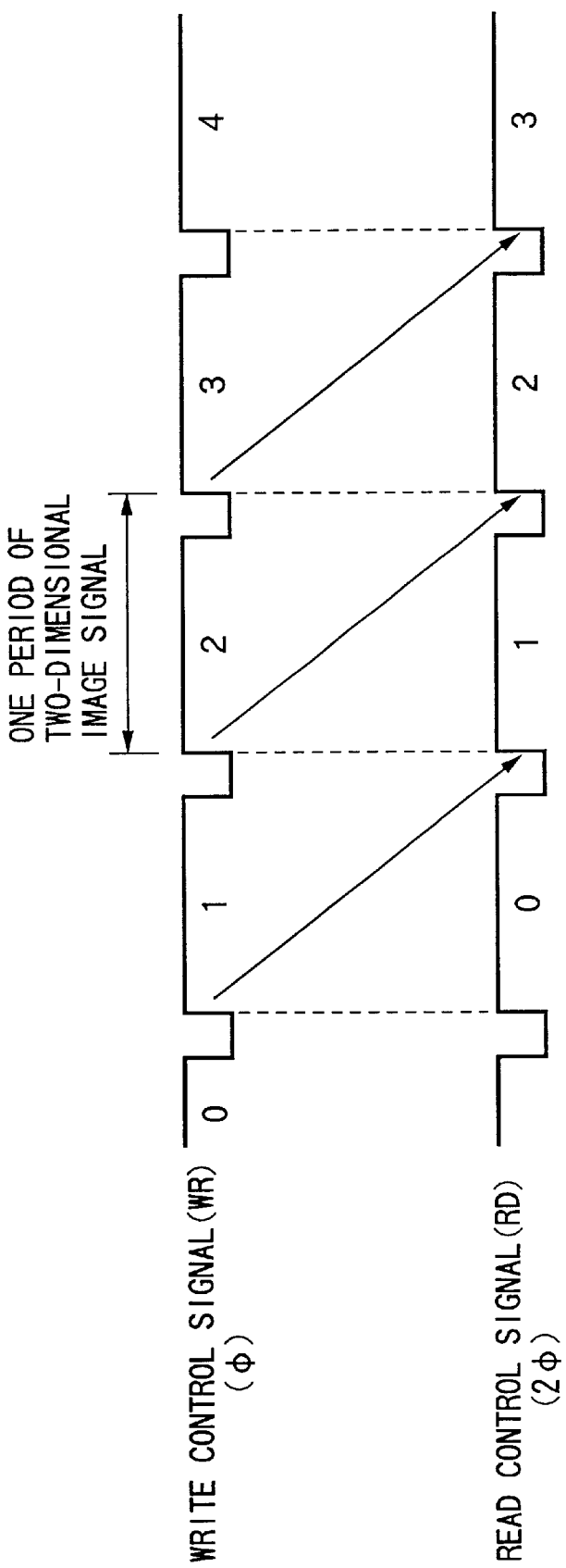

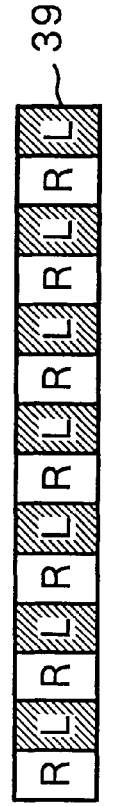
FIG.10A
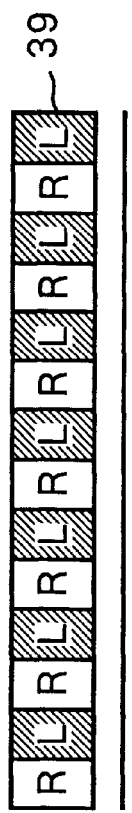
FIG.10B

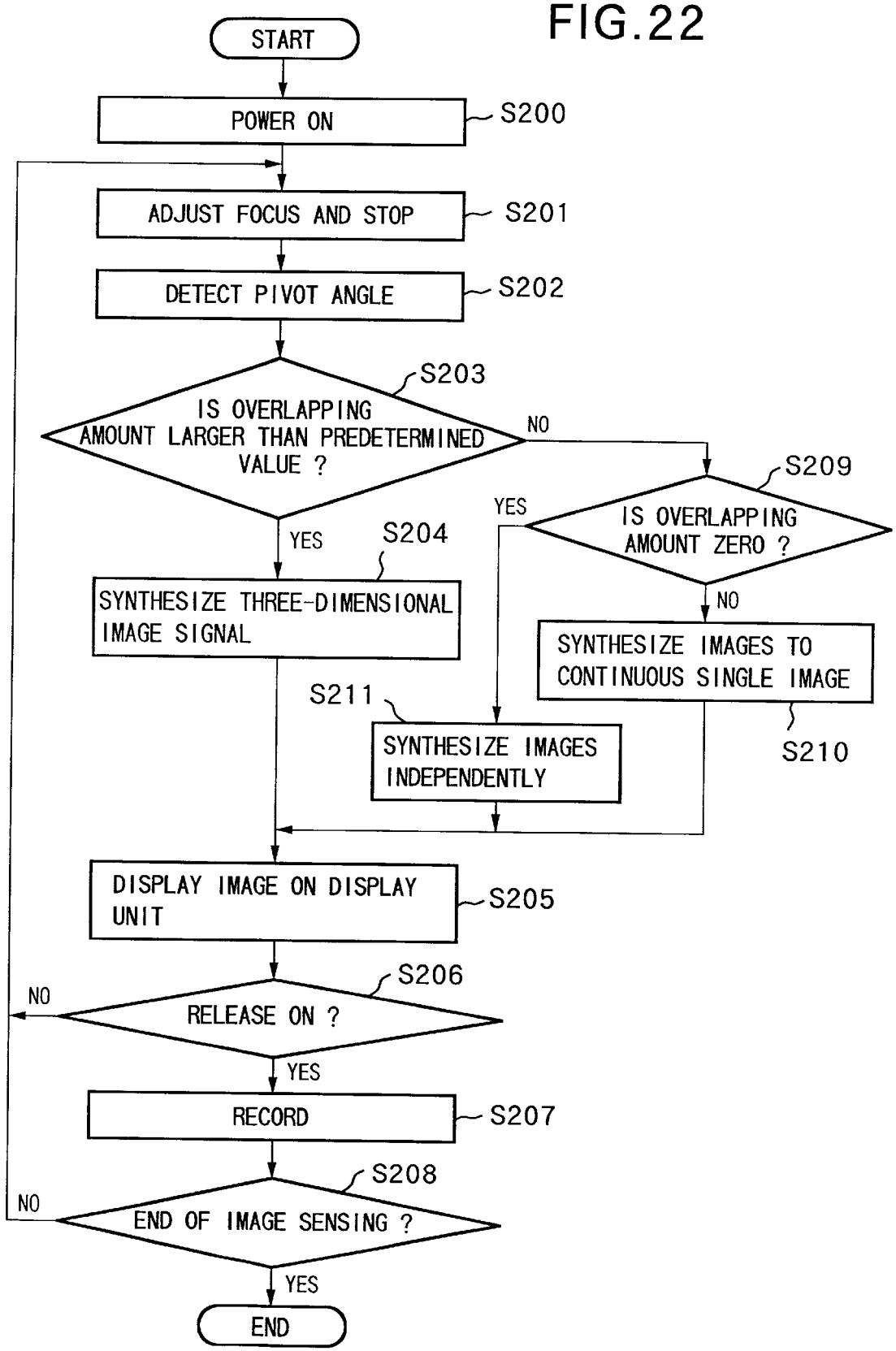

FIG.51
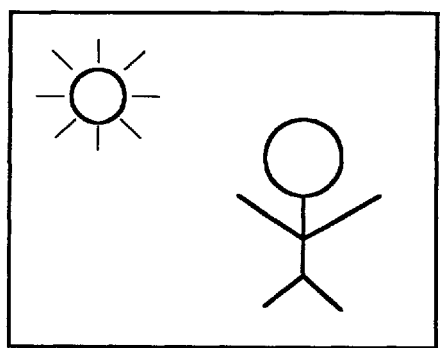
7401a
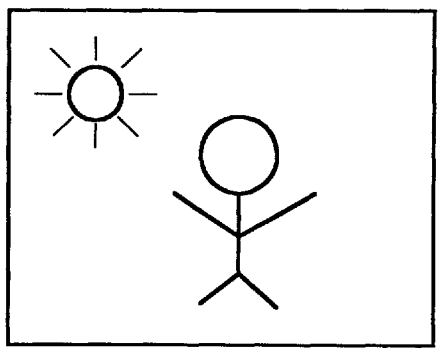
7401b
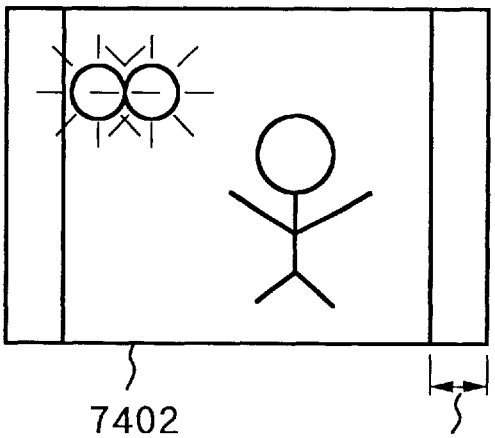
7402
P(pixel)=IMAGE DISPLACEMENT AMOUNT

PROCESSING OF IMAGE OBTAINED BY MULTI-EYE CAMERA

BACKGROUND OF THE INVENTION

The present invention relates to an image sensing apparatus including a multi-eye camera which acquires three-dimensional images and/or two-dimensional images of an object to display the acquired images and, more particularly, to providing panoramic view and/or stereoscopic view of images obtained by the image sensing apparatus.

The present invention also relates to a multi-eye image sensing method and apparatus which can panoramically or three-dimensionally display moving images with high image quality and high resolution.

As a conventional system for sensing and displaying three-dimensional pictures, for example, a three-dimensional television apparatus disclosed in Japanese Patent Laid-Open No. 62-21396 is known. In such image sensing/display system of three-dimensional images, basically, a pair of images having parallax are obtained from a plurality of cameras, and are displayed on a stereoscopic display dedicated to the system, thus presenting a three-dimensional image to a user.

In the above-mentioned three-dimensional image system, since cameras for sensing images and a stereoscopic display for displaying a three-dimensional image are separated, the user cannot stereoscopically observe the sensed images during image sensing and, hence, it is difficult to adjust the cameras to obtain an appropriate three-dimensional image while observing the monitor image. While sensing an image by moving the cameras, the stereoscopic display must be disconnected, and, then, editing of the sensed images by stereoscopically displaying them is required after image sensing. For this reason, image sensing of three-dimensional images is not easy. Conventionally, it is hard to observe a three-dimensional image by a simple method, either.

The conventional three-dimensional image system does not consider any compatibility with two-dimensional images which are popular in existing image sensing systems. More specifically, conventionally, since three- and two-dimensional image systems are discrete and independent, if one who has a two-dimensional image system wants to sense da three-dimensional image, he or she must build a three-dimensional image system, resulting in a heavy load on the person. Also, data of a three-dimensional image, computer graphics image, and the like created on a PC cannot be displayed on the camera side.

The present invention further relates to image sensing/ image display for panoramic view and three-dimensional image sensing/display for stereoscopic view. Problems posed when moving images are sensed and displayed by a multi-eye system will be discussed below.

A multi-eye image sensing apparatus is conventionally applied to the image sensing/image display method for panoramic view and the three-dimensional image sensing/ display method for stereoscopic view.

In the image sensing/image display method for panoramic view, an image is sensed via two, right and left image sensing optical systems, which are set so that their view points match each other using mirrors and the like. These image sensing optical systems are set or adjusted, so that two, right and left sensed images have overlap regions. A single panoramic synthesized image is formed by synthesizing the two, right and left obtained images so that their overlapping regions overlap each other, and the formed image is displayed on an image output apparatus such as a display.

On the other hand, in the three-dimensional image sensing/image display method for stereoscopic view, two image sensing optical systems are parallelly arranged at an interval given by a certain base distance, and an image is sensed from two view points. Since the average distance between the right and left eyes of a human being is about 65 mm, it is a common practice to set the base distance between the two image sensing optical systems at 65 mm in three-dimensional image sensing/image display for stereoscopic view.

When an image of the object of interest is sensed from the two, right and left view points, the object has different positions in images sensed by the individual image sensing systems. That is this difference is parallax, and when images having parallax (to be referred to as "parallax images" hereinafter) are stereoscopically viewed, the user can observe an image with sufficient stereoscopic expression.

A method of stereoscopically viewing parallax images obtained at two, right and left view points includes various methods.

One method is a shutter switching method in which the obtained parallax images for the right and left eyes are alternately displayed on the image region of a display (image output apparatus), and the user observes the displayed image via shutters. The user observes the parallax images via liquid crystal shutter spectacles having right and left shutters which can be independently switched. In the spectacles, since the shutters are switched in synchronism with the display switching timings of the right and left parallax images, the user can observe an image with sufficient stereoscopic expression.

Another display method is called a parallax barrier method. In this method, a stripe-pattern image formed by alternately arranging horizontal lines of two, right and left parallax images is displayed on a display apparatus having a polarization plate in which the direction of polarization changes every other horizontal lines. The pitch of lines of the polarization plate is equal to the line pitch of the stripe-pattern parallax image. When the stripe-pattern parallax image is displayed on the display apparatus, the polarization plate transmits only polarized light in one direction coming from the parallax image for the right eye sensed by the right image sensing optical system and only polarized light in a direction, different from the direction of polarization of the right image, coming from the parallax image for the left eye sensed by the left image sensing optical system.

On the other hand, the observer wears polarization spectacles, right and left eyepiece portions of which have a function of transmitting only the same polarized light components as those coming from the corresponding parallax images displayed on the display apparatus, so that the spectacles transmit only polarized light including the right parallax image for the right eye, and only polarized light including the left parallax image for the left eye. With the polarization spectacles, when the user observes the right parallax image with the right eye alone and the left parallax image with the left eye alone, he or she can observe an image with sufficient stereoscopic expression.

As described above, the three-dimensional image sensing/ image display method for stereoscopic view uses the parallax of images sensed from different view points. That is, the user gazes the two parallax images having parallax so that images of the object of interest (to be referred to as a principal object hereinafter) in the individual parallax images overlap each other, i.e., the two parallax images are fused, thus experiencing stereoscopic expression.

In general, when the user undergoes stereoscopic view by fusing two parallax images having two, right and left view points with respect to the principal object, he or she can fuse the principal object images more easily as the parallax between the principal object images in the two parallax images is smaller.

Hence, the image sensing optical systems need be set to decrease the parallax between the principal object images upon image sensing. Conventionally, this problem is solved by:

(1) setting the image sensing optical systems to have a certain convergence angle; or (2) parallelly displacing the image sensing optical systems.

FIG. 1 shows a case wherein the two image sensing optical systems are set to have no convergence angle, i.e., are set parallel to each other. In FIG. 1, two image sensing optical systems 6701a and 6701b are arranged parallel to each other at an interval given by a base distance Q to have an origin $O_1$ as the center, and respectively have lenses 6702a and 6702b, and CCDs 6703a and 6703b as image sensing devices. Let v be the interval between the lens 6702a and the CCD 6703a, and the interval between the lens 6702b and the CCD 6703b. Also, assume that a principal object 6904 is present at a position A separated by z from the origin $O_1$ in the image sensing direction.

In FIG. 1, images of the principal object 6904 are respectively formed on the surfaces of the CCDs 6703a and 6703b. The distance obtained by doubling the deviation of the imaging position of the principal object 6904 from the CCD center on each of the surfaces of the CCDs 6703a and 6703b is called parallax d. That is, the two parallel image sensing optical systems 6701a and 6701b form images of the principal object 6904 to have given parallax d. Conventionally, the image sensing optical systems 6701a and 6701b are set to have a certain convergence angle so that the user can easily obtain a fused image state, thereby decreasing the parallax d of the principal object 6904.

A convergence angle θ can be calculated by equation (1) below on the basis of angles $O_1AB$ and $O_1AC$ defined by the centers B and C of the lenses 6702a and 6702b, the existing position A of the principal object 6904, and the origin $O_1$ in FIG. 1:

$$\theta = \arctan\frac{l}{2z} \quad (1)$$

where z is the distance between each of the parallel image sensing optical systems 6701a and 6701b and the principal object 6904, and Q is the base distance of the two image sensing optical systems 6701a and 6701b.

When the image sensing optical systems 6701a and 6701b are rotated by the angle θ given by equation (1) to have the centers B and C of their lenses 6702a and 6702b as the centers of rotation, the parallax d becomes 0, and the images of the principal object 6904 are respectively formed at the centers of the CCDs 6703a and 6703b.

In this manner, when the image sensing optical systems 6701a and 6701b are set to have a certain convergence angle, the parallax of the principal object can be set at 0 unless there is no physical limitation, e.g., the image sensing optical systems 6701a and 6701b collide against each other.

On the other hand, the parallax d can be reduced by parallelly displacing the image sensing optical systems 6701a and 6701b toward each other or by parallelly displacing the CCDs 6703a and 6703b with respect to the corresponding lenses 6702a and 6702b to reduce parallax in the image sensing optical systems 6701a and 6701b.

FIG. 3 shows the layout in which the base distance is shortened from Q to l' by parallelly displacing the image sensing optical systems 6701a and 6701b toward each other. In this manner, by shortening the base distance of the image sensing optical systems 6701a and 6701b, the parallax of the sensed images can be reduced.

FIG. 4 shows an example wherein the parallax d is reduced by parallelly displacing the CCDs 6703a and 6703b in the image sensing optical systems 6701a and 6701b with respect to the corresponding lenses 6702a and 6702b. As shown in FIG. 4, the parallax d can also be reduced by parallelly displacing the CCDs 6703a and 6703b to the imaging positions of the principal object 6904 by the lenses 6702a and 6702b.

However, in the above-mentioned image sensing/display method for panoramic view and three-dimensional image sensing/image display method for stereoscopic view using the conventional multi-eye image sensing apparatus, only processing and display methods for still images are available, but no processing and display methods corresponding to moving images have been accomplished yet. In moving image display, processing and display methods that can present good moving images with a high frame rate are required but are not realized yet.

On the other hand, when the above-mentioned conventional image sensing optical systems are set to have a certain convergence angle, the conjugate plane of each image sensing surface changes.

In FIG. 2, the conjugate plane of the image sensing surfaces changes from a conjugate plane 6905a of the image sensing surface upon parallel view to those of the image sensing surfaces sensed by the image sensing optical systems 6701a and 6701b, i.e., from a conjugate plane 6905b of the image sensing surface by the left image sensing optical system 6701a to a conjugate plane 6905c of the image sensing surface by the right image sensing optical system 6701b. Such changes in conjugate plane of the image sensing surface distort the peripheral image portion except for the image of the principal object 6904 located at the center of each image. As the convergence angle of the image sensing optical systems 6701a and 6701b becomes larger, this distortion becomes larger and it becomes harder to attain stereoscopic view. In order to satisfactorily sense and display images for stereoscopic view, the convergence angle of the image sensing optical systems 6701a and 6701b is limited.

On the other hand, in the method of reducing the parallax of the principal object 6904 by parallelly displacing the image sensing optical systems 6701a and 6701b, if the base distance is shortened, not only the image of the principal object 6904 but also the entire image becomes a parallax-free image, and sufficient stereoscopic expression cannot be obtained.

Also, in the method of parallelly displacing the image sensing devices such as the CCDs, high-precision control of the image sensing devices is required. When right and left images having large parallax are used, the moving amount becomes too large to reduce the parallax to 0 by parallelly displacing the image sensing device, and it becomes hard to control them.

SUMMARY OF THE INVENTION

It is, therefore, an object of the present invention to provide a multi-eye camera or multi-eye image sensing apparatus and an image processing method, which can display three-dimensional pictures during image sensing, can adjust stereoscopic expression of images while sensing the images, and are compatible with two-dimensional images.

In order to achieve the above object, according to the present invention, there is provided a multi-eye camera which comprises a plurality of image sensing means for sensing an image of an object, comprising:

first synthesis means for synthesizing a plurality of image signals of the object sensed by the plurality of image sensing means; and display means for displaying an image signal synthesized by the first synthesis means.

According to the present invention, the plurality of image signals of the object sensed by the plurality of image sensing means can be synthesized into a three-dimensional image signal, which can be displayed during image sensing, thus allowing the operator to adjust stereoscopic expression of an image during image sensing.

According to one preferred aspect of the present invention, the multi-eye camera further comprises second synthesis means (36) for synthesizing the plurality of image signals of the object sensed by the plurality of image sensing means to a two-dimensional image signal, and the display means displays the two-dimensional image signal synthesized by the second synthesis means.

For this reason, the multi-eye camera of the present invention can have compatibility with two-dimensional image signals that are currently most frequently used, and not only three-dimensional image signals but also two-dimensional image signals can be synthesized and displayed.

According to one preferred aspect of the present invention, since the multi-eye camera further comprises first selection means (43) for alternatively selecting the first and second synthesis means, the plurality of image signals of the object sensed by the plurality of image sensing means can be synthesized into a three-dimensional image signal or a two-dimensional image signal desired by the operator.

According to one preferred aspect of the present invention, the first synthesis means synthesizes the plurality of image signals to a three-dimensional image signal, and a display period of the three-dimensional image signal on the display means is set to be twice a display period of the two-dimensional image signal.

According to one preferred aspect of the present invention, the display means comprises a detachable lenticular lens on a display surface thereof.

According to one preferred aspect of the present invention, the display means comprises a detachable parallax barrier between itself and an observer.

According to one preferred aspect of the present invention, the multi-eye camera further comprises an output terminal of a synchronization signal which is output to operate spectacles with shutters in synchronism with a display period of the two-dimensional image signal. For this reason, a three-dimensional image signal desired by the operator can be displayed.

According to one preferred aspect of the present invention, the multi-eye camera further comprises second selection means for selecting one of the plurality of image sensing means, and the image of the object is sensed by the one image sensing means selected by the second selection means. With this arrangement, a two-dimensional image can be sensed.

According to one preferred aspect of the present invention, the plurality of image sensing means are held to be pivotal with respect to the display means, and the multi-eye camera further comprises pivot angle detection means for detecting pivot angles of the plurality of image sensing means with respect to the display means. An image of the object can be sensed as an appropriate three-dimensional image or two-dimensional image in correspondence with the pivot angle.

According to one preferred aspect of the present invention, the multi-eye camera further comprises third selection means for alternatively selecting the second and first synthesis means on the basis of the pivot angles detected by the pivot angle detection means. An image of the object can be sensed as an appropriate three-dimensional image or two-dimensional image in correspondence with the pivot angle.

In order to achieve the above object, according to the present invention, there is provided an image processing method comprising:

the image sensing step of sensing an image of an object a plurality of number of times;

the first synthesis step of synthesizing a plurality of image signals of the object sensed in the image sensing step to a three-dimensional image signal; and the display step of displaying the three-dimensional image signal synthesized in the first synthesis step. Hence, the plurality of image signals sensed in the image sensing step can be synthesized into a three-dimensional image signal, which can always be displayed during image sensing, thus allowing the operator to adjust stereoscopic expression of an image during image sensing.

According to one preferred aspect of the present invention, the method further comprises the second synthesis step of synthesizing the plurality of image signals of the object sensed in the image sensing step to a two-dimensional image signal, and the display step includes the step of displaying the two-dimensional image signal synthesized in the second synthesis step. The method of the present invention has compatibility with two-dimensional images that are currently most frequently used, and not only three-dimensional image signals but also two-dimensional image signals can be synthesized and displayed.

According to one preferred aspect of the present invention, the method further comprises the first selection step of alternatively selecting the first and second synthesis steps. The plurality of image signals of the object sensed in the image sensing step can be synthesized into a three-dimensional image signal or two-dimensional image signal desired by the operator.

It is another object of the present invention to provide a multi-eye camera as a three-dimensional imaging system, which allows one to always observe a three-dimensional picture during image sensing, to adjust stereoscopic expression during image sensing, and to easily process the three-dimensional picture even after image sensing, has compatibility with conventional two-dimensional pictures and high affinity with a PC system, and is easy to operate.

In order to achieve the above object, according to the present invention, there is provided an image sensing apparatus comprising:

a plurality of image sensing means; and output means for outputting a plurality of image signals obtained by the plurality of image sensing means and a synchronization signal synchronized with each of the plurality of image signals.

The apparatus can sense three-dimensional images, and send them to an external display to display a three-dimensional image thereon.

According to one preferred aspect of the present invention, the apparatus further comprises display means for displaying the plurality of image signals so as to be able to be observed by both eyes in synchronism with each of the plurality of image signals. Image sensing and observation of three-dimensional images can be realized by the camera itself.

According to one preferred aspect of the present invention, the image signal output from the output means is a standard television signal. A conventional television system can be used as the external display.

According to one preferred aspect of the present invention, the image signal output from the output means is an image signal which can be displayed by display means of a computer. The apparatus can sense three-dimensional images and send them to an external computer display to display a three-dimensional image thereon.

According to one preferred aspect of the present invention, the output means alternately outputs the plurality of image signals on a time axis. A three-dimensional image can be transmitted to an external display by alternately outputting the right and left images along the time axis.

According to one preferred aspect of the present invention, the output means outputs the plurality of image signals so that individual images of the plurality of image signals are arranged on a display screen of three-dimensional display means of a computer. A three-dimensional image can also be transmitted to an external 3D computer display by outputting the right and left images which are set spatially.

According to one preferred aspect of the present invention, the apparatus further comprises:
mode setting means for selectively setting one of a three-dimensional image mode for three-dimensionally displaying the plurality of image signals, and a two-dimensional image mode for synthesizing the plurality of image signals and two-dimensionally displaying the synthesized image signal, and signal processing means for processing the plurality of image signals in correspondence with the set mode, and supplying the processed signal to the output means.

A camera compatible with two- and three-dimensional images can be realized.

According to one preferred aspect of the present invention, the apparatus further comprises connection means for connecting the output means and display means of a computer. The camera and display can be easily connected.

It is still another object of the present invention to provide an image sensing apparatus comprising:
a plurality of image input means;
input means for inputting a three-dimensional image signal from an external device; and
display means for selectively three-dimensionally displaying a plurality of image signals input from the plurality of image input means and the three-dimensional image signal obtained by the input means.

With this apparatus, three-dimensional image signals created by an external device can be input to and displayed on the camera.

According to one preferred aspect of the present invention, the three-dimensional image signal includes right and left two-dimensional image data. A three-dimensional image created by, e.g., a computer can be input to the camera.

According to one preferred aspect of the present invention, the three-dimensional image signal is script data for generating a three-dimensional image. A three-dimensional image can be created inside the camera on the basis of the script data sent from, e.g., a computer.

According to one preferred aspect of the present invention, the plurality of image input means respectively comprise image sensing means. A multi-eye camera which senses three-dimensional images and can receive and display three-dimensional image signals created by an external device can be realized.

According to one preferred aspect of the present invention, at least one of the plurality of image input means comprises an adapter device for inputting a three-dimensional image signal.

According to one preferred aspect of the present invention, the apparatus further comprises output means for outputting the plurality of image signals input from the plurality of image input means, and a synchronization signal synchronized with each of the plurality of image signals. The camera can sense three-dimensional images and can receive three-dimensional image data created by an external device. Also, the camera can output the sensed three-dimensional images to an external device together with synchronization signals.

It is still another object of the present invention to provide a multi-eye image sensing method and apparatus, which can implement image sensing/display for panoramic view and three-dimensional image sensing/image display for stereoscopic view of moving images in correspondence with the output format.

In order to achieve the above object, according to the present invention, there is provided an image sensing method comprising:
the step of selecting one of a plurality of image synthesis methods; and
the step of synthesizing two, right and left images sensed by two, right and left image sensing optical systems to a single synthesized image in accordance with the selected image synthesis method.

In this manner, the image sensing/display for panoramic view and three-dimensional image sensing/image display for stereoscopic view of moving images can be implemented in correspondence with the output format.

According to one preferred aspect of the present invention, the plurality of synthesis methods include a first synthesis method for synthesizing the images while giving priority to a synthesis speed, and a second synthesis method for synthesizing images while giving priority to image quality of the synthesized image.

According to one preferred aspect of the present invention, the first synthesis method synthesizes the two, right and left sensed images by giving a predetermined overlapping amount, and
the second synthesis method corrects right-and-left differences of luminance levels and color information, and trapezoidal distortions of the two, right and left sensed images, detects an overlapping region between the two images, and synthesizes the two images using an overlapping amount calculated based on the overlapping region.

According to one preferred aspect of the present invention, the selection step includes the step of selecting the first synthesis method in a through display mode and selecting the second synthesis method in recording and reproduction modes.

According to one preferred aspect of the present invention, the synthesized image is a panoramic synthesized image.

According to one preferred aspect of the present invention, the synthesized image is an image for stereoscopic view.

In order to achieve the above object, according to the present invention, there is provided an image sensing apparatus comprising:

synthesis means having a plurality of synthesis methods for generating a single synthesized image from two, right and left images sensed by two, right and left image sensing optical systems; and switching means for switching the plurality of synthesis methods.

According to one preferred aspect of the present invention, the plurality of synthesis methods include a first synthesis method for synthesizing the images while giving priority to a synthesis speed, and a second synthesis method for synthesizing images while giving priority to image quality of the synthesized image.

According to one preferred aspect of the present invention, the first synthesis method synthesizes the two, right and left sensed images by giving a predetermined overlapping amount, and the second synthesis method corrects right-and-left differences of luminance levels and color information, and trapezoidal distortions of the two, right and left sensed images, detects an overlapping region between the two images, and synthesizes the two images using an overlapping amount calculated based on the overlapping region.

According to one preferred aspect of the present invention, the switching means selects the first synthesis method in a through display mode, and selects the second synthesis method in recording and reproduction modes.

It is still another object of the present invention to provide a multi-eye image sensing method and apparatus, which can obtain an image for stereoscopic view, which allows easy fusion of images of a principal object.

In order to achieve the above object, according to the present invention, there is provided an image sensing method comprising:

the step of sensing a pair of images having parallax using two image sensing optical systems; and the control step of controlling to adjust parallax of a pair of partial images of a principal object selected from the pair of sensed images.

For this reason, an image for stereoscopic view, which allows easy fusion of images of the principal object can be obtained.

According to one preferred aspect of the present invention, the control step includes the step of setting a limit value of a convergence angle of each of the image sensing optical systems.

According to one preferred aspect of the present invention, the control step includes the step of adjusting the parallax of the principal object in the images by parallelly displacing an image to be displayed when the convergence angle of each of the image sensing optical systems has reached the limit value.

According to one preferred aspect of the present invention, the parallel-displacement parallelly displaces the image sensing optical systems, and the control step includes the step of adjusting the parallax of the principal object in the images by shortening a base distance between the image sensing optical systems to sense images when the convergence angle of each of the image sensing optical systems has reached the limit value.

According to one preferred aspect of the present invention, the parallel displacement parallelly displaces image sensing devices in the image sensing optical systems, and the control step includes the step of adjusting the parallax of the principal object in the images by parallelly displacing the image sensing devices in the image sensing optical systems to separate from centers of the two image sensing optical systems to sense images when the convergence angle of each of the image sensing optical systems has reached the limit value.

According to one preferred aspect of the present invention, the parallel-displacement parallelly displaces right and left sensed images, and the control step includes the step of adjusting the parallax of the principal object in the images by parallelly displacing the right and left sensed images to generate an image for stereoscopic view, when the convergence angle of each of the image sensing optical systems has reached the limit value.

In order to achieve the above object, according to the present invention, there is provided an image sensing method comprising:

the step of sensing a pair of images having parallax using two image sensing optical systems; and the control step of setting a limit value of a convergence angle of each of the image sensing optical systems, controlling the image sensing optical systems by controlling the convergence angle or a parallel-displacement amount of the image sensing optical systems when the convergence angle is not more than the limit value, and controlling the image sensing optical systems by controlling the parallel-displacement amount of the image sensing optical systems when the convergence angle has reached the limit value.

In order to achieve, the above object, according to the present invention, there is provided an image sensing apparatus comprising:

two image sensing optical systems for sensing a pair of images having parallax; and adjustment means for adjusting the parallax of a principal object selected from the sensed images.

According to one preferred aspect of the present invention, the adjustment means sets a limit value of a convergence angle of each of the image sensing optical systems.

According to one preferred aspect of the present invention, the adjustment means adjusts the parallax of the principal object in, the images by parallelly displacing an image to be displayed when the convergence angle of each of the image sensing optical systems has reached the limit value.

According to one preferred aspect of the present invention, the parallel-displacement indicates parallel-displacement of the image sensing optical systems, and the adjustment means adjusts the parallax of the principal object in the images by shortening a base distance between the image sensing optical systems to sense images when the convergence angle of each of the image sensing optical systems has reached the limit value.

According to one preferred aspect of the present invention, the parallel-displacement indicates parallel-displacement of image sensing devices in the image sensing optical systems, and the adjustment means adjusts the parallax of the principal object in the images by parallelly displacing the image sensing devices in the image sensing optical systems to separate from centers of the two image sensing optical systems to sense images when the convergence angle of each of the image sensing optical systems has reached the limit value.

According to one preferred aspect of the present invention, the parallel displacement indicates parallel-displacement of right and left sensed images, and the adjustment means adjusts the parallax of the principal object in the images by parallelly displacing the right and left sensed images to generate an image for stereoscopic view when the convergence angle of each of the image sensing optical systems has reached the limit value.

It is still another object of the present invention to provide a multi-eye image sensing method and apparatus, which are capable of easy manual control of image sensing optical systems.

In order to achieve the above object, according to the present invention, there is provided an image sensing apparatus comprising:

two image sensing optical systems for sensing a pair of images having parallax;

limit value setting means for setting a limit value of a convergence angle of each of the image sensing optical systems; and control means for controlling the image sensing optical systems by controlling the convergence angle or a parallel-displacement amount of the image sensing optical systems when the convergence angle is not more than the limit value set by the limit value setting means, and controlling the image sensing optical systems by controlling the parallel-displacement amount of the image sensing optical systems when the convergence angle has reached the limit value.

According to one preferred aspect of the present invention, the control means comprises a user interface.

It is still another object of the present invention to provide a storage medium which stores a computer program that can smoothly control the multi-eye image sensing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7A is a block diagram showing the arrangement of the binocular camera according to the first embodiment of the present invention;

FIG. 7B is a view for explaining the method of using a FIFO according to the first embodiment of the present invention;

FIG. 9 is an explanatory view of control signals;

FIG. 10A is an explanatory view when a lenticular lens 61 is used as a three-dimensional image adapter;

FIG. 10B is an explanatory view when a parallax barrier 62 is used as a three-dimensional image adapter;

FIG. 22 is a flow chart showing the image sensing by the binocular camera according to the fourth embodiment;

FIG. 51 is an explanatory view of three-dimensional image sensing/image display for stereoscopic view based on convergence angle control up to a convergence limit and software in a multi-eye image sensing apparatus according to the 17th embodiment of the present invention;

DETAILED DESCRIPTION OF THE INVENTION

A multi-eye camera according to the preferred embodiments (first to 22nd embodiments) of the present invention will be described hereinafter with reference to the accompanying drawings. In these embodiments, the present invention is applied to a binocular camera (so-called stereoscopic camera). The embodiments of binocular cameras will be explained for the sake of simplicity, and the present invention can be applied to a multi-eye camera including three or more camera units.

<First Embodiment>

The arrangement of a binocular camera according to the first embodiment of the present invention will be described below with reference to FIGS. 5A, 5B, and 6. Note that FIG. 5A is a front view of the binocular camera according to the first embodiment, FIG. 5B is a rear view of the camera, and FIG. 6 is a perspective view of the camera.

Figure 5A:
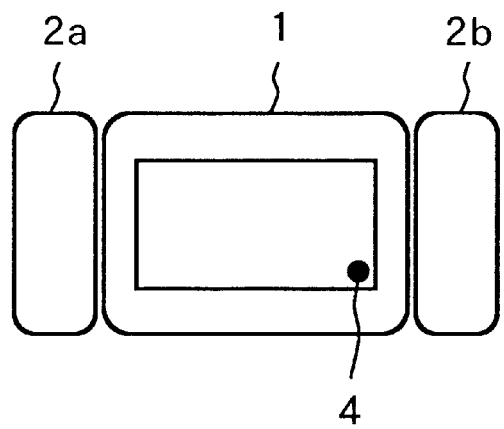
FIGS. 5A and 5B are respectively a front view and a rear view of a binocular camera according to the first embodiment of the present invention.
Figure 5B:
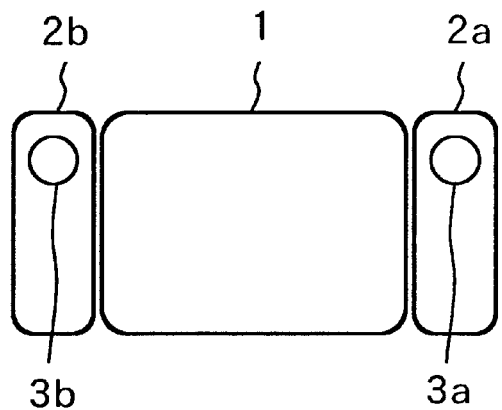

As shown in FIGS. 5A and 5B, the binocular camera of this embodiment comprises a camera main body 1, two camera heads 2a and 2b which are attached to the right and left sides of the camera main body 1 and have two lenses 3a and 3b on their front sides, and a stereoscopic display 4 arranged on the rear side of the camera main body 1. Note that the camera heads 2a and 2b build an image sensing means, and the stereoscopic display 4 builds a display means.

The camera heads 2a and 2b are attached to the rightmost and leftmost portions of the camera main body 1 to obtain stereoscopic expression of an image, thus prolonging the base distance. The stereoscopic display 4 stereoscopically displays images obtained from the right and left lenses 3a and 3b. The stereoscopic display 4 may adopt many schemes, but the first embodiment adopts a lenticular scheme that does not require any special devices such as spectacles with shutters and the like.

Figure 6:
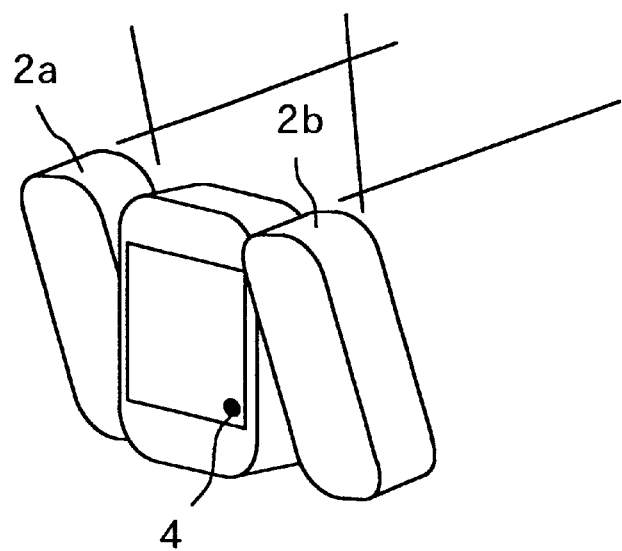
FIG. 6 is a perspective view of the binocular camera according to the first embodiment of the present invention.

As shown in FIG. 6, the camera heads 2a and 2b can independently pivot about the horizontal axis agreeing with the widthwise direction of the main body. Upon image sensing, the operator directs the lenses 3a and 3b toward an object, and adjusts the stereoscopic display 4 to an angle at which it is easy for the operator to see the stereoscopic display 4. In this manner, the operator can confirm the stereoscopic view state of that object while observing an image displayed on the stereoscopic display 4. Note that the positions of the lenses 3a and 3b may be fixed in correspondence with the object, and the stereoscopic display 4 may be rotated in correspondence with the movement or position of the operator.

A signal processing system of the binocular camera according to the first embodiment will be described below with reference to FIG. 7A.

The binocular camera comprises lenses 31a and 31b, two image sensing devices 32a and 32b, two A/D converters 33a and 33b, two FIFOs 34a and 34b, a timing generator 35, a signal converter 36, a CPU 37 with an internal memory, a display controller 38, a stereoscopic display 39, a recording controller 40, a recording medium 41, and a camera controller 42. The signal converter 36 constitutes a stereoscopic image signal synthesizing means, a two-dimensional image signal synthesizing means, and a first selection means, the stereoscopic display 39 constitutes a synthesized image signal display means, and the camera controller 42 constitutes a second selection means.

The image sensing devices 32a and 32b, the A/D converters 33a and 33b, and FIFOs 34a and 34b are respectively connected in series with each other, and the outputs of the FIFOs 34a and 34b are connected to the signal converter 36. The stereoscopic display 39 is connected to the signal converter 36 via the display controller 38, and the recording medium 41 is connected to the signal converter 36 via the recording controller 40. The A/D converters 33a and 33b are directly connected to the CPU 37, and the FIFOs 34a and 34b are connected to the CPU 37 via the timing generator 35. The display controller 38, the recording controller 40, and the camera controller 42 are connected to the CPU 37.

The camera controller 42 is connected to a mode selection switch 43, which is operated by the user to switch the mode between a panoramic mode and a stereoscopic mode.

The image sensing devices 32a and 32b comprise CCDs, and the like, and convert images sensed via the lenses 31a and 31b into electrical signals by a photoelectric effect. The A/D converters 33a and 33b convert these electrical signals into digital signals. These digital signals are two-dimensional image signals. The FIFOs 34a and 34b temporarily store the two-dimensional image signals for generating a three-dimensional image signal (to be described later) The timing generator 35 supplies a write control signal to the FIFOs 34a and 34b. The CPU 37 controls the A/D converters 33a and 33b, FIFOs 34a and 34b, timing generator 35, signal converter 36, display controller 38, recording controller 40, and camera controller 42. The signal converter 36 converts the two-dimensional image signals written in the FIFOs 34a and 34b into a three-dimensional image signal, and the display controller 38 displays the three-dimensional image signal generated by the signal converter 36 on the stereoscopic display 39. The recording controller 40 writes the three-dimensional image signal in the recording medium 41 used in the camera, and the camera controller 42 transmits an input signal indicating the contents input by the operator to the CPU 37.

When the operator inputs an operation such as recording, reproduction, or the like of an image to the camera controller 42, a signal indicating the input contents is supplied from the camera controller 42 to the CPU 37, and the CPU 37 controls the individual units. In this embodiment, as an example of the operation, an operation for designating one of a panoramic image sensing mode and a stereoscopic image sensing mode is prepared.

<Three-dimensional Image Processing> . . . In First Embodiment

A case will be explained below wherein the stereoscopic image sensing mode is selected.

When the stereoscopic image sensing mode is selected, images sensed via the lenses 31a and 31b are formed on the image sensing devices 32a and 32b. The images formed on the image sensing devices 32a and 32b are photoelectrically converted into electrical signals, which are then converted into digital signals by the A/D converters 33a and 33b. These digital signals are two-dimensional image signals. At this time, the right and left two-dimensional image signals represent right and left images of an object at an identical position since the image sensing devices are synchronously driven under the control of the CPU 37. These two-dimensional image signals are temporarily written in the FIFOs 34a and 34b for generating a three-dimensional image signal (to be described later). As shown in FIG. 7B, the FIFOs 34a and 34b respectively have capacities corresponding to areas (34a-1, 34a-2, 34b-1, and 34b-2) for storing two-dimensional image signals corresponding to images for two frames of the stereoscopic display 2. When two-dimensional image signals corresponding to an image for one frame of the stereoscopic display 39 are written in one-frame areas (34a-1 and 34b-1) of the FIFOs 34a and 34b, two-dimensional image signals corresponding to an image for the next frame are written in the remaining one-frame areas (34a-2 and 34b-2) of the FIFOs 34a and 34b. When the two-dimensional image signals corresponding to images for two frames are written in the FIFOs 34a and 34b, two-dimensional image signals corresponding to an image for the next frame are overwritten on the areas (34a-1 and 34b1) of the FIFOs 34a and 34b. The write control signal of the FIFOs is supplied from the timing controller 35 controlled by the CPU 37.

The two-dimensional image signals written in the FIFOs 34a and 34b are converted into a three-dimensional image signal by the signal converter 36. Upon conversion of two-dimensional image signals into a three-dimensional image signal, as shown in FIGS. 8A to 8C, a right parallax image signal (FIG. 8A) and a left parallax image signal (FIG. 8B) as the two-dimensional image signals written in the FIFOs 34a and 34b are alternately arranged in units of vertical lines, as shown in FIG. 8C, to form a single three-dimensional image signal.

Figure 8C:
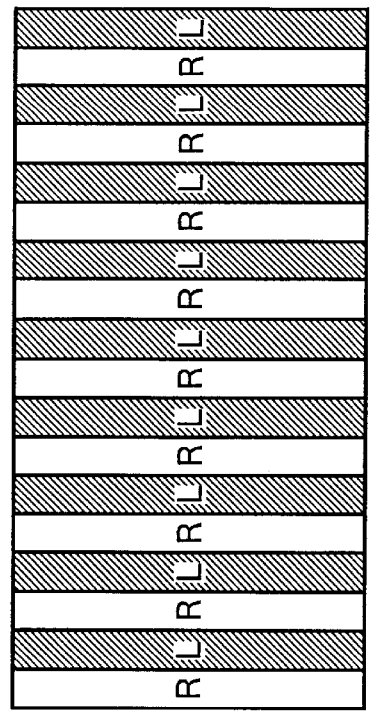
FIG. 8C shows a three-dimensional image signal converted from the right and left parallax signals.
Figure 8B:
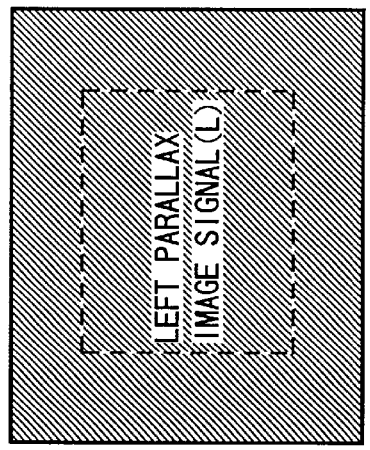
FIGS. 8A and 8B respectively show right and left parallax image signals.
Figure 8A:
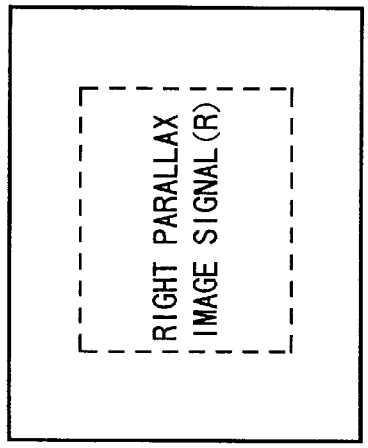

When the signal converter 36 simply converts all the image data of the right and left parallax image signals (FIGS. 8A and 8B) into image data shown in FIG. 8C, the three-dimensional image signal (FIG. 8C) has a width twice that of the original right or left parallax image signal (FIG. 8A or 8B). In view of this problem, the image data must be decimated to half in the horizontal direction during the process of generating of a three-dimensional image signal, or a three-dimensional image signal must be generated using a portion of the right or left parallax image signal. In the example shown in FIGS. 8A to 8C, since the three-dimensional image signal shown in FIG. 8C is generated using only central portions (surrounded by broken lines in FIGS. 8A and 8B) of the right and left parallax image signals, the aspect ratio of the image signal is left substantially unchanged.

The signal converter 36 reads out two-dimensional image signals corresponding to an image for one frame of from the areas 34a-1 and 34b1 of the FIFOs 34a and 34b under the control of the CPU 37 after these two-dimensional image signals are written in the FIFOs 34a and 34b. Parallel to this read, two-dimensional image signals corresponding to an image for the next frame are written in the areas 34a-2 and 34b-2 of the FIFOs 34a and 34b. For this reason, the timing of a write control signal WR and the timing of a read control signal RD transmitted from the CPU 37 are shifted by one period of two-dimensional image signals corresponding to an image for one frame of the stereoscopic display 39. This state is shown in the explanatory view of control signals in FIG. 9. In order to prevent frame losses upon image sensing, the signal converter 36 must alternately read out right and left parallax images for 0.5 frames from the FIFOs at the same time, parallel to write of a parallax image signal for the right eye (or left eye) for one frame into the FIFOs. For this purpose, the read control signal RD must be simultaneously supplied to the FIFOs 34a and 34b, and its frequency must be set to be twice the write speed (the frequency of the control signal WR) to the FIFOs. Under such timing control of the control signals WR and RD, the signal converter 36 generates a three-dimensional image signal with a size equal to that of either one of the right and left parallax image signals.

The three-dimensional image signal generated by the signal converter 36 is supplied to and recorded by the recording controller 40 via the display controller 38 under the control of the CPU 37. The display controller 38 displays the generated three-dimensional image signal on the stereoscopic display 39.

FIG. 10A is a top view of the stereoscopic display 39 that displays the three-dimensional image signal generated in the above-mentioned process. An adapter for separately inputting the three-dimensional image signal to the right and left eyes of the operator is attached in advance to the front surface of the stereoscopic display 39. As this adapter, several types of adapters are available. FIG. 10A shows the case wherein a lenticular lens 61 is used as the three-dimensional image adapter, and FIG. 10B shows the case wherein a parallax barrier 62 is used as the three-dimensional image adapter. Note that the pitch of the lenticular lens 61 and the parallax barrier 62 is adjusted in advance to that calculated on the basis of the pixel pitch of the stereoscopic display 39 and the observation position of the operator.

Since the display unit of the first embodiment also assumes displaying a two-dimensional image signal, this adapter is detachable in consideration of the compatibility with the two-dimensional image signal. The operator must detach the adapter when he or she sets a switch 43 in the panoramic image sensing mode that does not require any stereoscopic view.

The recording controller 40 writes the three-dimensional image signal in the recording medium 41 used in the binocular camera of this embodiment. As the recording medium 41, a magnetic tape, magnetic disk, optical disk, semiconductor memory, or the like may be used. The recording controller 40 saves the three-dimensional signal in the digital format in an empty area of the recording medium 41 as a file.

The recording on the recording medium 41 starts or stops when the operator inputs a desired operation to the camera controller 42. Note that the operator can perform only observation of the three-dimensional image signal on the stereoscopic display 39 without any recording.

The processing in the binocular camera of this embodiment upon reproduction of the three-dimensional image signal recorded in the recording medium 41 will be explained below.

In order to reproduce a three-dimensional image recorded in the medium 41, the user must know the presence of a recorded image file. Since the recording medium 41 stores a plurality of files, and three-dimensional image signals are recorded in these files, the recording controller 40 checks the area in the recording medium 41 and transfers the plurality of recorded files to the CPU 37. The CPU 37 selects files that can be reproduced as three-dimensional image signals, and arranges a list of selected file names in an arbitrary display format. The CPU 37 then supplies the list to the display controller 38 to display it on the stereoscopic display 39. The operator selects a file to be reproduced from the displayed list of file names, and sends it to the camera controller 42. The camera controller 42 transmits the selected file name to the CPU 37. The CPU 37 reads out the selected file from the recording medium 41 via the recording controller 40, and displays it on the stereoscopic display 39 as a three-dimensional image signal via the display controller 38. In this manner, the sensed three-dimensional image signal can be easily reproduced without requiring any dedicated equipment.

Figure 11:
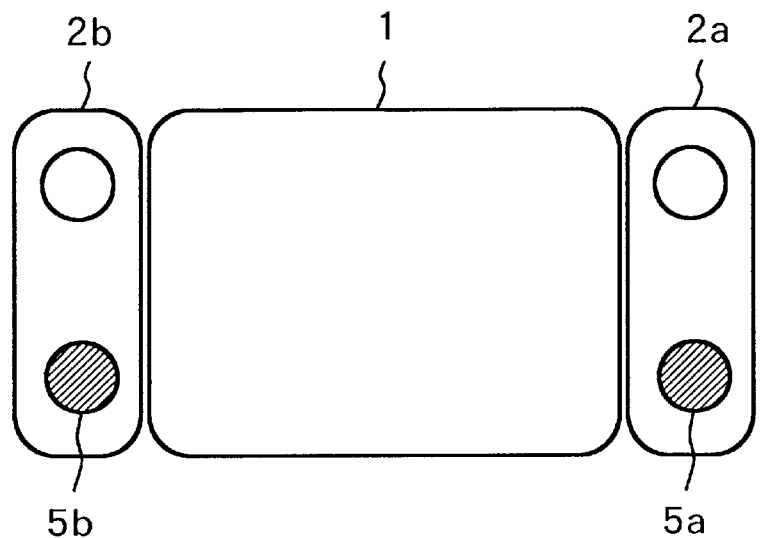
FIG. 11 is a front view showing the outer appearance of the binocular camera according to the first embodiment.

In order to record and reproduce a voice together with an image, microphones 5a and 5b are set on the front surfaces of the camera heads 2a and 2b, as shown in FIG. 11.

<Two-dimensional Image Processing> . . . In First Embodiment

The processing in the binocular camera until generation of a two-dimensional image signal, and the processing in the binocular camera upon reproduction of the two-dimensional image signal will be explained below.

In this case, a two-dimensional image signal is recorded or displayed by processing an image signal from one of the lenses 31a and 31b. The operator can select the lens to be used by making an input to the camera controller 42.

The difference between the processing in the binocular camera until generation of a two-dimensional image signal and that of a three-dimensional image signal is that the signal converter 36 operates as a signal selector. For this reason, a two-dimensional image signal written in the FIFOs 34a and 34b is supplied to the display controller 38 or recording controller 40 without being converted into a three-dimensional image signal. Other processes are the same as those in the above description.

When the operator switches the lenses (the operation is attained by an input to the camera controller 42) during recording of a two-dimensional image signal, the CPU 37 switches the lenses 31a and 31b in synchronism with fetching of the two-dimensional signal so as to prevent the two-dimensional image signal from being temporarily disturbed upon switching of the lenses 31a and 31b.

The processing in the binocular camera upon reproduction of a two-dimensional image signal is the same as that of a three-dimensional image signal. In this case, the list of file names of two-dimensional image signals is displayed for the operator, and the selected file is displayed on the stereoscopic display 39.

<Advantages of First Embodiment>

As described above, according to the first embodiment, the user can stereoscopically observe a three-dimensional image signal sensed by the binocular camera in real time.

Since the user can watch the stereoscopic display 39 with both eyes, the degree of freedom in posture upon image sensing is high, and the user can confirm stereoscopic expression even when he or she moves while holding the binocular camera during image sensing.

Adjustment of stereoscopic expression of the object can be attained by shifting portions used in conversion of the right and left parallax image signals shown in FIGS. 8A and 8B, but can also be attained by a simple operation, e.g., by changing the distance between the object and the binocular camera upon image sensing or zooming of the lenses 31a and 31b. Also, the camera can be easily switched to a conventional single-eye image sensing mode.

Note that the binocular camera according to the present invention can be used in image sensing of both moving images and still images.

<Second Embodiment> . . . Employing Spectacles with Shutters

The arrangement of a binocular camera according to the second embodiment of the present invention will be described below with reference to FIGS. 12A to 13.

Figure 12A:
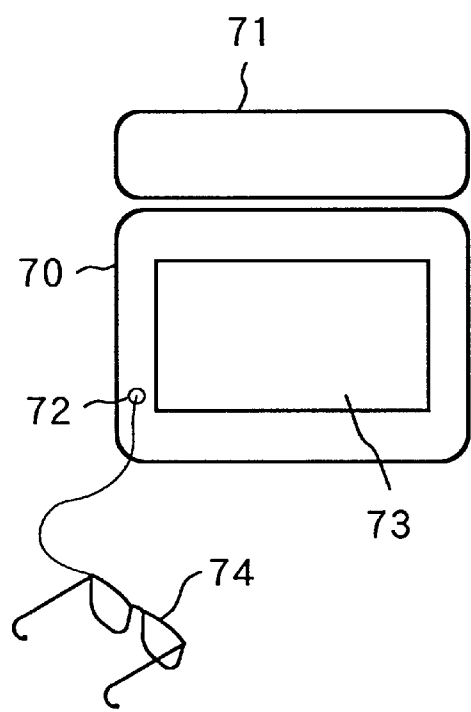
FIGS. 12A and 12B are respectively a front view and a rear view of a binocular camera according to the second embodiment of the present invention.
Figure 12B:
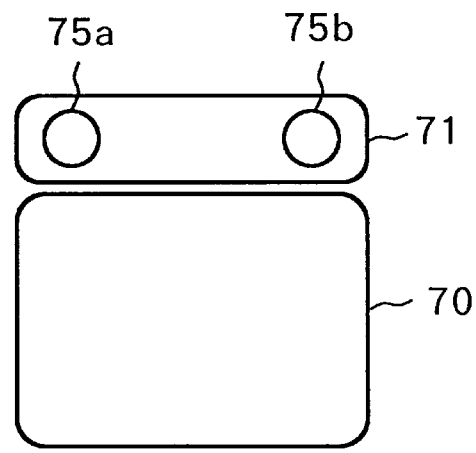
Figure 13:
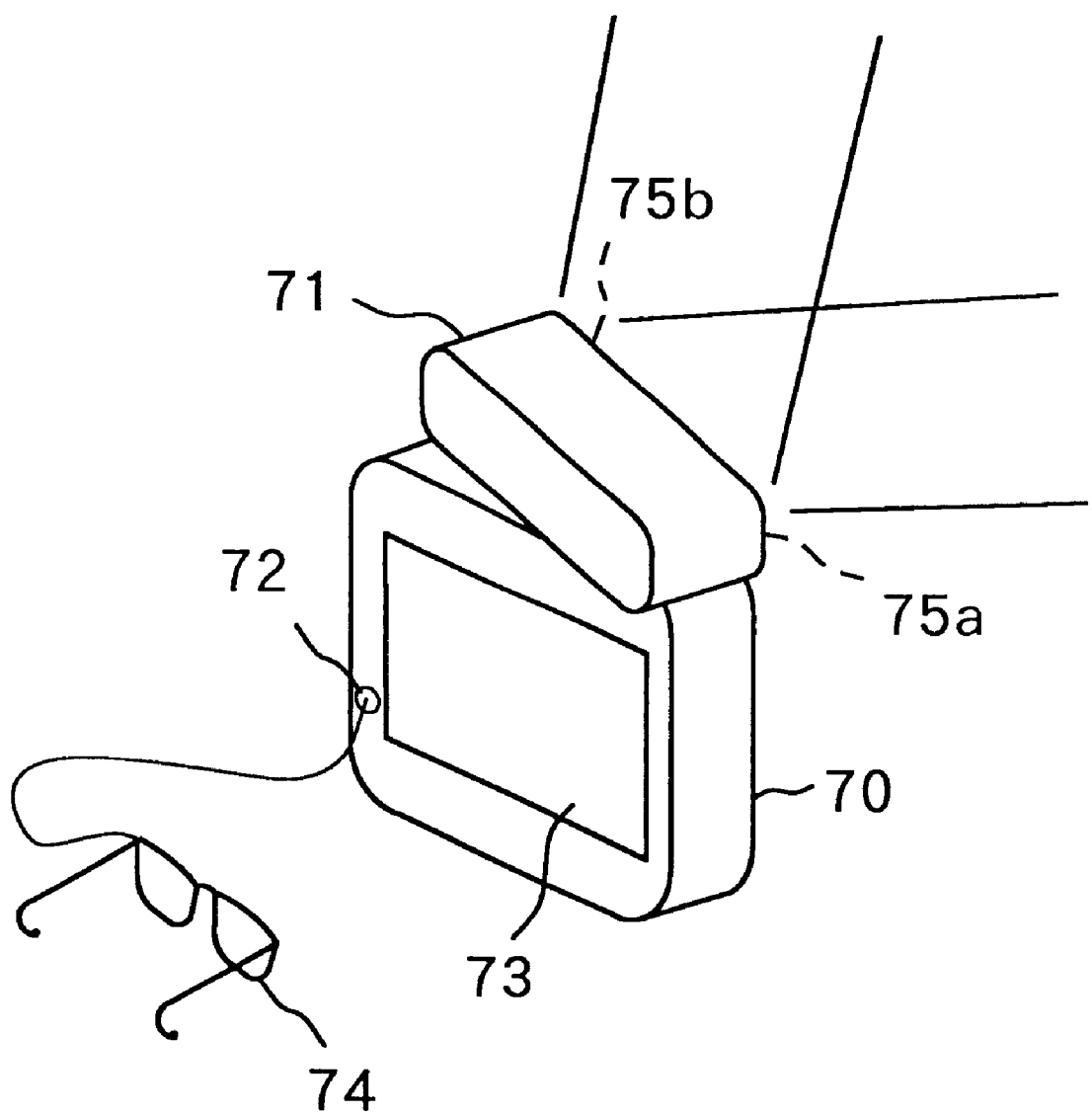
FIG. 13 is a perspective view of the binocular camera according to the second embodiment.

Note that FIG. 12A is a front view of a binocular camera according to a modification of the second embodiment, FIG. 12B is a rear view of the camera, and FIG. 13 is a perspective view of the camera.

As shown in FIGS. 12A and 12B, the binocular camera of this embodiment comprises a camera main body 70, a single camera head 71 which is attached to the upper portion of the camera main body 70 and has lenses 75a and 75b on the front side, a connector 72 which is arranged on the rear side of the camera main body 70 to connect spectacles 74 with shutters to the camera main body 70, and a stereoscopic display 73 arranged on the rear side of the camera;main body 70.

The camera head 71 can rotate about a vertical axis upon image sensing, as shown in FIG. 13. The spectacles 74 with shutters can open/close right and left shutters in synchronism with the display timing of an image signal on the stereoscopic display 73, and can independently display right and left parallax image signals on the right and left eyes of the operator. For this reason, the display period of an image signal upon sensing a three-dimensional image signal becomes twice that upon displaying a two-dimensional image signal.

Figure 14:
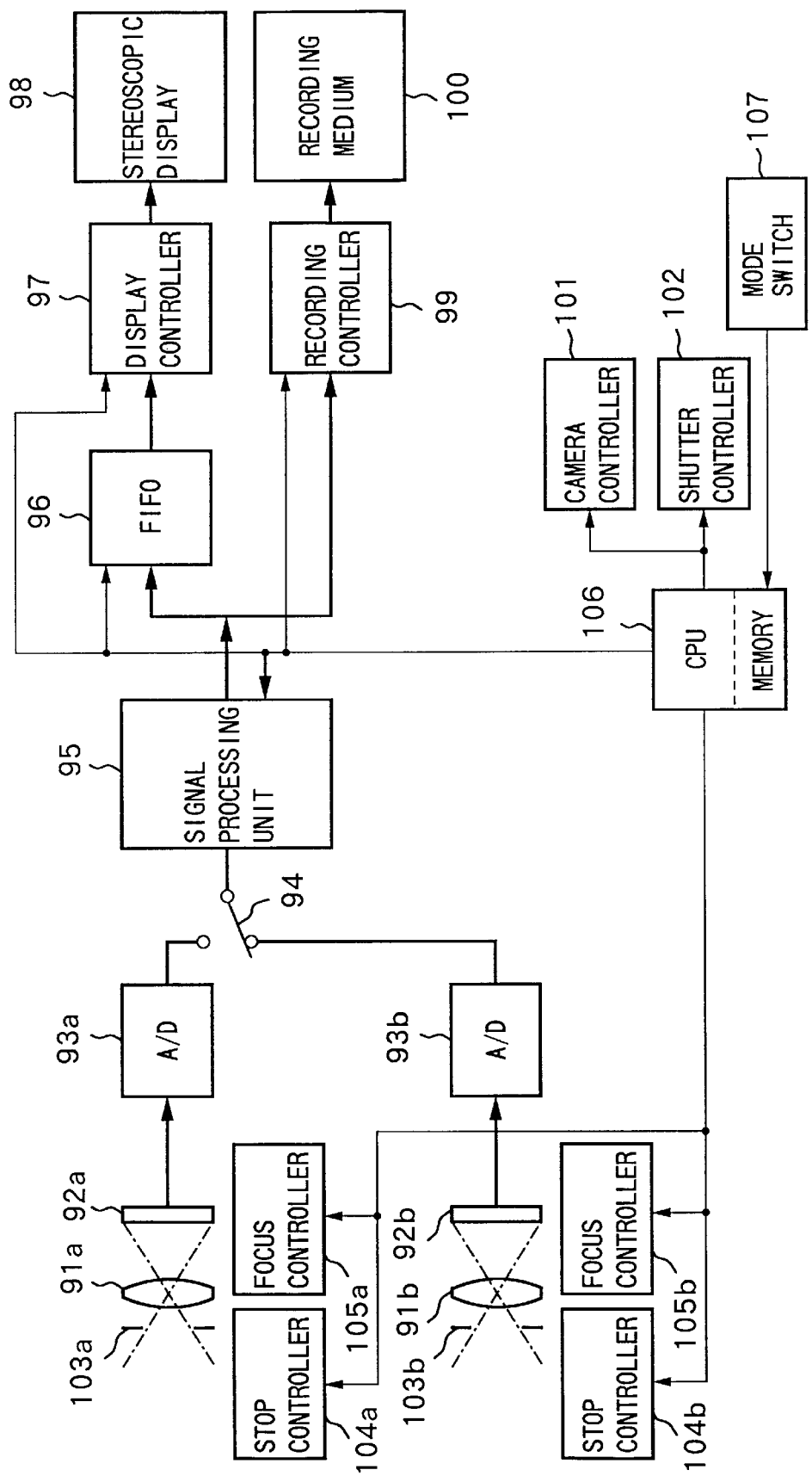
FIG. 14 is a block diagram showing the arrangement of the binocular camera according to the second embodiment.

The arrangement of the binocular camera according to the second embodiment will be described below with reference to FIG. 14. FIG. 14 is a block diagram of the binocular camera according to the second embodiment.

The binocular camera of this embodiment comprises two lenses 91a and 91b, two image sensing devices 92a and 92b, two A/D converters 93a and 93b, a switch 94, a unit 95, a FIFO 96, a display controller 97, a stereoscopic display 98, a recording controller 99, a recording medium 100, a camera controller 101, a shutter controller 102, stops 103a and 103b, stop controllers 104a and 104b, focus controllers 105a and 105b, and a CPU 106 with an internal memory.

The image sensing devices 92a and 92b are connected to the unit 95 via the A/D converters 93a and 93b and the switch 94. The unit 95 is connected to the FIFO 96 and the recording controller 99. The FIFO 96, the display controller 97, and the stereoscopic display 98 are connected in series with each other, and the recording controller 99 is connected to the recording medium 100. The FIFO 96, the display controller 97, the recording controller 99, the camera controller 101, the shutter controller 102, the stop controllers 104a and 104b, and the focus controllers 105a and 105b are connected to the CPU 106.

The image sensing devices 92a and 92b comprise CCDs, and the like, and convert images sensed via the lenses 91a and 91b into electrical signals by a photoelectric conversion effect. The A/D converters 93a and 93b convert these electrical signals into digital signals. The digital signals are two-dimensional image signals. The switch 94 is used for alternately transmitting right and left two-dimensional image signals input from the right and left A/D converters 93a and 93b to the unit 95. The unit 95 performs calculations for AF (auto-focusing) and AE (auto-exposure) and white-balance adjustment. The FIFO 96 temporarily stores a two-dimensional image signal to be displayed on the stereoscopic display 98, and the display controller 97 displays the two-dimensional image signal stored in the FIFO 96 on the stereoscopic display 98. The recording controller 99 writes a two-dimensional image signal in the recording medium 100. The camera controller 101 transmits an input signal indicating contents input by the operator to the CPU 37, and the shutter controller 102 controls driving of the spectacles 74 with shutters. The stop controllers 104a and 104b control the stops 103a and 103b, and the focus controllers 105a and 105b control the positions of the lenses 91a and 91b. The CPU 106 controls the FIFO 96, display controller 97, recording controller 99, camera controller 101, shutter controller 102, stop controllers 104a and 104b, and focus controllers 105a and 105b.

The operator selects a three-dimensional image mode or a normal image mode via a mode selection switch 107, and inputs the desired image mode to the camera controller 101. Assume that the three-dimensional image mode is selected. The mode selection result is supplied from the camera controller 101 to the CPU 106, which controls the individual units. Images sensed via the lenses 91a and 91b by the operator are formed on the image sensing devices 92a and 92b. Furthermore, the images formed on the image sensing devices 92a and 92b are photoelectrically converted into electrical signals, which are then converted into digital signals by the A/D converters 93a and 93b. These digital signals are two-dimensional image signal. Since the switch 94 alternately and separately sends the right and left two-dimensional signals to the unit 95, the display period of an image signal upon displaying a three-dimensional image signal becomes twice that upon displaying a two-dimensional image signal. Hence, the read speed of electrical signals from the image sensing devices 92a and 92b by the A/D converters 93a and 93b upon sensing a three-dimensional image signal is twice that upon sensing a two-dimensional image signal. In this case, all the data of the electrical signal are read out from one of the right and left image sensing devices 92a and 92b, and thereafter, the electrical signal is read out from the other image sensing device. Such control of the individual units is done by the CPU 106.

The right and left two-dimensional image signals are sent to the unit 95 to be subjected to calculations for AF (auto-focusing) and AE (auto-exposure) and white balance adjustment. These AF and AE calculations are done using the luminance values of pixel signals in a given area in the image, and the calculation results are sent to the CPU 106.

The CPU 106 determines an appropriate control amount on the basis of the calculation results from the unit 95, the currently held states of the stops 103a and 103b, and the positions of the lenses 91a and 91b, and sends the control amount to the stop controllers 104a and 104b and the focus controllers 105a and 105b. The stop controllers 104a and 104b adjust the stops 103a and 103b on the basis of the control amount, and the focus controllers 105a and 105b adjust the positions of the lenses 91a and 91b on the basis of the control amount.

Since the unit 95 alternately receives the right and left two-dimensional image signals via the switch 94, the control processes in the stop controllers 104a and 104b and the focus controllers 105a and 105b are alternately done in correspondence with the reception timings.

The two-dimensional image signals subjected to white balance adjustment by the unit 95 are displayed on the stereoscopic display 98 or are recorded in the recording medium 100.

When the three-dimensional image display mode is selected at the camera controller 101, the right and left two-dimensional image signals are sequentially sent to the display controller 97 via the FIFO 96, and are alternately displayed on the stereoscopic display 98. In synchronism with the right-and-left switching timings of these two-dimensional image signals, the CPU 106 sends a synchronization signal to the shutter controller 102, which generates a signal for driving the spectacles 74 with shutters. The generated signal is sent to the spectacles 74 with shutters via the external terminal 72. The spectacles 74 with shutters alternately switches the open/closed states of the right and left shutters in synchronism with the display timings of the two-dimensional image signals on the stereoscopic display 98 in accordance with the driving signal. With this control, a three-dimensional image signal is displayed for the operator.

When the display mode of a right parallax image signal is selected at the camera controller 101, the CPU 106 controls the FIFO 96 to display the right parallax image signal alone on the stereoscopic display 98. The CPU 106 sends a read control signal to the FIFO 96. When the two-dimensional image signal sent from the unit 95 to the FIFO 96 is a right parallax image signal, the CPU 106 sends a write control signal to the FIFO 96, which records the right parallax image signal, and thereafter, sequentially outputs the recorded right parallax image signal to the display controller 97. The right parallax image signal output from the FIFO 96 is displayed on the stereoscopic display 98 via the display controller 97. On the other hand, when the two-dimensional image signal sent from the unit 95 to the FIFO 96 is a left parallax image signal, the CPU 106 sends a read control signal alone to the FIFO 96. Since the FIFO 96 does not record the left parallax image, signal but the right parallax image signal sent immediately before the left parallax image signal, the FIFO 96 displays the immediately preceding right parallax image signal on the stereoscopic display 98 again via the display controller When the display mode of a left parallax image signal is selected at the camera controller 101, the CPU 106 controls the FIFO 96 to display the left parallax image signal alone on the stereoscopic display 98 as in the case wherein the display mode of the right parallax image signal is selected.

In this manner, by controlling the FIFO 96, the display mode can be easily switched between the three-dimensional image display mode and the two-dimensional image display mode. On the other hand, the operator can temporarily display a three-dimensional image signal on the stereoscopic display 98, and thereafter, can switch the display mode to display a two-dimensional image signal on the stereoscopic display 98. Hence, the operator can adjust stereoscopic expression using the three-dimensional image signal, and thereafter, can adjust framing using the two-dimensional image signal.

Note that the display period upon displaying a two-dimensional image signal is substantially half that upon displaying a three-dimensional image signal.

The three-dimensional image signal is reproduced in the same manner as in the first embodiment. On the other hand, when a two-dimensional image signal from one of the right and left lenses is to be displayed and recorded, the switch 94 is switched to display and record a two-dimensional image signal from only one lens. In this case, the CPU 106 controls the individual units so that the processing period of a two-dimensional image signal becomes half that of a three-dimensional image signal. Note that the CPU 106 does not send any driving signal to the shutter controller 102 to stop driving of the spectacles 74 with shutters.

<Advantages of Second Embodiment>

As described above, according to the second embodiment, a three- or two-dimensional image signal can be displayed or recorded.

Even when two-dimensional image signals are recorded, if they need not be observed as a three-dimensional image signal, the two-dimensional image signal can be displayed. For this reason, even when the operator removes the spectacles 74 with shutters during displaying on the stereoscopic display 98, he or she can observe a flicker-free two-dimensional image signal.

Note that the camera according to the second embodiment can be used in image sensing of both moving images and still images.

<Third Embodiment> ... Automatic Mode Determination

The binocular cameras in the first and second embodiments described above are set in one of the stereoscopic view mode and the two-dimensional image display mode in accordance with the operator's setting. In the third embodiment, an optimal one of the two modes is automatically set on the basis of the deviation between the pivot angles (tilt angles) of the right and left lens systems.

Figure 15:
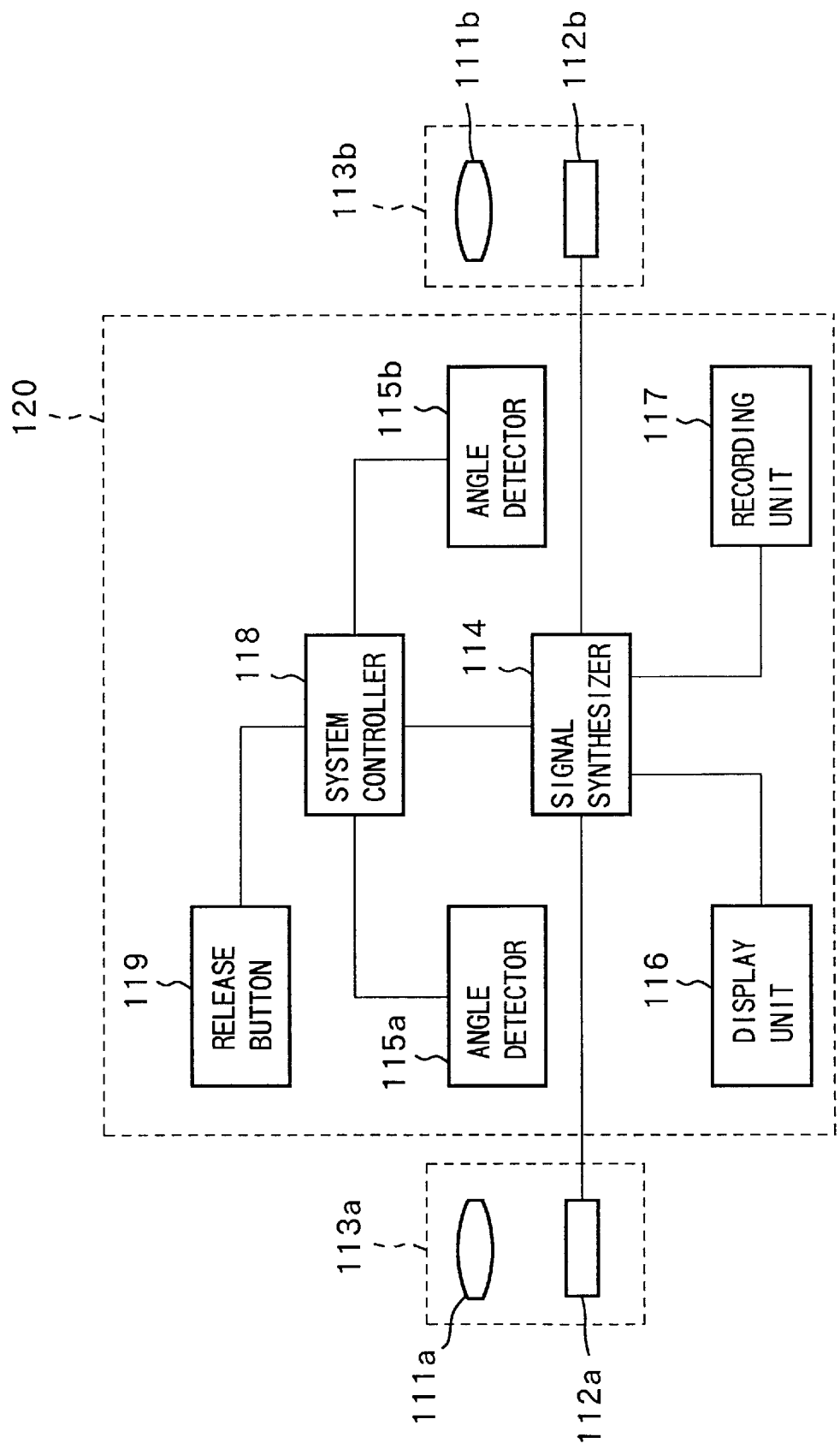
FIG. 15 is a block diagram showing the arrangement of a binocular camera according to the third embodiment of the present invention.

The arrangement of the binocular camera according to the third embodiment of the present invention will be explained below with the aid of FIG. 15.

The binocular camera according to the third embodiment comprises camera heads 113a and 113b, and a binocular camera main body 120. The camera heads 113a and 113b comprise lenses 111a and 111b, and image sensing devices 112a and 112b, and the binocular camera main body 120 comprises a signal synthesizer 114 for synthesizing signals from the image sensing devices 112a and 112b, angle detectors 115a and 115b for detecting the pivot angles of the camera heads, a display unit 116, a recording unit 117, a system controller 118, and a release button 119.

The image sensing devices 112a and 112b, the display unit 116, the recording unit 117, and the system controller 118 are connected to the signal synthesizer 114. The camera heads 113a and 113b are respectively connected to the angle detectors 115a and 115b, and the angle detectors 115a and 115b and the release button 119 are connected to the system controller 118.

The arrangement of the binocular camera will be described in more detail below. The lenses 111a and 111b have focus adjustment units and stop adjustment units (neither are shown). The image sensing devices 112a and 112b convert optical images formed via the lenses 111a and 111b into electrical image signals. The camera heads 113a and 113b are pivotal about a horizontal axis with respect to the binocular camera main body 120.

Figure 16:
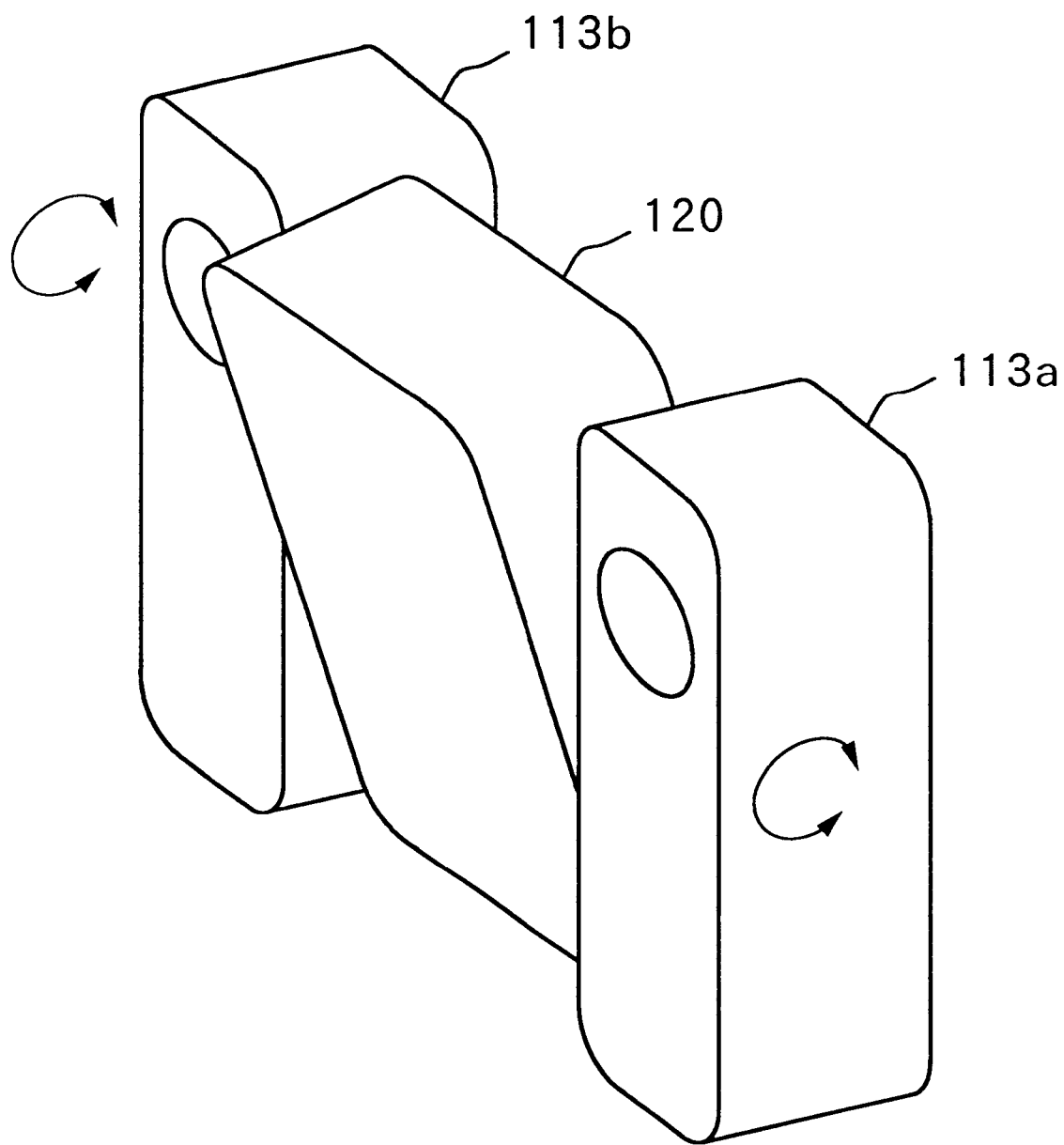
FIG. 16 is a perspective view showing the outer appearance of the binocular camera according to the third embodiment.

FIG. 16 shows the outer appearance of the binocular camera according to the third embodiment. As can be seen from FIG. 16, the camera heads 113a and 113b are pivotal about the horizontal axis with respect to the binocular camera main body 120.

The signal synthesizer 114 generates a two- or three-dimensional image signal on the basis of the image signals obtained by the image sensing devices 112a and 112b. The angle detectors 115a and 115b respectively detect the pivot angles of the camera heads 113a and 113b. In this embodiment, rotary encoders are used as the angle detectors 115a and 115b.

Figure 17:
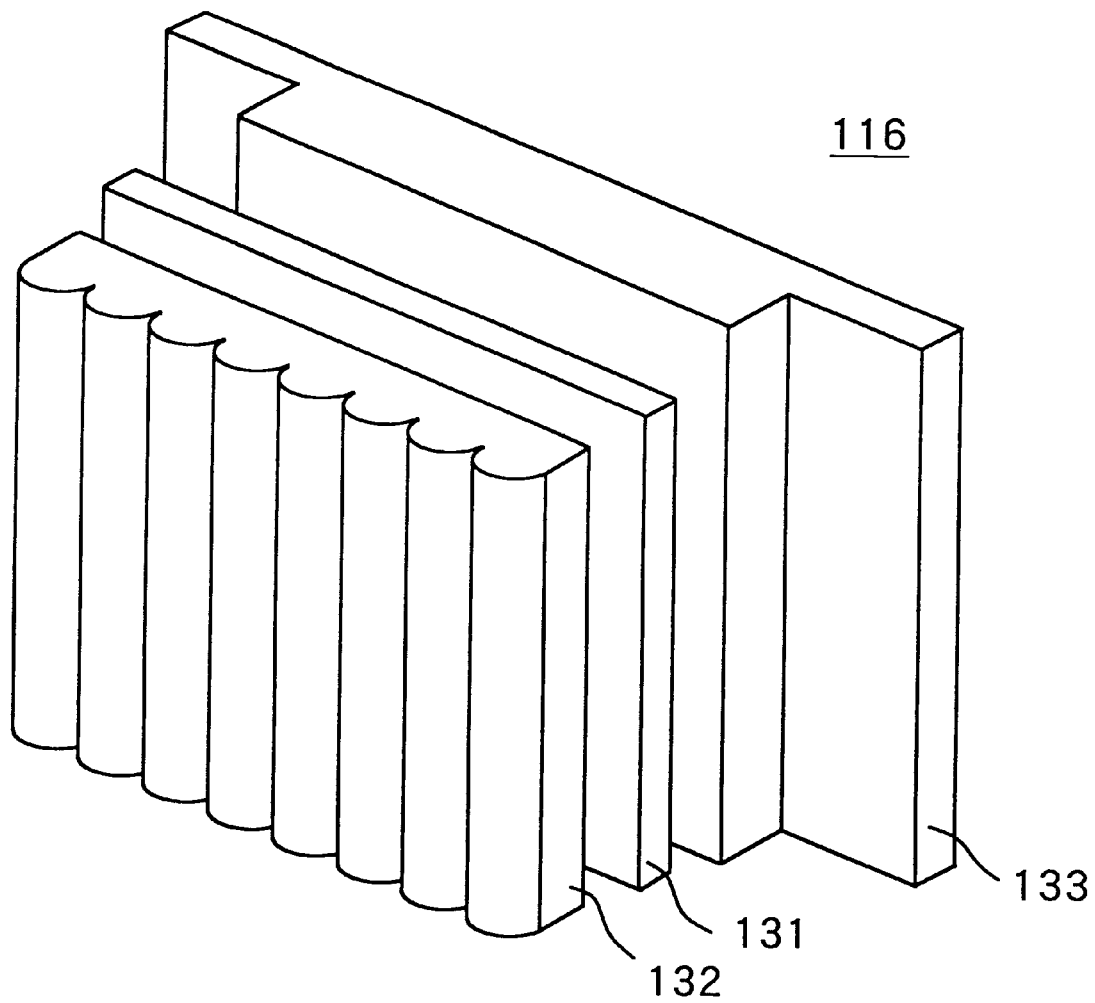
FIG. 17 is a perspective view showing the arrangement of a display unit 116.
Figure 18:
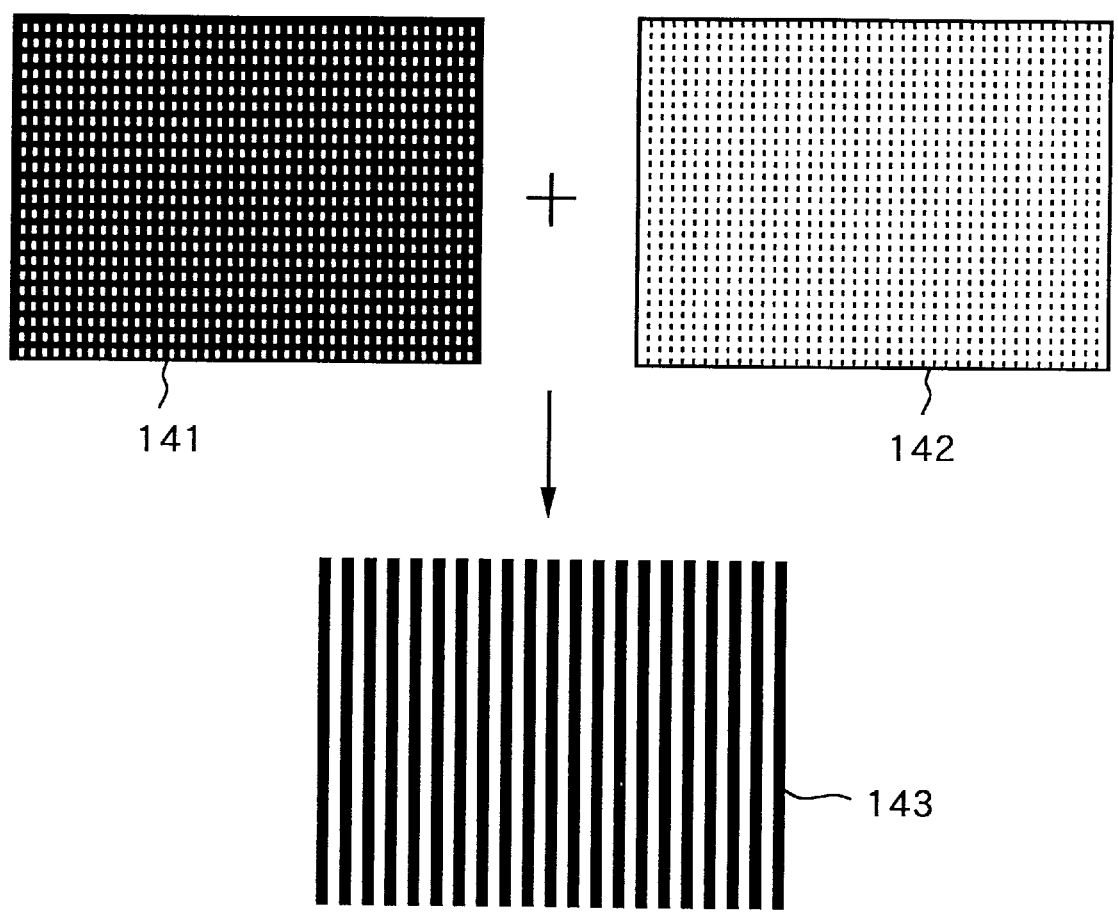
FIG. 18 is a view for explaining the state wherein two-dimensional parallax; image signals are synthesized and converted into a three-dimensional image signal.

The display unit 116 displays a two- or three-dimensional image signal obtained by the signal synthesizer 114. FIG. 17, shows the arrangement of the display unit 116. Referring to FIG. 17, a liquid crystal panel 131 has a large number of display pixels, and a lenticular lens 132 with U-shaped lens units is arranged on the front surface side of the liquid crystal panel 131. A backlight 133 is arranged on the rear surface side of the liquid crystal panel 131. Since the display unit 116 has such arrangement, it displays, on the liquid crystal panel 131, a three-dimensional image signal 143 synthesized by alternately arranging two-dimensional image signals 141 and 142 having predetermined parallax at a predetermined pitch, as shown in FIG. 18 that shows the synthesis process of two-dimensional image signals. The above-mentioned pitch corresponds to the pitch of the lenticular lens 132. The three-dimensional image signal 143 displayed on the panel 131 allows the observer to experience stereoscopic view via the lenticular lens 132.

Note that such three-dimensional image display apparatus using the lenticular lens 132 is known to those who are skilled in the art, as described in Japanese Patent Laid-Open No. 3-65943, and the like, and a detailed description thereof will be omitted. As stereoscopic view systems, a system that uses a parallax barrier in place of the lenticular lens 132, and a system which alternately and time-divisionally displays image signals for the right and left eyes, and allows an observer with spectacles having a shutter function to experience stereoscopic view so that the image signal for the left eye is observed by only the left eye, and the image signal for the right eye by only the right eye, are available. However, since these systems are already known to those who are skilled in the art, a detailed description thereof will be omitted.

Referring back to FIG. 15, the recording unit 117 records an image signal obtained by the signal synthesizer 114. The system controller 118 controls the entire binocular camera of this embodiment. The release button 119 generates a recording start signal of an image signal when it is operated by the operator.

Figure 19:
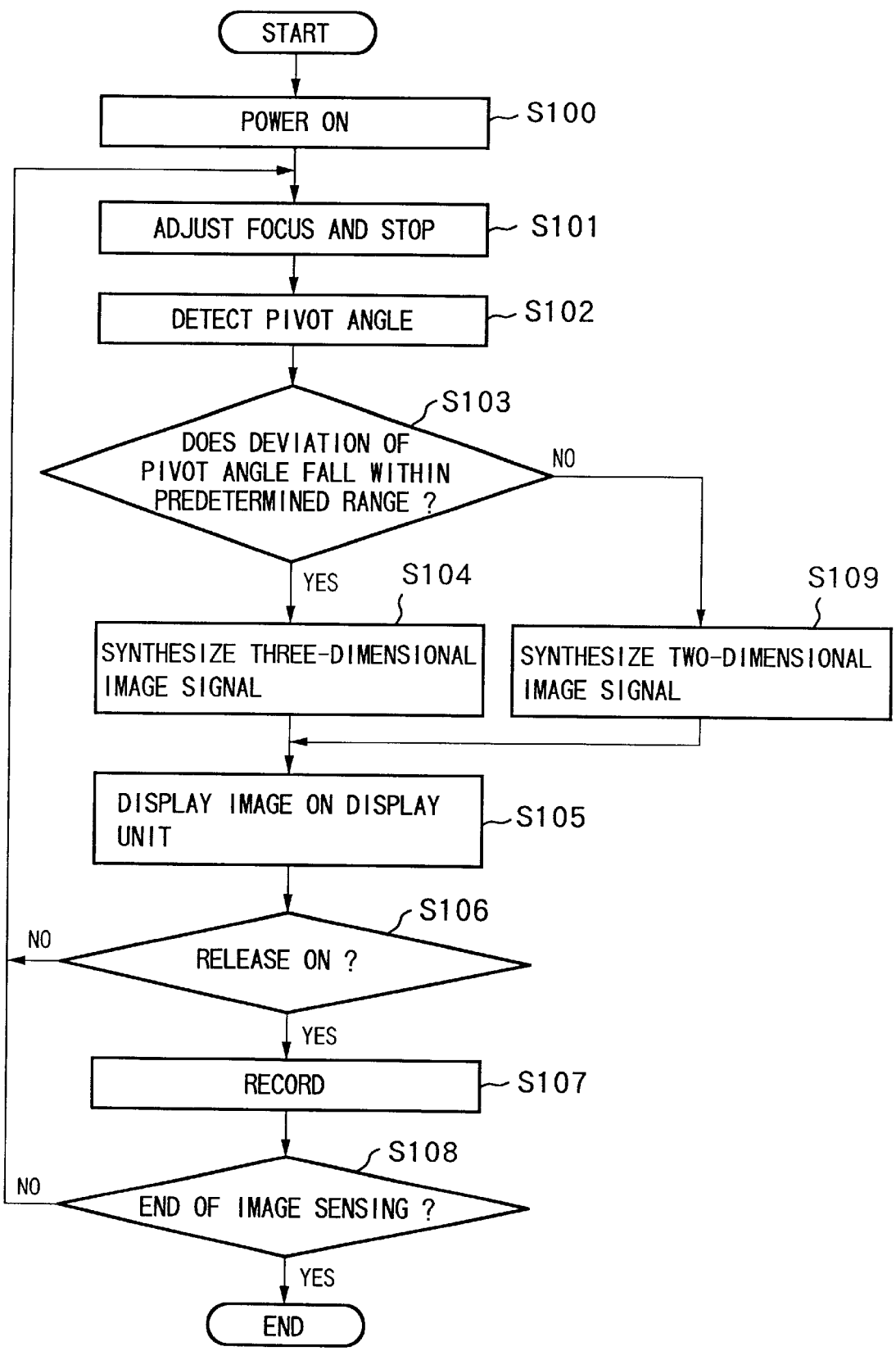
FIG. 19 is a flow chart showing the image sensing by the binocular camera according to the third embodiment.

The image sensing by the binocular camera according to the third embodiment of the present invention will be explained below with reference to FIG. 19. Note that all the operations of the binocular camera according the third embodiment are controlled by the system controller 118 unless otherwise specified.

When a power switch; (not shown) of the binocular camera is turned on (step S100), focus and stop adjustments are performed for an object (step S101).

The angle detectors 115a and 115b respectively detect the pivot angles of the camera heads 113a and 113b (step S102).

In step S103, it is checked if a relative deviation amount $\delta(=\theta_a-\theta_b)$ between the pivot angles ($\theta_a$ and $\theta_b$) of the camera heads 113a and 113b falls within a predetermined range, i.e., for example:

$$|\delta|<\epsilon$$

If it is determined in step S103 that the deviation amount $\delta$ falls within the predetermined range, two-dimensional parallax image signals 141 and 142 obtained by the image sensing devices 112a and 112b are synthesized by the signal synthesizer 114 into a single three-dimensional image signal 143 in which right and left parallax image signal portions are alternately arranged interdigitally (FIG. 18) (step S104). The synthesized three-dimensional image signal is displayed on the display unit 116, and the operator can stereoscopically observe the object image (step S105).

When the deviation amount $\delta$ falls within the predetermined range, this means that the tilt angles of the right and left optical systems have no deviation therebetween, and it is easy to obtain an image fusing state for stereoscopic view.

It is checked in step S106 if the operator has turned on the release button 119. If it is determined in step S106 that the operator has turned on the release button 119, the three-dimensional image signal 143 synthesized by the signal synthesizer 114 is recorded in the recording unit 117 (step S107). Thereafter, it is checked in step S108 if the image sensing by the binocular camera of this embodiment is to end. If the image sensing is to end, the power switch of the binocular camera is turned off; otherwise, the flow returns to step S101.

Figure 20B:
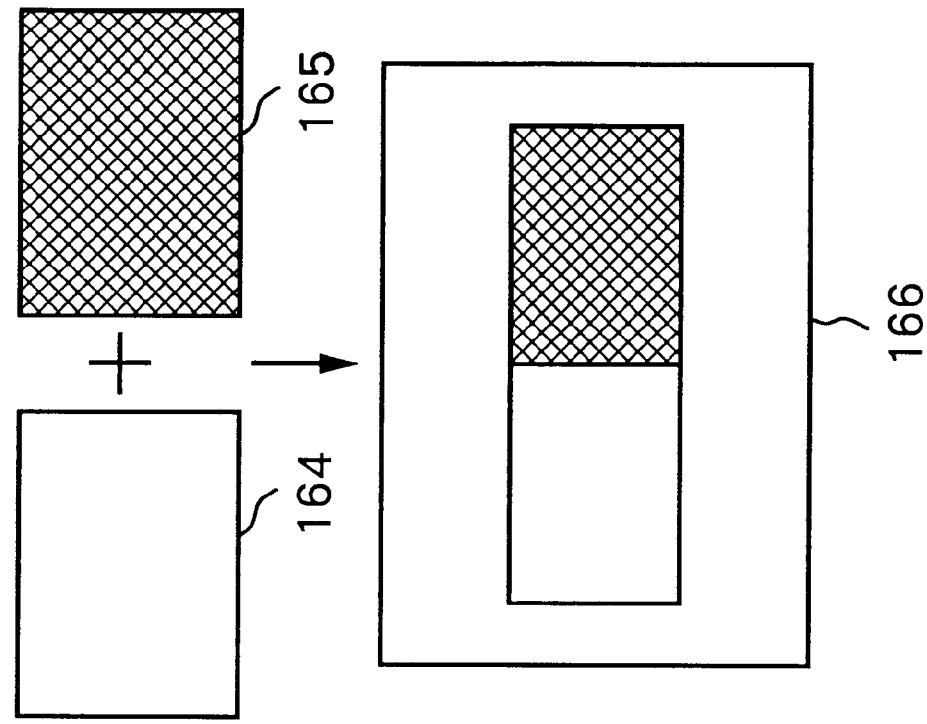
FIG. 20B is a view showing the synthesizing process of two-dimensional image signals according to the fourth embodiment of the present invention.
Figure 20A:
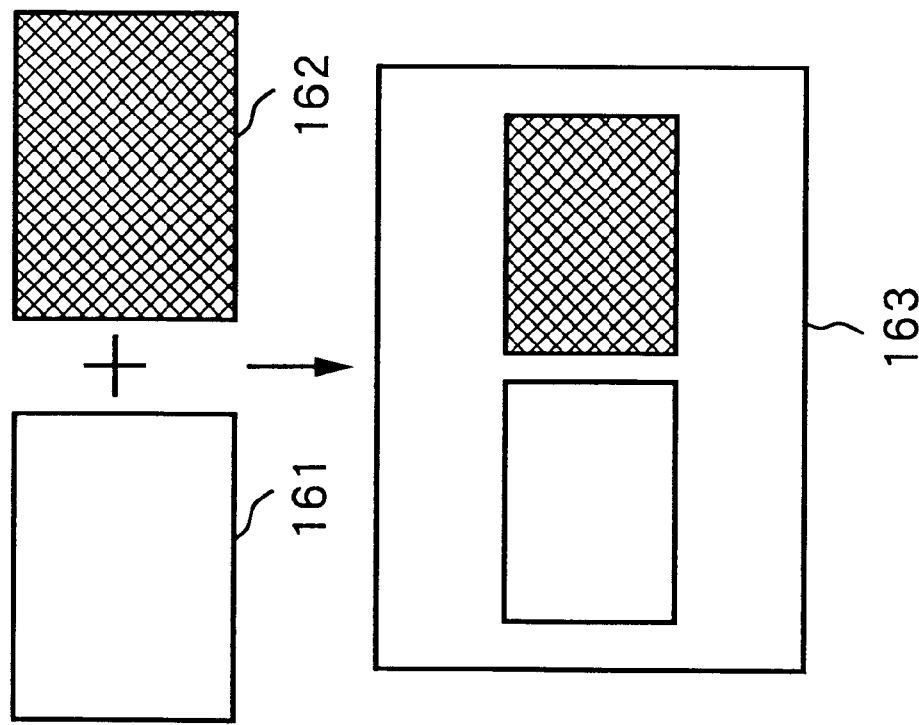
FIG. 20A is a view showing the synthesizing process of two-dimensional image signals.

On the other hand, if it is determined in step S103 that the deviation amount $\delta$ falls outside the predetermined range, two-dimensional image signals 161 and 162 obtained by the image sensing devices 112a and 112b are synthesized as a two-dimensional image signal 163 including independent images by the signal synthesizer 114 (step S109), as shown in FIG. 20A that shows the synthesis process of the two-dimensional image signals. Thereafter, the flow advances to step S105.

When the deviation amount $\delta$ falls outside the predetermined range, in the extreme case, the tilt angles of the right and left lens systems vertically largely deviate from each other, and in such case, an image fusing state is hardly obtained.

If it is determined in step S106 that the operator has not turned on the release button 119, the flow returns to step S101.

In this manner, one image sensing by the binocular camera according to the third embodiment ends.

As described above, according to the third embodiment, since the display unit 116 adopts the lenticular lens 132, the operator need not wear dedicated spectacles such as polarization spectacles or the like even when a three-dimensional image signal is displayed.

<Fourth Embodiment> . . . Automatic Mode Determination

The third embodiment automatically determines one of the three- and two-dimensional display modes on the basis of the deviation amount of the tilt angles of the right and left lens systems which are pivotal about a horizontal axis. However, the fourth embodiment automatically determines the current mode to be set in the binocular camera from the stereoscopic view display mode, a panoramic view mode, and a normal image sensing mode on the basis of the deviation amount of the pan angles of the right and left lens systems which are pivotal about vertical axes.

The outer appearance of the binocular camera according to the fourth embodiment of the present invention will be explained below with reference to FIG. 21A.

Figure 21A:
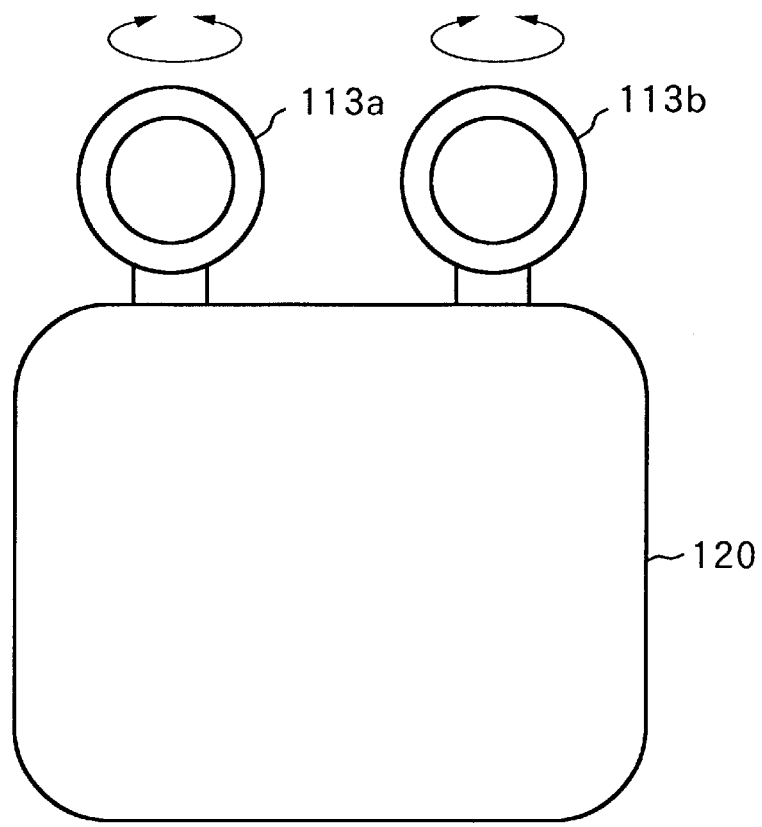
FIG. 21A is a front view showing the outer appearance of a binocular camera according to the fourth embodiment.

Referring to FIG. 21A, the difference in the binocular camera of this embodiment from the outer appearance of the binocular camera of the third embodiment shown in FIG. 16 is that the camera heads 113a and 113b are respectively arranged on the upper portion of the binocular camera main body 120 in place of arranging them on the right and left sides of the binocular camera main body 120. With this arrangement, the camera heads 113a and 113b can pivot about vertical axes. Note that the arrangement of the binocular camera is the same as that shown in FIG. 15.

The image sensing by the binocular camera according to the fourth embodiment of the present invention will be described below with reference to FIG. 22. Note that all the operations of the binocular camera according the fourth embodiment are controlled by the system controller 118 unless otherwise specified.

When a power switch (not shown) of the binocular camera is turned on (step S200), focus and stop adjustments are performed for an object (step S201).

Subsequently, the angle detectors 115a and 115b respectively detect the pivot angles (i.e., pan angles θ) of the camera heads 113a and 113b (step S202).

Figure 21B:
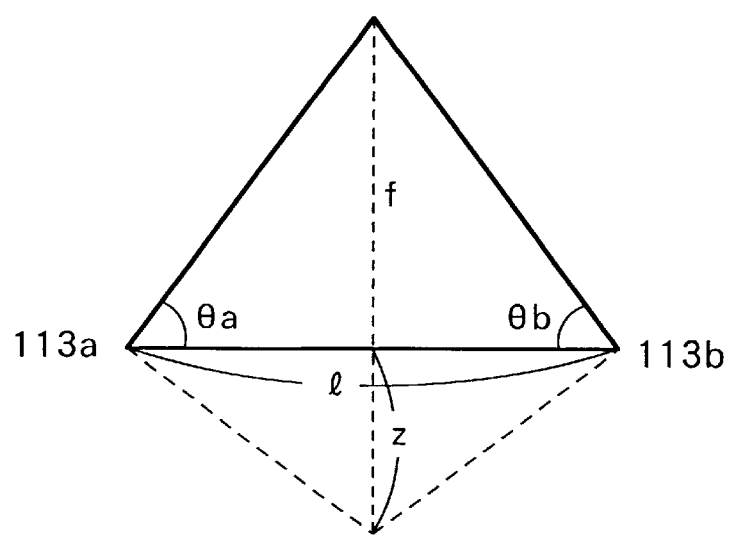
FIG. 21B is a view for explaining the detection principle of the overlapping amount according to the fourth embodiment.

In step S203, the overlapping amount of the fields of view of the camera heads 113a and 113b is calculated on the basis of the pivot angles $\theta_a$ and $\theta_b$ of the camera heads 113a and 113b, the focal lengths (f: common to the two lenses) of the lenses 111a and 111b, an in-focus distance z, a distance Q between the image sensing optical axes of the two heads, and the like in accordance with FIG. 21B, and it is checked if the calculated overlapping amount is larger than a predetermined value.

If it is determined in step S203 that the overlapping amount is larger than the predetermined value, it is determined that the directions of the camera heads 113a and 113b are suitable for stereoscopic view since an image fusing state is easy to obtain, and two-dimensional image signals 141 and 142 obtained by the image sensing devices 112a and 112b are synthesized by the signal synthesizer 114 into a single three-dimensional image signal 143 in which right and left parallax image signal portions are alternately arranged interdigitally, as shown in FIG. 18 (step S204). The synthesized three-dimensional image signal 143 is displayed on the display unit 116, and the operator can visually observe a wide panoramic image or images in two different directions (step S205).

It is checked in step S206 if the operator has turned on the release button 119. If it is determined in step S206 that the operator has turned on the release button 119, the three-dimensional image signal 143 synthesized by the signal synthesizer 114 is recorded in the recording unit 117 (step S207).

Thereafter, it is checked in step S208 if the image sensing by the binocular camera of this embodiment is to end. If the image sensing is to end, the power switch of the binocular camera is turned off; otherwise, the flow returns to step S201.

On the other hand, if it is determined in step S203 that the overlapping amount is smaller than the predetermined value, the flow advances to step S209 to check if the overlapping amount is zero.

If it is determined in step S209 that the overlapping amount is not zero, since the two fields of view of the camera heads 113a and 113b partially overlap each other, it is determined that the directions of the camera heads 113a and 113b are not suitable for stereoscopic view but are suitable for panoramic view. In this case, as shown in FIG. 20B that shows the synthesis process of two-dimensional image signals, two-dimensional image signals 164 and 165 obtained by the image sensing devices 112a and 112b are synthesized into a single continuous two-dimensional image 116 by the signal synthesizer 114 (step S210), and thereafter, the flow advances to step S205.

If it is determined in step S209 that the overlapping amount is zero, two-dimensional image signals 161 and 162 obtained by the image sensing devices 112a and 112b are synthesized as a two-dimensional image signal 163 including independent images by the signal synthesizer 114 (step S211), as shown in FIG. 20A that shows the synthesis process of the two-dimensional image signals. Thereafter, the flow advances to step S205.

If it is determined in step S206 that the operator has not turned on the release button 119, the flow returns to step S201.

In this manner, one image sensing by the binocular camera according to the third embodiment ends.

<Advantages of Fourth Embodiment>

As described above, according to the fourth embodiment, the camera heads 113a and 113b are pivotal about vertical axes, and whether the directions of the camera heads are suitable for stereoscopic view or panoramic view can be automatically determined on the basis of the pivot angles of the camera heads.

In both the third and fourth embodiments, image sensing of still images has been discussed, but the present invention is effective for moving images. In both the third and fourth embodiments, an image signal synthesized by the signal synthesizer 114 is recorded, but image signals before synthesis may be recorded.

<Fifth Embodiment>

The fifth to 12th embodiments of the present invention will be explained hereinafter. These fifth to 12th embodiments are directed to improvements upon applying the multi-eye image sensing apparatus of the present invention to an information processing apparatus such as a personal computer or the like. Note that the fifth to 12th embodiments use a binocular camera as an example of the multi-eye image sensing apparatus.

Figure 23:
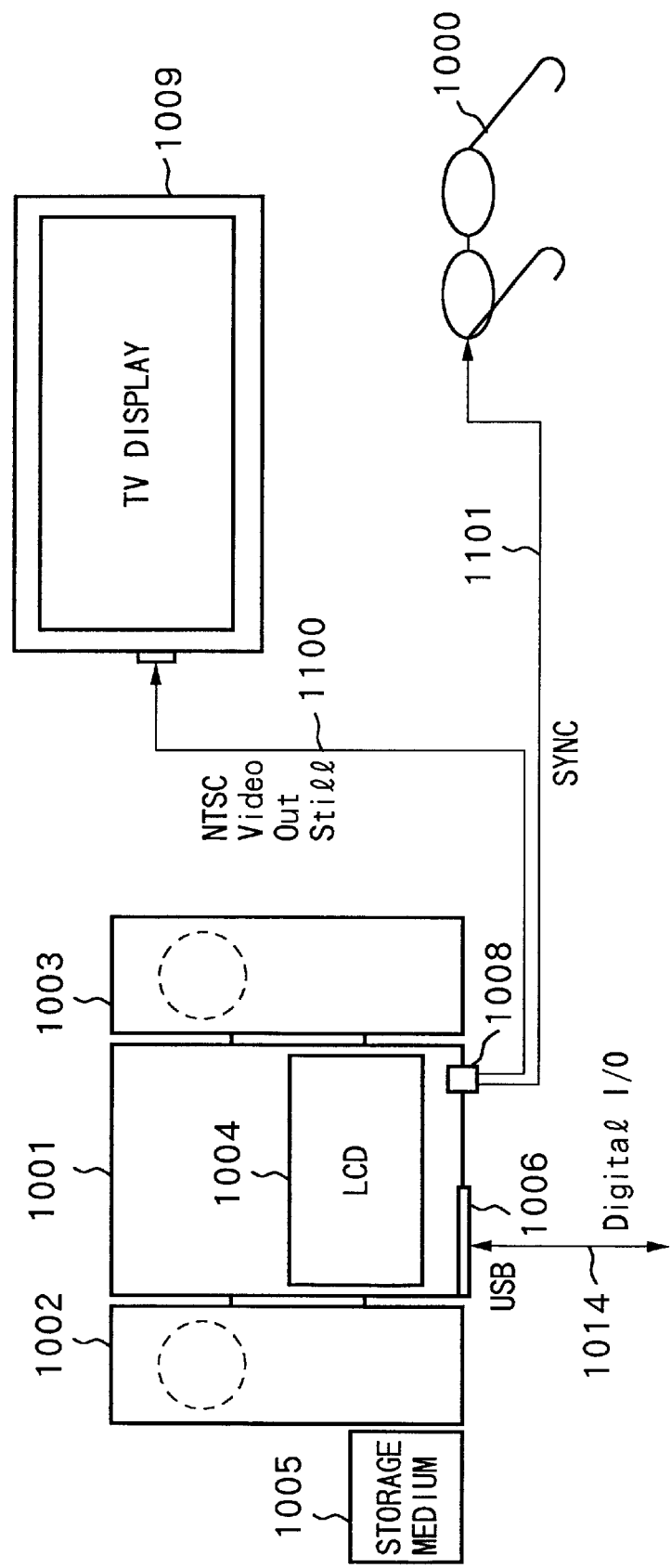
FIG. 23 is a diagram showing the arrangement of a system according to the fifth embodiment of the present invention.

FIG. 23 shows the arrangement of a system according to the fifth embodiment of a binocular camera of the present invention.

Referring to FIG. 23, reference numeral 1001 denotes a camera main body of the binocular camera; and 1002 and 1003, right and left image sensing optical systems, each including a lens barrel that houses a lens, and an image sensing device such as a CCD or the like. Reference numeral 1004 denotes a liquid crystal display that can perform three-dimensional display; 1005, a storage medium; 1006, an interface for exchanging a digital signal with an external device; and 1014, a digital signal. Reference numeral 1008 denotes an output terminal for sending an image signal and a synchronization signal to a TV display and liquid crystal shutter spectacles; 1100, an image signal; and 1101, a synchronization signal. Reference numeral 1009 denotes a TV display that receives the image signal 1100; and 1000, liquid crystal shutter spectacles that receive the synchronization signal 1101.

As shown in FIG. 23, the binocular camera is constituted by the camera main body 1001, and the two image sensing optical systems 1002 and 1003, each having a lens in its lens barrel. In order to obtain stereoscopic expression of an image, in the three-dimensional image sensing mode, the image sensing optical systems 1002 and 1003 are set at the right and left sides of the camera main body 1001 to assure a long base distance.

Also, the liquid crystal display 1004 having a display mode that allows the operator to stereoscopically observe right and left parallax images obtained from the image sensing optical systems 1002 and 1003 is arranged on the Camera main body 1001. Although many stereoscopic display schemes have been proposed, this embodiment adopts a scheme using the liquid crystal shutter spectacles 1000. When the operator watches the liquid crystal display 1004 via the liquid crystal shutter spectacles 1000, he or she can observe a three-dimensional image.

Figure 24:
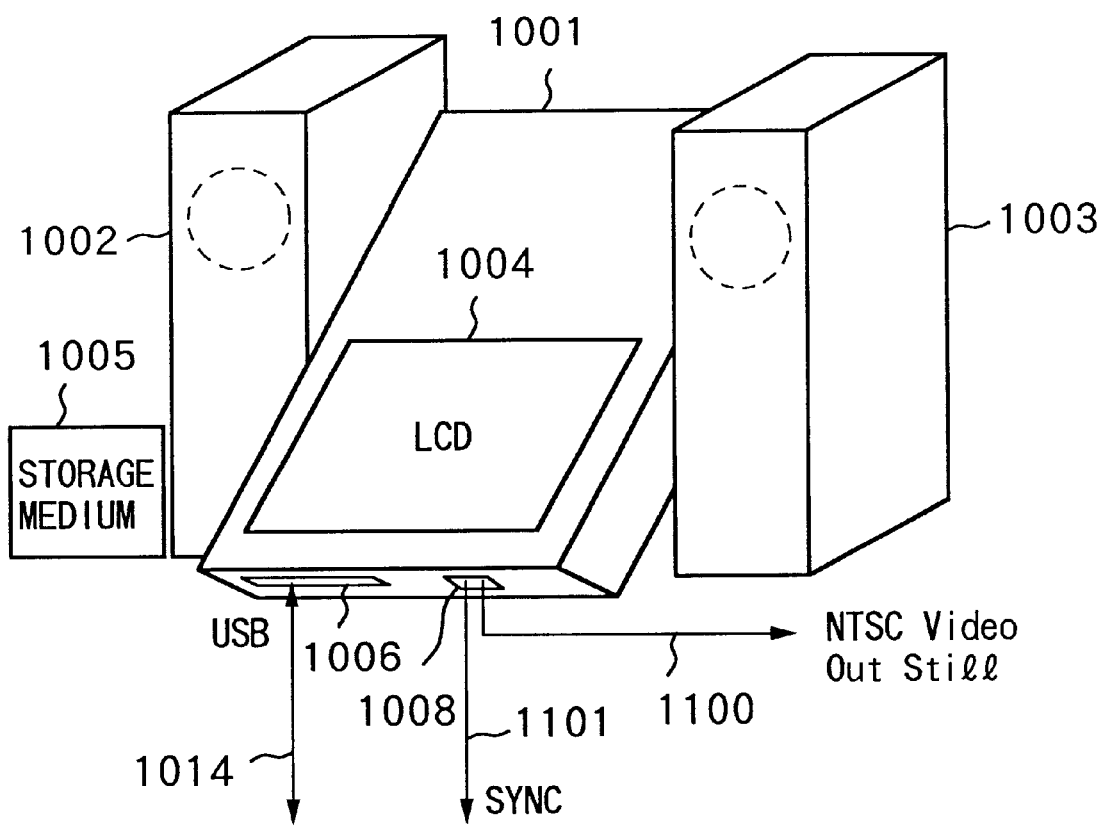
FIG. 24 is a perspective view of a camera according to the fifth embodiment.

In image sensing, as shown in FIG. 24, the user can stereoscopically observe an image sensed by the two image sensing optical systems 1002 and 1003 on the liquid crystal display 1004. The positional relationship between the image sensing optical systems 1002 and 1003, and the liquid crystal display 1004 can be adjusted in the tilt direction in correspondence with the observer, as shown in FIG. 24. The relative positional relationship between the two image sensing optical systems 1002 and 1003 is fixed, and remains the same even when the liquid crystal display 1004 rotates in the tilt direction.

During image sensing or reproduction after image sensing, the observer can observe a three-dimensional image using the liquid crystal display 1004 that can display a three-dimensional image or the TV display 1009. When the observer observes an image on the TV display 1009, the camera main body 1001 outputs the image signal 1100 to the TV display 1009 via the output terminal 1008, and also outputs the synchronization signal 1101 to the liquid crystal shutter spectacles 1000. The liquid crystal shutter spectacles 1000 are also used when an image is observed on the liquid crystal display 1004.

The flow of signals and the flow of processing in the camera upon sensing a three-dimensional image will be described below with reference to FIG. 25.

Figure 25:
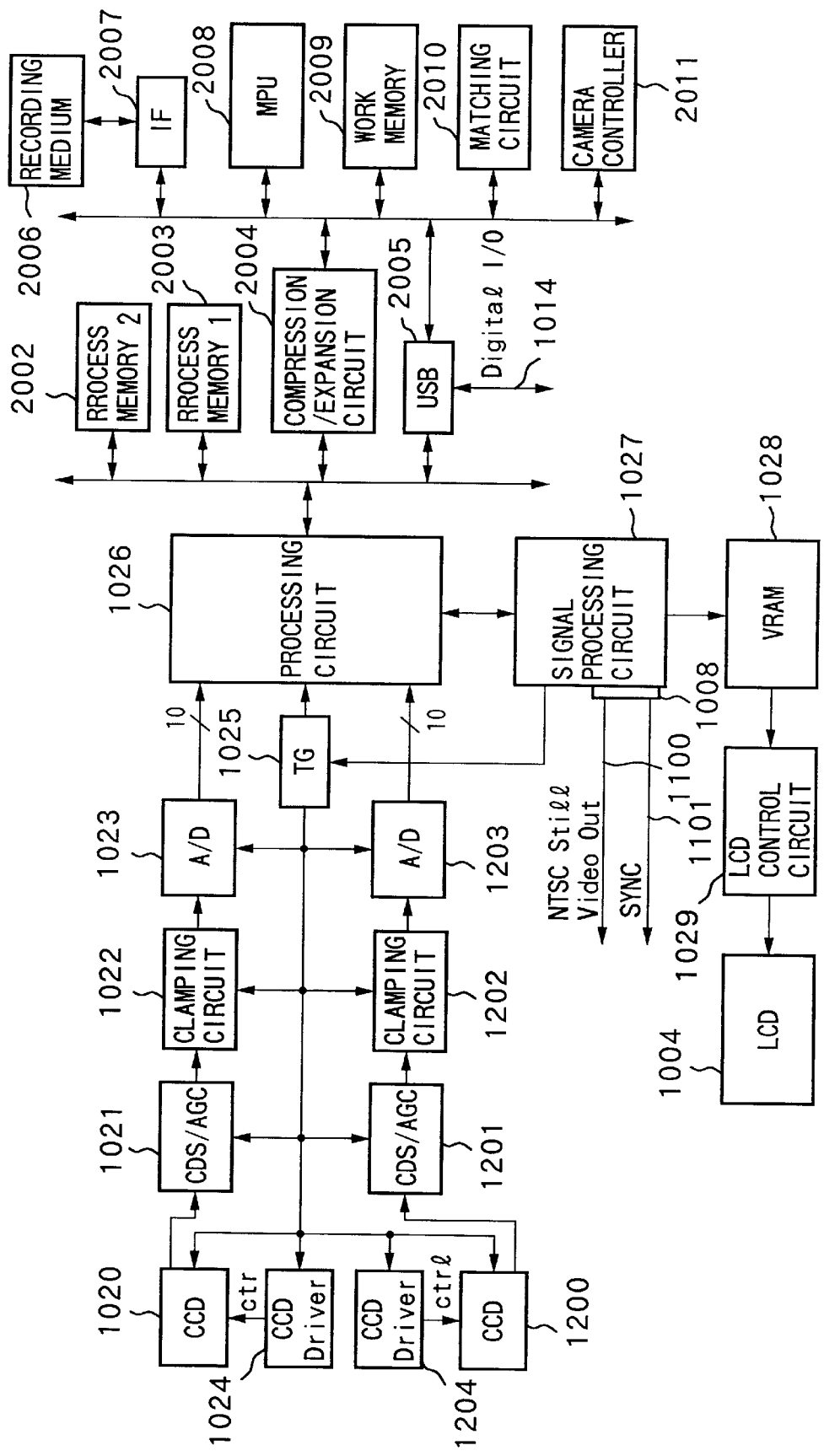
FIG. 25 is a block diagram of a circuit according to the fifth embodiment.

Referring to FIG. 25, reference numerals 1020 and 1200 denote CCDs; 1024 and 1204, CCD drivers; 1021 and 1201, CDS/AGC circuits; 1022 and 1202, clamping circuits; 1023 and 1203, A/D converters; 1025, a timing generator; 1026, a processing circuit; 1027, a signal processing circuit including an external output signal generation controller; 1028, a VRAM; 1029, a liquid crystal display control circuit; 1004, a liquid crystal display shown in FIG. 23; and 2002 and 2003; process memories. Reference numeral 2004 denotes a compression/expansion circuit, which executes, e.g., JPEG compression. Reference numeral 1006 denotes a digital interface such as a USB shown in FIG. 23. Reference numeral 2007 denotes an interface for a recording medium; and 2006, a recording medium, which uses, e.g., a flash memory in this embodiment. Reference numeral 2008 denotes an MPU; 2009, a work memory; 2010, a matching circuit; and 2011, a camera controller.

The operation of this embodiment will be described below.

When the operator inputs an operation such as recording, reproduction, or the like of an image with respect to the camera controller 2011, the camera controller 2011 sends a signal corresponding to the input contents to the MPU 2008, which controls the individual units. Assume that a three-dimensional image sensing mode is selected.

Right and left images sensed by the two image sensing optical systems 1002 and 1003 are formed on the image sensing surfaces of the CCDs 1020 and 1200. These images are photoelectrically converted into electrical signals by the CCDs, and the electrical signals are supplied to the A/D converter 1023 and 1203 via the CDS/AGC circuits 1021 and 1201 and the clamping circuits 1022 and 1202. Then, the electrical image signals are converted into digital signals by the A/D converters. In this case, since the right and left signals to be processed are obtained by synchronously driving the optical systems under the control of the timing generator 1025, right and left images sensed at the same time are processed.

Of the digital signals output from the A/D converters 1023 and 1203, one signal is temporarily saved in the process memory 2003 by the processing circuit 1026. The other signal is supplied to the signal processing circuit 1027 via the processing circuit 1026. In the signal processing circuit 1027, the digital signal is subjected to color conversion processing, and the like, and is converted into a pixel size of the liquid crystal display 1004. Thereafter, the processed signal is transferred to the VRAM 1028. At the same time, the image data is saved again in the process memory 2003 via the processing circuit 1026.

The signal which is not subjected to the color conversion processing yet and saved in the process memory 2002 is sent to the signal processing circuit 1027 via the processing circuit 1026, and is subjected to desired color signal processing. Meanwhile, the signal is saved again in the process memory 2002, and is subjected to desired size conversion. The processed signal is also transferred to the VRAM 1028.

The processing circuit 1026 performs such two-way signal control.

At this time, the signals sensed by the CCDs are held as images in the process memories and the VRAM 1028.

In order to generate a three-dimensional image signal to be displayed on the liquid crystal display 1004 in the binocular camera, the contents of the VRAM 1028 are used. The VRAM 1028 is a display memory, and has a capacity for two frames of an image to be displayed on the liquid crystal display 1004. Since the number of pixels of an image held in the process memories 2003 and 2002 is not always equal to that of an image to be displayed on the liquid crystal display 1004, the signal processing circuit 1027 has functions of performing decimation, interpolation, and the like of such image.

The right and left images written in the VRAM 1028 are displayed on the liquid crystal display 1004 alternately along the time axis via the liquid crystal display control circuit 1029. At this time, the synchronization signal 1101 synchronized with the switching timings of the right and left images is output from the terminal 1008 as one output terminal of the signal processing circuit 1027, and the liquid crystal shutter spectacles 1000 are driven in synchronism with that synchronization signal. In this manner, the observer can observe a three-dimensional image.

On the other hand, in order to generate a three-dimensional image signal to be displayed on the TV display 1009, the contents of the process memories 2002 and 2003 are used. The contents of these process memories are output as the image signal 1100 from the terminal 8 via a video signal interface in the signal processing circuit 1027. At this time, since the synchronization signal is sent to the liquid crystal shutter spectacles 1000 in the same manner as described above, the observer can observe a three-dimensional image using the liquid crystal shutter spectacles 1000.

Image recording will be described below. As the recording medium 2006 that records an image, a magnetic tape, magnetic disk, optical disk, semiconductor memory, and the like can be used. In this embodiment, a flash memory will be exemplified. The interface 2007 to the recording medium 2006 stores a three-dimensional image signal in a digital format as a file in an empty area of the recording medium 2006, and also registers it in a file management area. This processing starts when the user inputs a desired operation for starting recording at the camera controller 2011.

When the user's instruction is detected by the MPU 2008, the contents of the process memory 2002 are sent to the compression/expansion circuit 2004 to compress information. In this embodiment, JPEG is used as a compression scheme. The compressed data is held in the work memory 2009. Similarly, the contents of the process memory 2003 are sent to the work memory 2009 via the compression/ expansion circuit 2004. Thereafter, the right and left compressed images in the work memory are subjected to file management as a pair of images. At that time, identification information for identifying that pair of images is simultaneously recorded in the file management area. The camera user may observe a three-dimensional image on the display without any recording.

The flow of the processing upon sensing a three-dimensional image has been described. The user can stereoscopically observe an image signal sensed by the camera in real time. Since the user can also observe an image on the liquid crystal display 1004 built in the camera main body 1001, the degree of freedom in image sensing is high, and the user can check stereoscopic expression even when he or she moves while holding the camera during image sensing.

Reproduction of a three-dimensional image recorded in the recording medium 2006 will be explained below. Since the recording medium 2006 can record a plurality of three-dimensional image files, the interface 2007 checks the management area on the recording medium 2006, and sends file registration data to the MPU 2008. The MPU 2008 selects files that can be reproduced as three-dimensional images, arranges a list of corresponding file names to an arbitrary display format, and sends the list as data to the display controller to display it on the liquid crystal display 1004. The operator selects the file to be reproduced from the displayed list of files, and inputs it to the camera controller 2011. The input signal is sent from the camera controller 2011 to the MPU 2008, and data of the selected file is read out from the recording medium 2006 via the recording controller 2007. The readout data is transferred to the work memory 2009. Thereafter, the information in the work memory is expanded via the compression/expansion circuit 2004, and the expanded images are supplied to the process memories 2002 and 2003. Finally, as described above, the image data are transferred to the VRAM 1028, and are displayed as a three-dimensional image on the liquid crystal display 1004. In this manner, the sensed three-dimensional image can be easily reproduced.

When microphones (not shown) are arranged together with the image sensing optical systems, a stereophonic effect can also be obtained for a voice together with a stereoscopic effect for an image.

Processing executed upon sensing and reproducing a normal panoramic image as a two-dimensional image will be described below. At this time, the layout of the image sensing optical systems 1002 and 1003 is different from that in the three-dimensional image sensing mode. The image sensing optical systems 1002 and 1003 are set so that their optical axes are not parallel to each other, as has been proposed by the present applicant. As a method of synthesizing two images, a known method described in, e.g., Japanese Patent Laid-Open Nos. 6-141237 and 6-217184 is used, and a detailed description thereof will be omitted. The binocular camera is set in a state wherein the user has selected the panoramic image sensing mode at the camera controller 2011. Upon synthesizing two images, the matching circuit 2010 detects the overlapping amount between right and left images.

As for the signal processing method, the same processes as those upon sensing a three-dimensional image are performed until right and left sensed image signals are input to the process memories 2002 and 2003. Thereafter, synthesis processing is done, and different decimation/interpolation processes are made for the synthesized image to be held in the process memories 2002 and 2003 and that to be transferred to the VRAM 1028. Since two images are spatially synthesized and displayed so that their overlapping portions match each other, the synthesized image is reduced in the vertical direction to fall within the range of the liquid crystal display 1004. The image stored in the VRAM 1028 is displayed under the control of the liquid crystal display control circuit 1029.

With the above-mentioned processing, the user can sense a three-dimensional image while confirming it, and can easily switch the image sensing mode between the three-dimensional image sensing mode and the panoramic image sensing mode.

<Sixth Embodiment>

Figure 26:
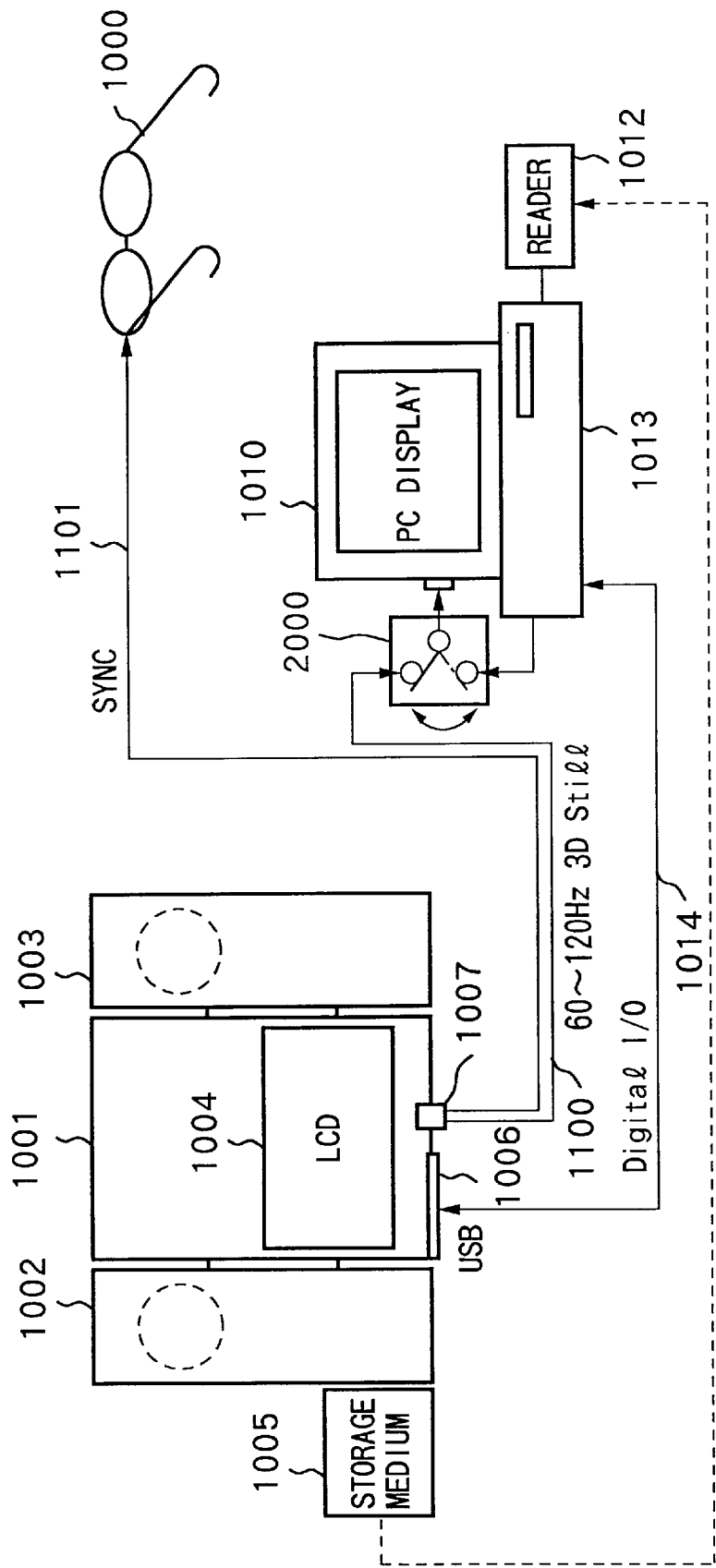
FIG. 26 is a diagram showing the arrangement of a system according to the sixth embodiment of the present invention.

FIG. 26 shows the arrangement of a system using a binocular camera according to the sixth embodiment of the present invention.

Referring to FIG. 26, reference numeral 1010 denotes a PC display; and 1013, a PC main body. Reference numeral 1012 denotes a reader for reading an external storage medium such as a card, and information stored in the camera can be transferred to a PC. Reference numeral 2000 denotes a selection switch for selectively supplying one of image signals from the PC main body 1013 and a binocular camera 1001 to the PC display 1010. Reference numeral 1007 denotes an output terminal as an interface for exchanging a digital signal and outputting a synchronization signal 1101 and an image signal 1100. Liquid crystal shutter spectacles 1000 are driven by this synchronization signal 1101.

The difference of this embodiment from the fifth embodiment is that the PC display 1010 is used as an external stereoscopic display.

The system of this embodiment comprises the selection switch 2000 that can connect the PC display 1010 to the binocular camera to use it as an external display. The image signal 1100 and the synchronization signal 1101 are output from the binocular camera. At this time, the PC main body 1013 is disconnected from the PC display 1010 by the selection switch 2000, and the PC display 1010 is connected to the binocular camera. The image signal 1100 representing a three-dimensional image is transferred from the binocular camera to the PC display 1010 in correspondence with the vertical frequency that can be set by the PC display 1010. At the same time, the synchronization signal 1101 is output to the liquid crystal shutter spectacles 1000. In synchronism with this synchronization signal, the liquid crystal shutter spectacles open/close right and left shutters, and the observer observes a three-dimensional image.

The flow of signals in the camera at that time will be explained below with reference to FIG. 27.

Figure 27:
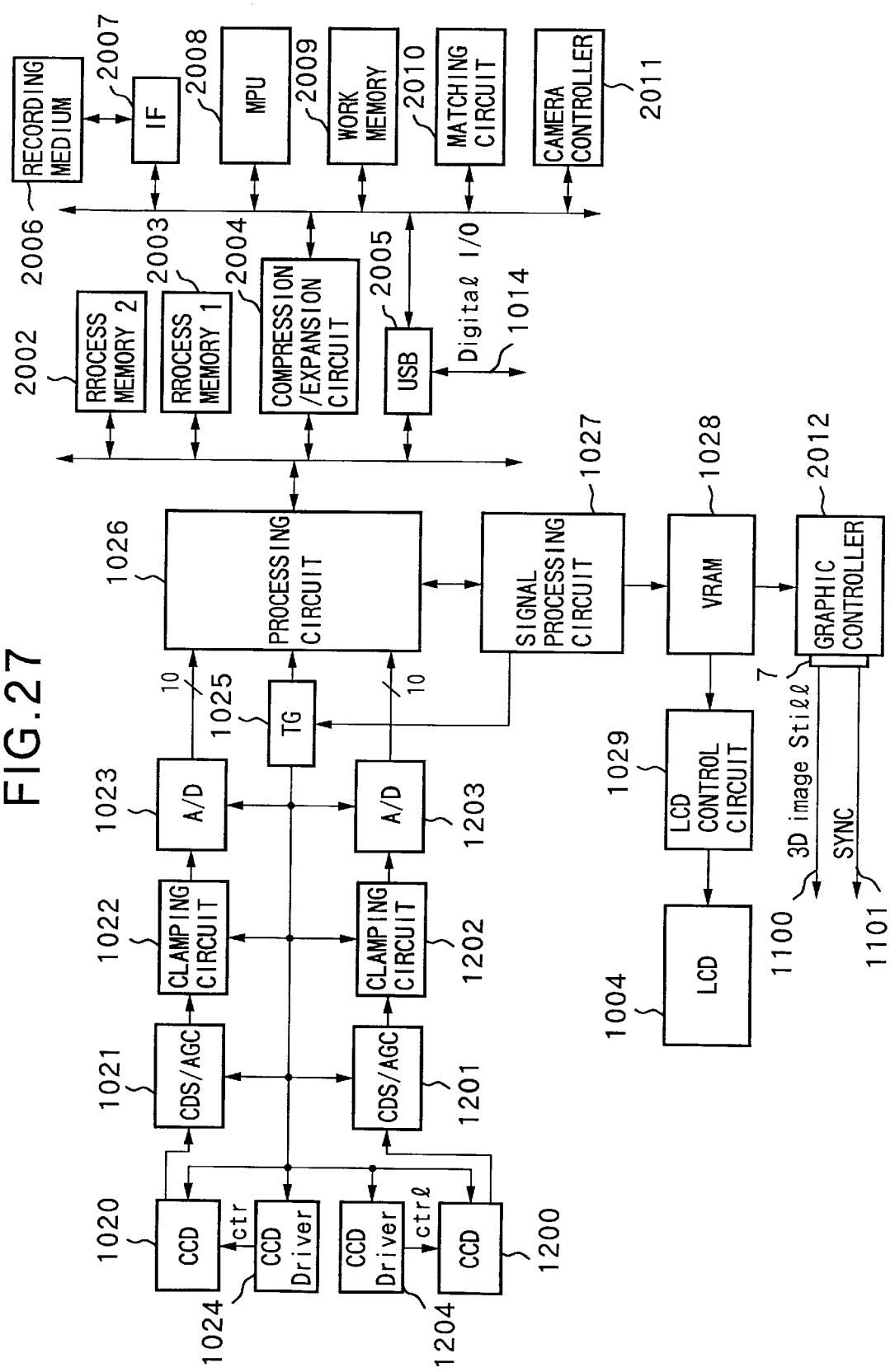
FIG. 27 is a block diagram of a circuit according to the sixth embodiment.

Referring to FIG. 27, reference numeral 2012 denotes a graphic controller having a function of outputting three-dimensional bitmap data. Note that a signal processing circuit 1027 is substantially the same as that in the fifth embodiment, except that functional portions associated with the output terminal 1008 are excluded from the signal processing circuit 1027 of the fifth embodiment.

The operation will be explained below.

Since the operations until images are sensed and a three-dimensional image is generated in the binocular camera are the same as that in the fifth embodiment, a detailed description thereof will be omitted.

Right and left images generated as a three-dimensional image are stored in a VRAM 1028, and the graphic controller 2012 alternately outputs these images via the output terminal 1007. Since the liquid crystal shutter spectacles 1000 are driven in synchronism with the synchronization signal 1101 synchronized with the output timings of the controller 2012, the observer can observe a three-dimensional image.

At this time, the vertical frequency of the PC display does not always agree with that of the liquid crystal display 1004 of the binocular camera. For this reason, the observer selects either of the following choices by making an input at the camera controller 2011:

(1) LCD is not used (2) Both PC display and LCD are used

When both the PC display and the liquid crystal display are used, the synchronization signal and the like are adjusted. In this case, the PC display is adjusted with respect to the liquid crystal display 1004.

When the liquid crystal display is not used, the image signal 1100 representing a three-dimensional image and the synchronization signal 1101 are output in correspondence with one of vertical frequencies that can be used in the PC display.

With the above-mentioned processing, the user can sense a three-dimensional image, and can confirm stereoscopic expression of an image on the screen of the PC display. In general, since the vertical frequency of the PC display can be set to be higher than that of a TV, the user can enjoy an image suffering less flickering.

<Seventh Embodiment>

Figure 28:
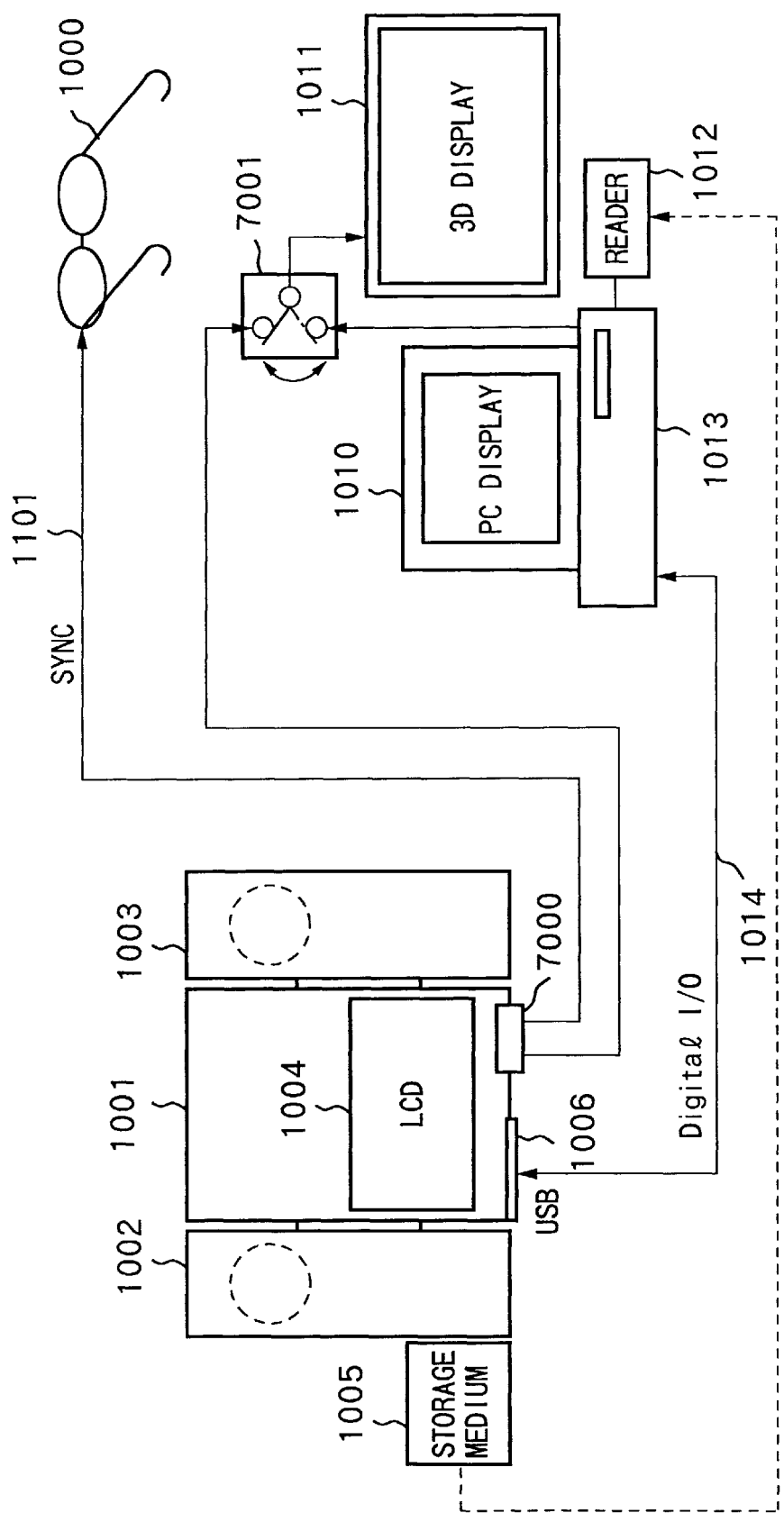
FIG. 28 is a diagram showing the arrangement of a system according to the seventh embodiment of the present invention.

FIG. 28 shows the arrangement of a system of a binocular camera according to the seventh embodiment of the present invention.

Referring to FIG. 28, reference numeral 1011 denotes a 3D display. Reference numeral 7000 denotes an interface which outputs an image signal 1100 and a synchronization signal 1101 from a camera main body 1001. Reference numeral 7001 denotes a selection switch for selectively supplying one of image outputs from a PC main body 1013 and the binocular camera to the 3D display 1011.

The operation will be described below.

The difference between the seventh embodiment and the fifth and sixth embodiments is that three-dimensional image data is transferred to the 3D display 1011 connected to the PC via the interface 7000 and the selection switch 7001, and a three-dimensional image is observed using the 3D display 1011.

Three-dimensional image information is output from the binocular camera. At this time, in the camera main body 1001, the obtained right and left parallax images are alternately arranged in units of vertical lines, and are output to the 3D display 1011. A three-dimensional image adapter is attached in advance to the front surface of the 3D display 1011, so that these right and left images are independently incident on the right and left eyes of the observer. Thus, the observer can observe a three-dimensional image. As the adapter, several adapters are available. For example, an adapter using a lenticular lens, an adapter using a parallax barrier, and the like are known.

Figure 29:
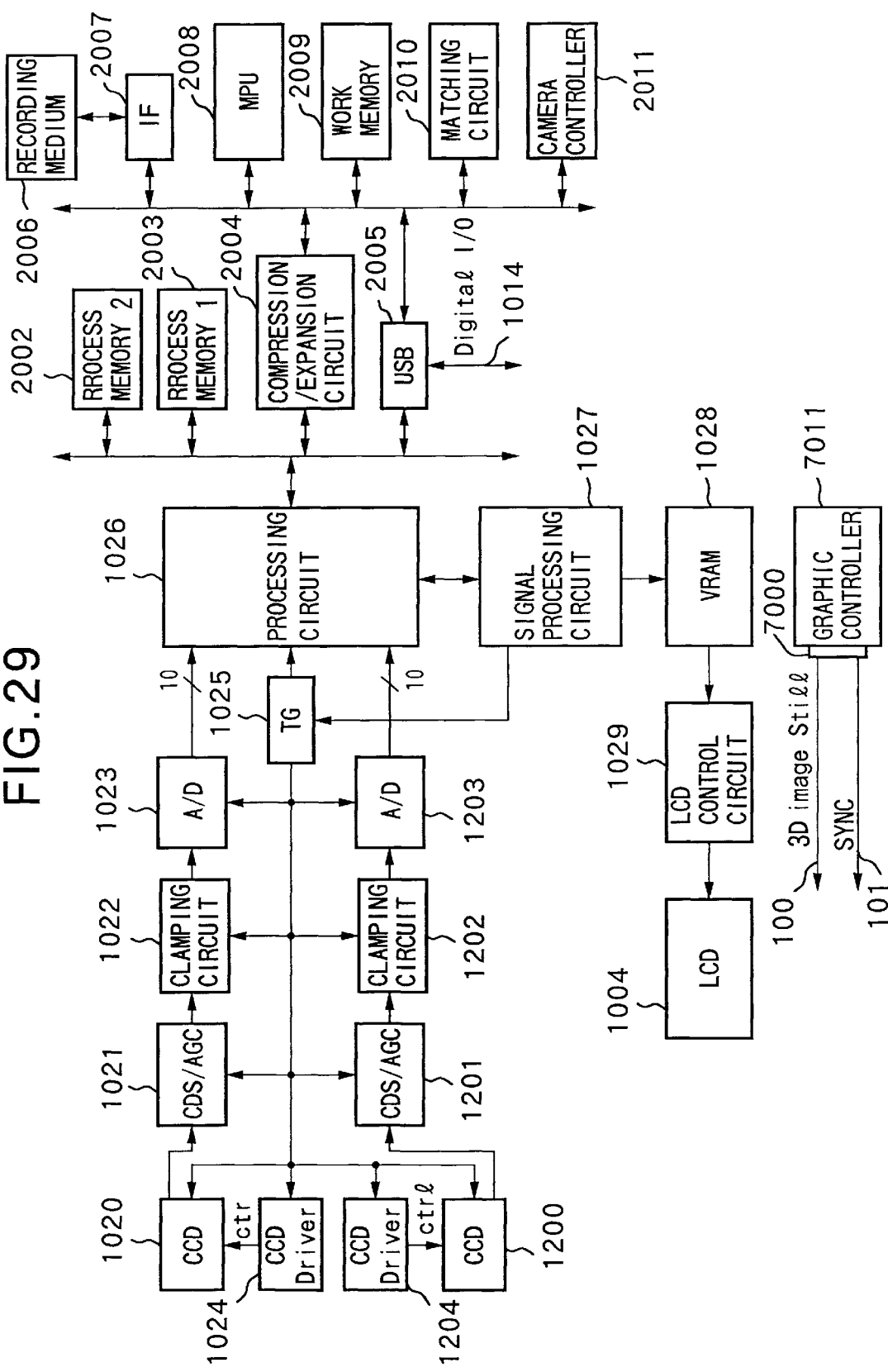
FIG. 29 is a block diagram of a circuit according to the seventh embodiment.

The data flow will be explained below with reference to FIG. 29. Image data from the binocular camera are held in process memories 2002 and 2003 as in the fifth embodiment. In order to send this image via the interface 7000, the observer selects and inputs a 3D display transfer mode at a camera controller 2011. When this mode is selected, data in the process memories 2002 and 2003, i.e., right and left images are alternately arranged in units of, e.g., vertical lines, and are transferred to and held in a work memory 2009.

The data arranged on the work memory 2009 are transferred to a graphic controller 7011 via a route that transfers data without any compression/expansion in a compression/expansion circuit 2004, a processing circuit 1026, and a signal processing circuit 1027. At this time, the processing circuit 1026 and the signal processing circuit 1027 perform the same operations as in the fifth embodiment. The graphic controller 7011 outputs the data alternately arranged in units of vertical lines as the image signal 1100, as described above. Also, the synchronization signal 1101 is output from the graphic controller 7011. In this manner, a three-dimensional image can be observed using the 3D display 1011 connected to the PC in accordance with the signals output from the binocular camera.

<Eighth Embodiment>

Figure 30:
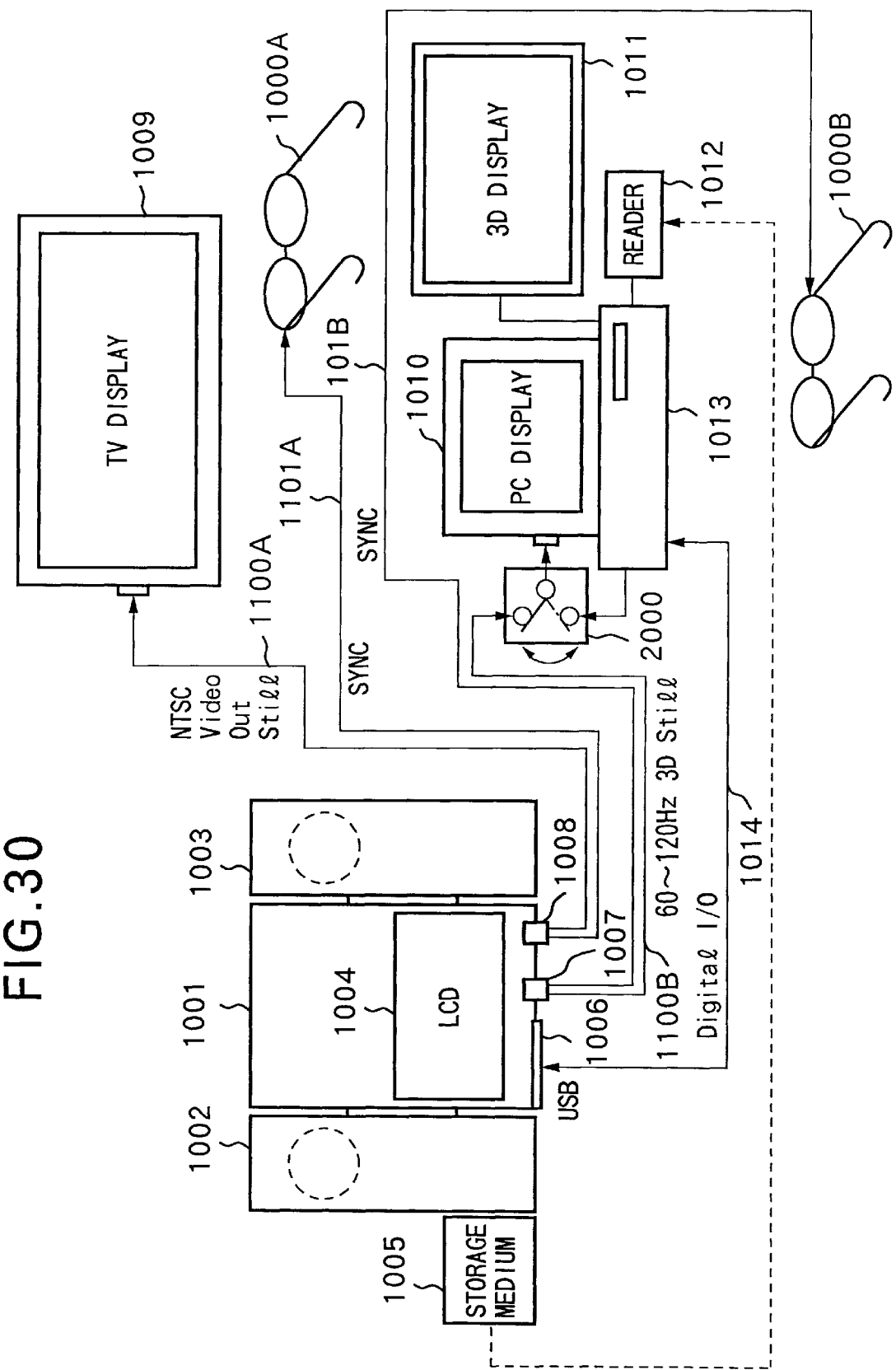
FIG. 30 is a diagram showing the arrangement of a system according to the eighth embodiment of the present invention.
Figure 31:
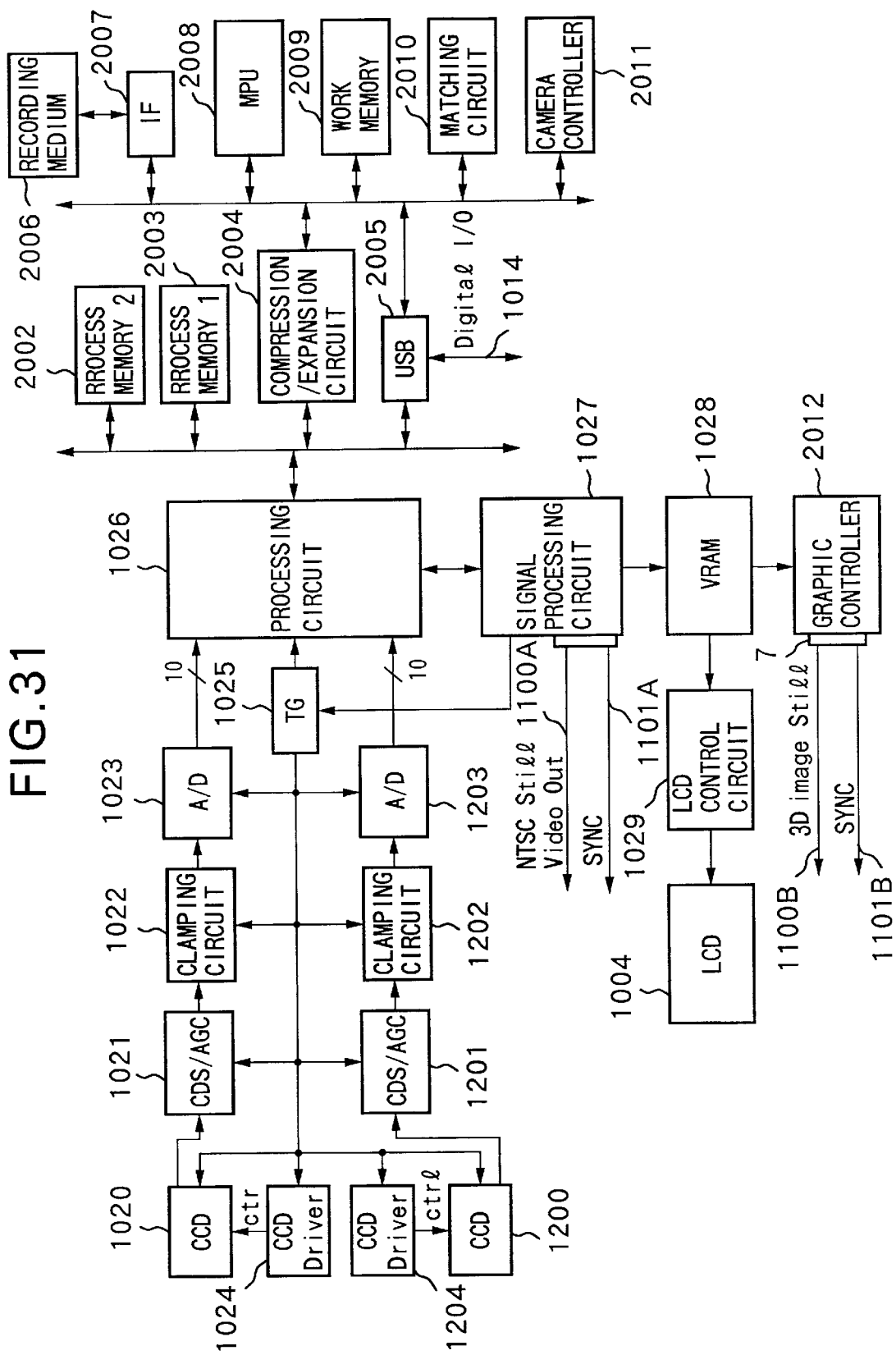
FIG. 31 is a block diagram of a circuit according to the eighth embodiment.

FIG. 30 shows the arrangement of a system of a binocular camera according to the eighth embodiment of the present invention. FIG. 31 shows the flow of the signal processing in this camera.

In this embodiment, a TV display 1009, a PC display 1010, and a 3D display 1011 are connected to the binocular camera as displays that can attain stereoscopic view. Since these external displays have been described in the above embodiments, a repetitive description thereof will be avoided. In this embodiment, the binocular camera outputs a plurality of synchronization signals 1101A and 1101B. Since these displays are not always driven by an identical vertical synchronization signal the synchronization signals 1101A and 1101B are output in correspondence with these displays. A plurality of image signals 1100A and 1100B are output, and liquid crystal shutter spectacles 1000A and 1000B are used.

According to the eighth embodiment, when the binocular camera outputs arbitrary synchronization signals and three-dimensional images, various types of displays can be used.

<Ninth Embodiment>

Figure 32:
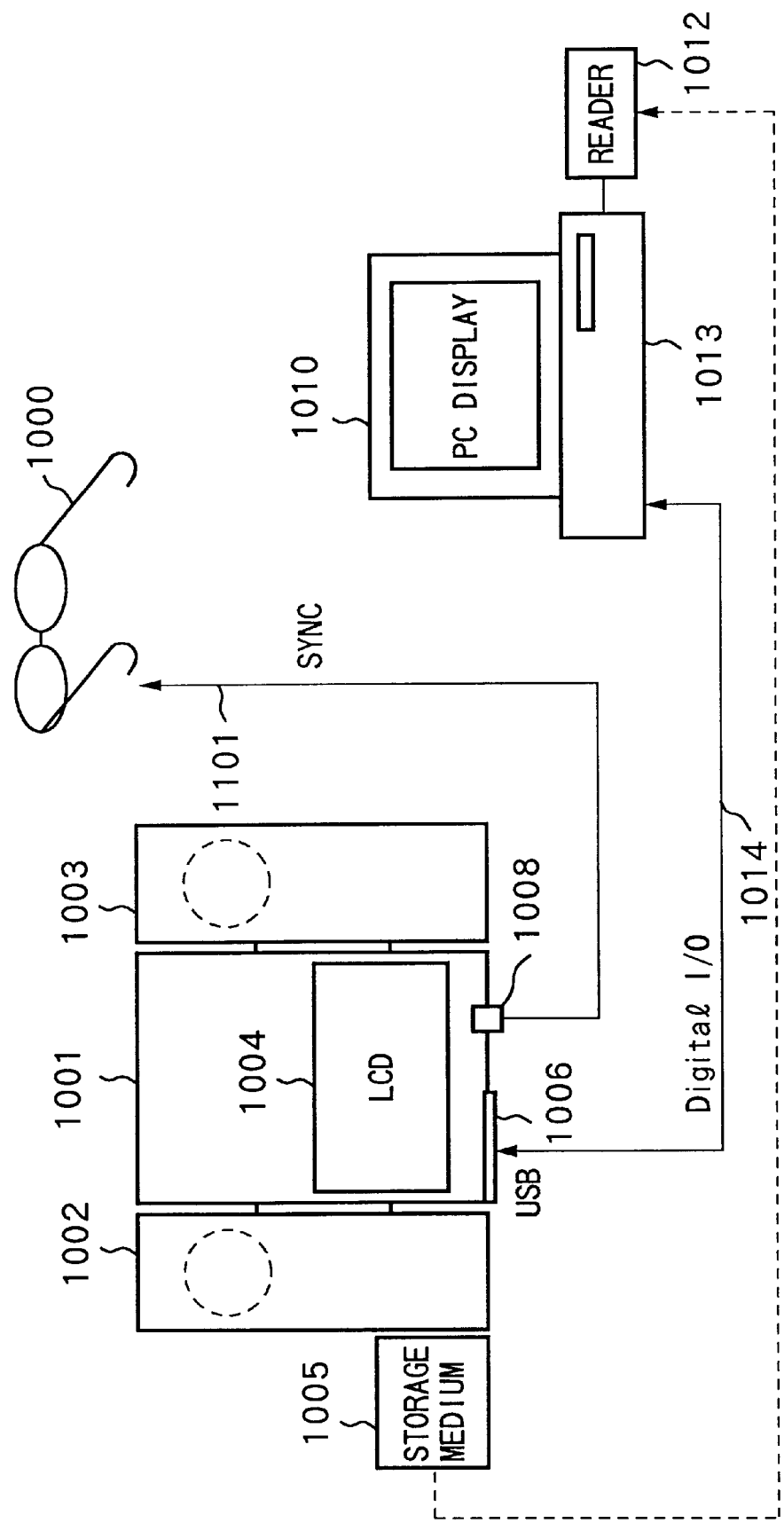
FIG. 32 is a diagram showing the arrangement of a system according to the ninth embodiment of the present invention.
Figure 33:
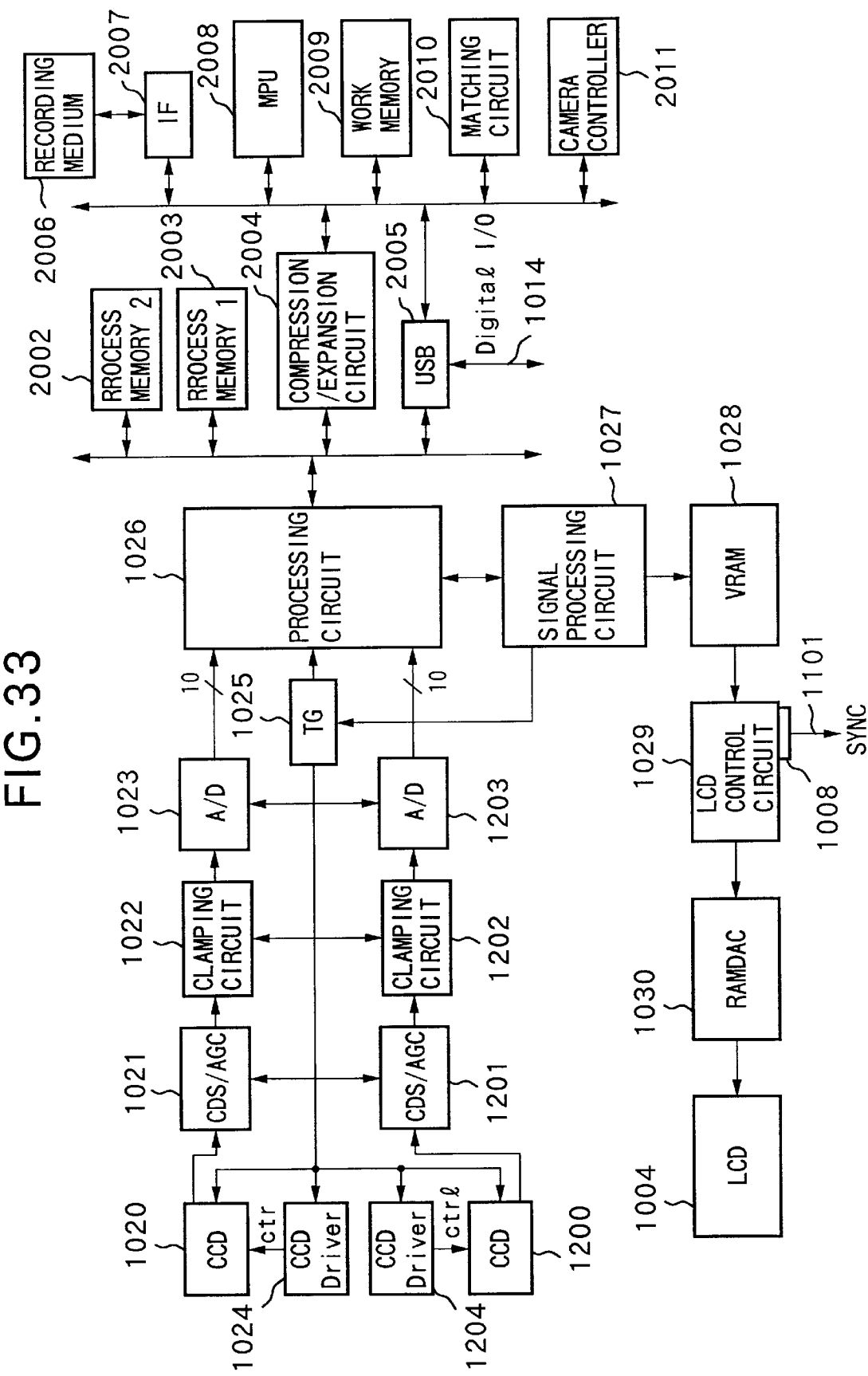
FIG. 33 is a block diagram of a circuit according to the ninth embodiment.

FIG. 32 shows the arrangement of a system according to the ninth embodiment of the present invention, and FIG. 33 shows a signal processing portion.

Referring to FIG. 33, reference numeral 1030 denotes a RAMDAC which converts image data supplied from a VRAM 1028 via a graphic control circuit 1029 into an analog luminance signal, and supplies the converted signal to a liquid crystal display 1004.

The operation will be described below.

In this embodiment, a three-dimensional image is generated on the basis of data transferred from a PC, and is displayed on the liquid crystal display 1004. The user selects a data transfer mode from a PC main body to the binocular camera via a camera controller 2011. When the data transfer mode is selected, an MPU 2008 of the binocular camera prepares for reception of data used for generating a three-dimensional image via a digital interface 1006 such as a USB or the like.

The received data is temporarily held in a work memory 2009. The held data is supplied to and expanded by a compression/expansion circuit 2004 to generate a three-dimensional image later, and the expanded data is supplied to a process memory 2002. The data sent to the process memory is supplied to the VRAM 1028 under the control of the MPU 2008. Right and left images written in the VRAM 1028 are converted from digital signals into analog luminance signals by the RAMDAC 1030 via the graphic control circuit 1029 alternately along the time axis, and the converted signals are displayed on the liquid crystal display 1004. At this time, the color of the luminance signal is determined based on a pallet code in the RAMDAC 1030.

When microphones (not shown) may be arranged together with the image sensing optical systems, a stereophonic effect can also be obtained for a voice together with a stereoscopic effect for an image.

The generated three-dimensional image can be recorded in a recording medium in accordance with the above-mentioned recording method. Furthermore, in this embodiment, data is input from the digital interface 1006 such as a USB or the like. Alternatively, data may be input from the recording medium, and a three-dimensional image may be generated based on the input data.

Furthermore, with this embodiment, even a camera that has a single-eye image sensing optical system, and allows to input a three-dimensional image using an adapter device can process a three-dimensional image.

<10th Embodiment>

Figure 34:
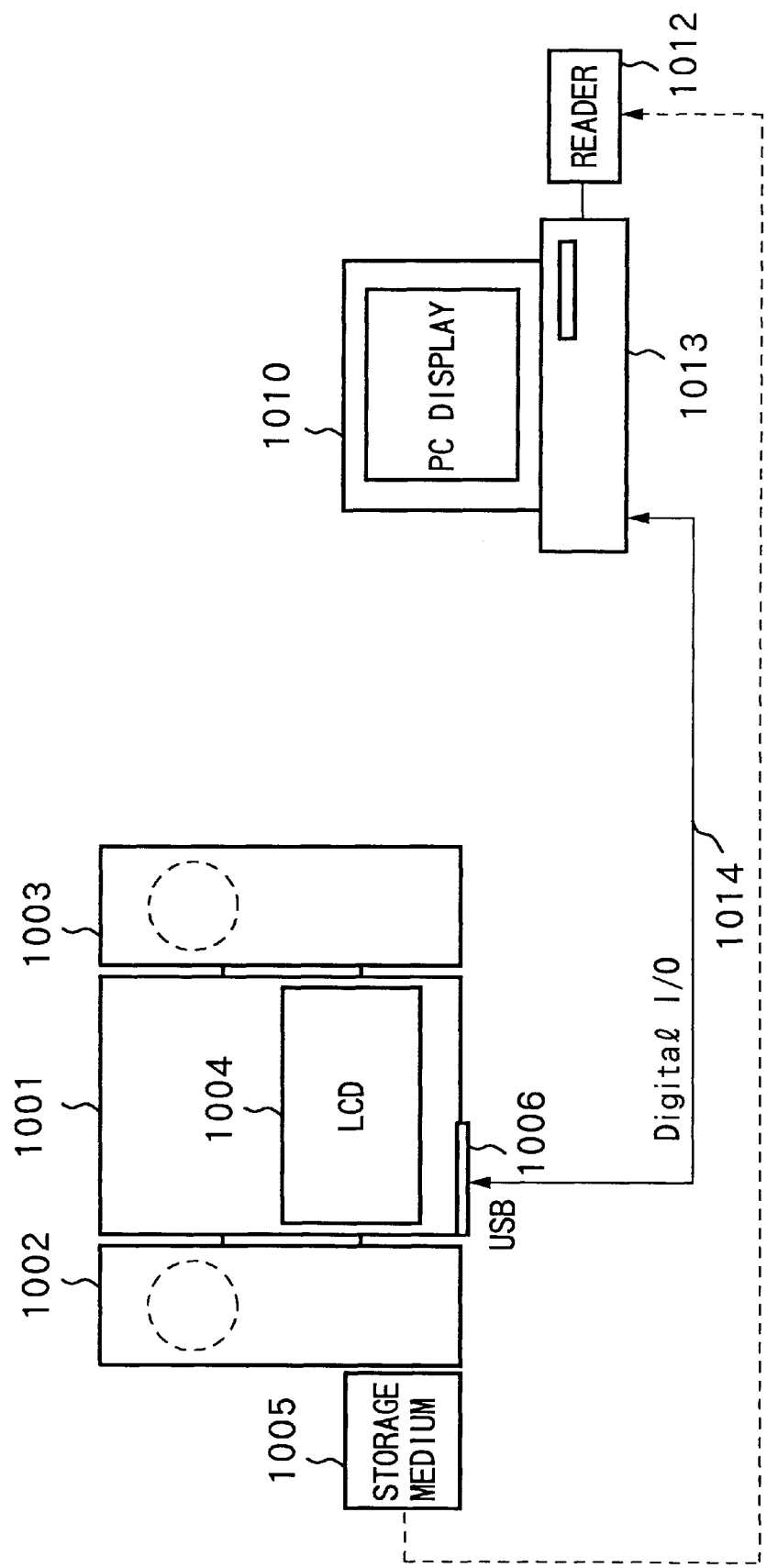
FIG. 34 is a diagram showing the arrangement of a system according to the 10th embodiment of the present invention.

FIG. 34 shows the arrangement of a system of a binocular camera according to the 10th embodiment of the present invention.

Referring to FIG. 34, reference numeral 4000 denotes a spectacle-less 3D display.

The characteristic feature of this embodiment lies in that the spectacle-less 3D display 4000 is used as a display for a camera main body 1001, and data supplied from a PC is displayed on this display. As such spectacle-less 3D display many systems are available. In this embodiment, as a system that does not use any spectacles and the like a n adapter is placed in front of the display panel to observe an image via the adapter. Several types of adapters are also available, and an adapter using a lenticular lens, an adapter using a parallax barrier, and the like are popularly used.

The right and left images obtained inside the binocular camera are alternately arranged in units of, e.g., vertical lines, and the arranged image is output to the spectacle-less 3D display 4000. Since a three-dimensional image adapter is attached in advance to the front surface of the spectacle-less 3D display 4000 so that the output image can be separately input to the right and left eyes of the observer, the observer can observe a three-dimensional image.

<11th Embodiment>

Figure 35:
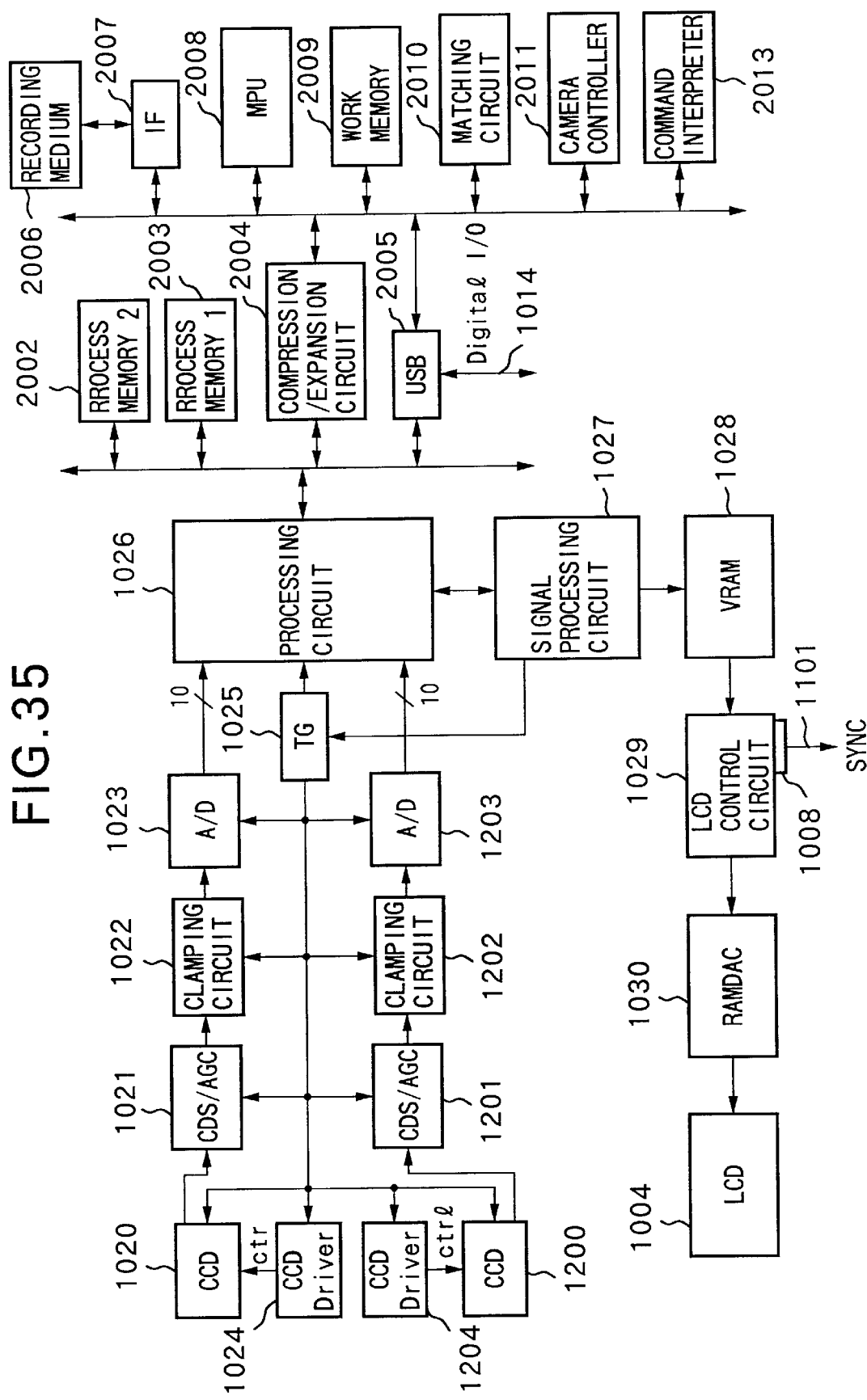
FIG. 35 is a block diagram of a circuit according to the 11th embodiment of the present invention.

FIG. 35 shows the flow of signals of a binocular camera according to the 11th embodiment of the present invention.

Referring to FIG. 35, reference numeral 2013 denotes a command interpreter which interprets commands for a stereoscopic display.

Generation and display of a three-dimensional image on the basis of data transferred from a PC will be explained below.

The user selects a data transfer mode from a PC main body to a binocular camera unit via a camera controller 2011. When the data transfer mode is selected, an MPU 2008 of the binocular camera prepares for receiving data for generating a three-dimensional image via a digital interface 1006.

The received data is temporarily held in a work memory 2009. The held data is transferred to the command interpreter 2013 to generate a three-dimensional image later. The command interpreter 2013 generates an image on the basis of data from the PC. Commands to be transferred to the PC include computer graphics commands such as a line drawing command, a curve drawing command, a painting command, and the like. The image generated based on interpreting commands is drawn on process memories 2002 and 2003. The data sent to the process memories is supplied to a VRAM 1028 under the control of the MPU 2008 in the same manner as described above, and is displayed on a display 1004 via a graphic control circuit 1029 and a RAMDAC 1030.

<12th Embodiment>

Figure 36:
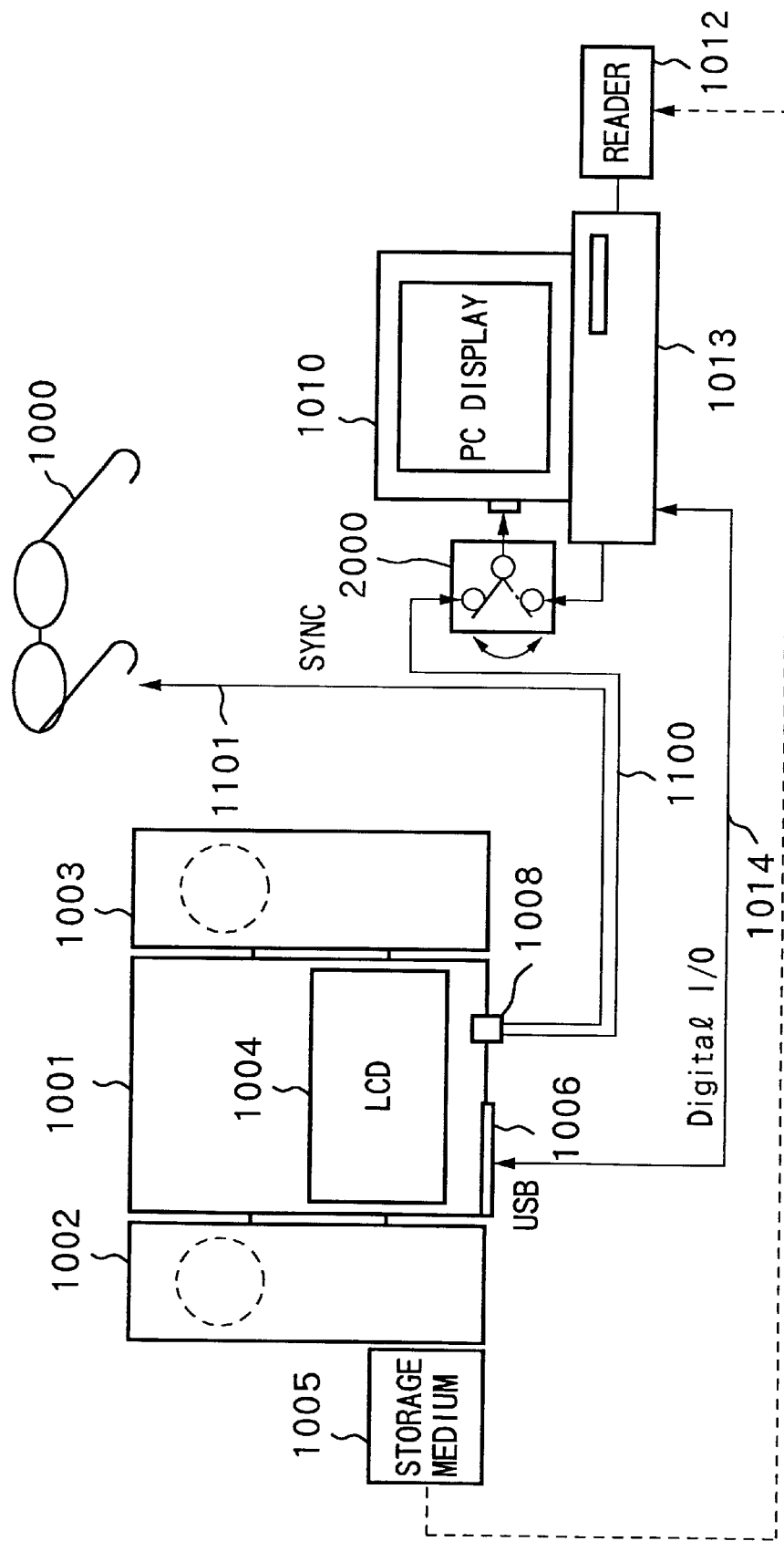
FIG. 36 is a diagram showing the arrangement of a system according to the 12th embodiment of the present invention.
Figure 37:
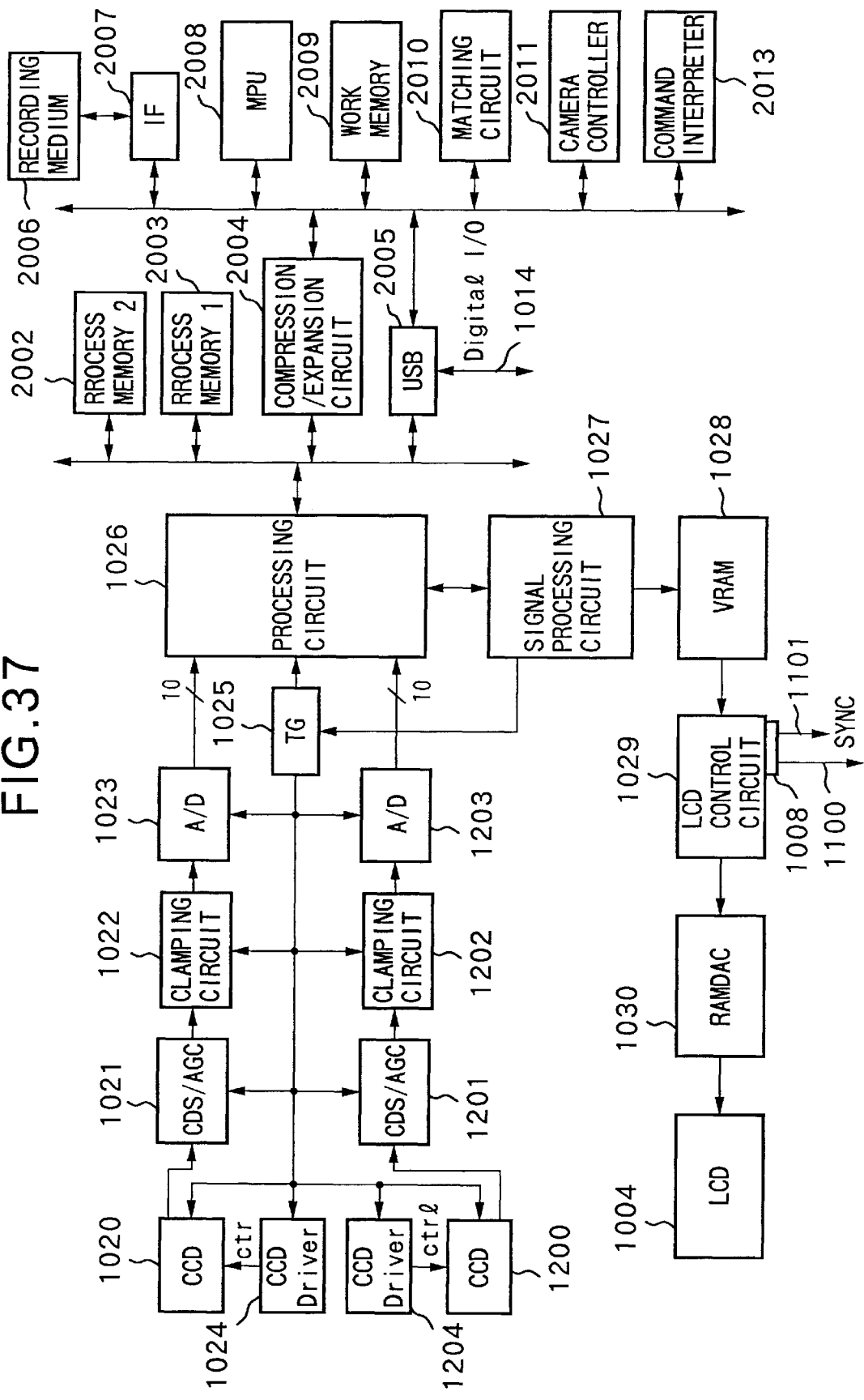
FIG. 37 is a block diagram of a circuit according to the 12th embodiment.

FIGS. 36 and 37 are diagrams respectively showing the system arrangement and signal processing of a binocular camera according to the 12th embodiment of the present invention.

Referring to FIGS. 36 and 37, a graphic control circuit 1029 outputs a three-dimensional image signal 1100 to a PC display 1010.

The difference of this embodiment from the ninth to 11th embodiments is that a three-dimensional image is not output to a liquid crystal display 1004 of a camera main body 1001, but is displayed using the PC display 1010. Since the camera main body 1001 has a function of outputting the three-dimensional image signal 1100, a three-dimensional image is output to the PC display 101 using this function. In this case, a PC main body 1013 need not be added with any function for outputting a three-dimensional image.

In the signal flow, the user selects a data transfer mode from the PC main body 1013 to the binocular camera via a camera controller 2011, as in the fifth to seventh embodiments. Upon selection of the data transfer mode, an MPU 2008 of the binocular camera prepares for receiving a three-dimensional image via a digital interface 1006.

The received data is temporarily held in a work memory 2009. The held data is supplied to and expanded by a compression/expansion circuit 2004 to generate a three-dimensional image later, and the expanded data is supplied to a process memory 2002. The data sent to the process memory is supplied to a VRAM 1028 under the control of the MPU 2008, and the graphic control circuit 1029 generates and outputs a three-dimensional image signal 1100 and its synchronization signal 1101. In this embodiment, the camera main body 1001 comprises a liquid crystal display 1004 but may not comprise any display.

When the image signal 1100 and the synchronization signal 1101 are output, the image signal 1100 is input to the PC display 1010 via a switch 2000 for attaining connections with the PC display 1010. On the other hand, the synchronization sign al 1101 opens/closes liquid crystal shutter spectacles 1000 in synchronism with the image signal 1100, thus allowing the user to experience stereoscopic view.

<13th Embodiment>

The 13th to 18th embodiments are directed to a technique for reducing parallax to zero so as to be especially suitable for stereoscopic view of moving images. In the 13th to 18th embodiments as well, the present invention is applied to a binocular camera.

Figure 38:
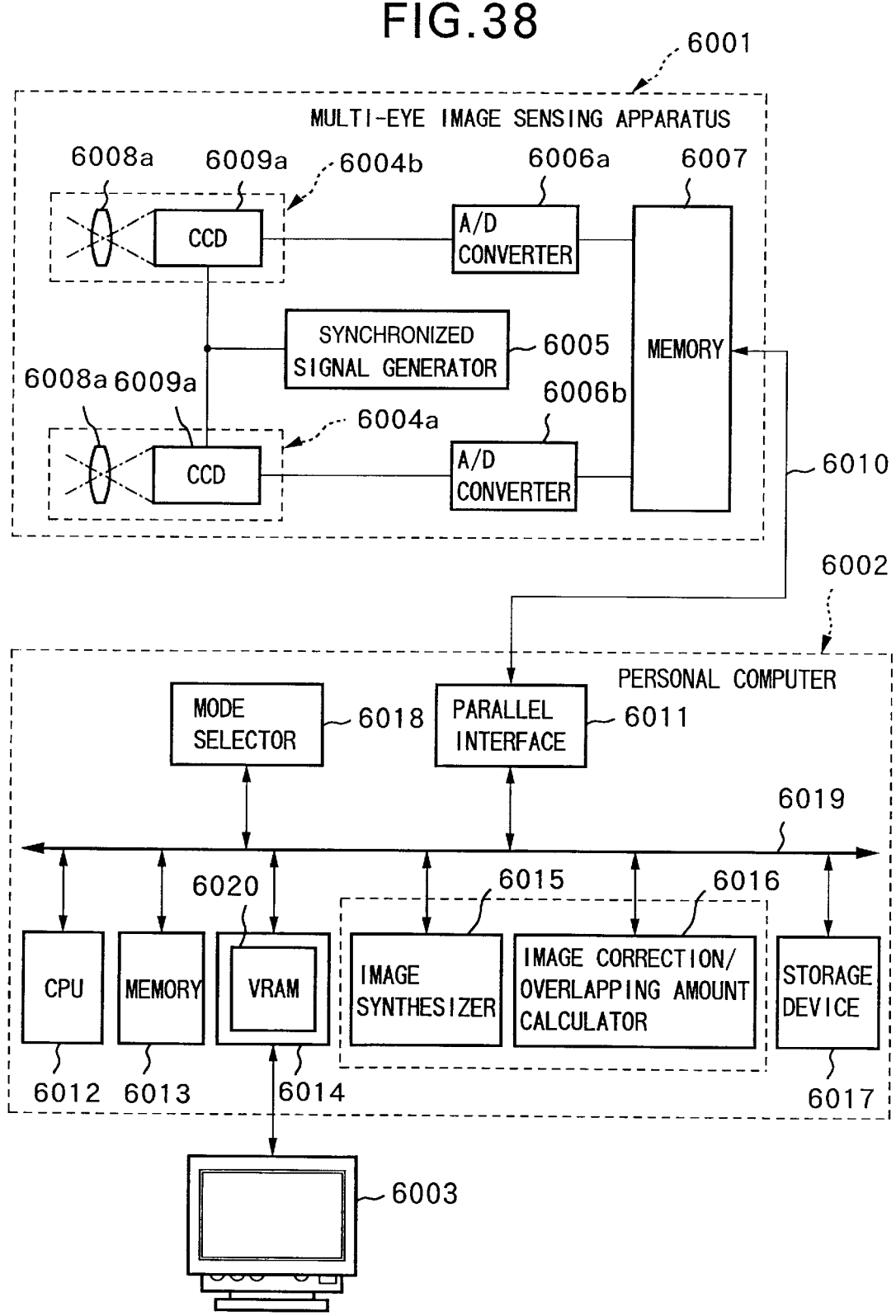
FIG. 38 is a block diagram showing the arrangement of a system having a multi-eye image sensing apparatus according to the 13th embodiment of the present invention.

The 13th embodiment of the present invention will be described below with reference to FIGS. 38 to 41. FIG. 38 is a block diagram showing the arrangement of a system having a binocular image sensing apparatus (stereoscopic camera) according to the 13th embodiment of the present invention. This system comprises a binocular image sensing apparatus 6001, a personal computer 6002, and a display apparatus 6003.

The characteristic feature of the arrangement of the 13th embodiment is that the image sensing apparatus is a conventional binocular camera, but a personal computer with an image processing function for panoramic view is arranged.

The binocular image sensing apparatus 6001 comprises two, right and left image sensing optical systems 6004b and 6004a, a synchronized signal generator 6005, A/D converters 6006b and 6006a, and a memory 6007. The right and left image sensing optical systems 6004b and 6004a respectively comprise lenses 6008b and 6008a, and CCDs 6009b and 6009a serving as image sensing devices. The CCDs 6009b and 6009a are connected to the synchronized signal generator 6005 to be able to execute synchronous image sensing.

The binocular image sensing apparatus 6001 is connected to the personal computer 6002 via an interface cable 6010.

The personal computer 6002 comprises a parallel interface 6011, a CPU (central processing unit) 6012, a memory 6013, a display controller 6014, an image synthesizer 6015, an image correction/overlapping amount calculator 6016, a storage device 6017, and a mode selector 6018, which are connected to a CPU bus 6019. The display controller 6014 comprises a VRAM (video random-access memory) 6020.

An image signal is input from the binocular image sensing apparatus 6001 via the parallel interface 6011, and an image is output to the display device 6003 via the display controller 6014.

The panoramic image sensing/display method of moving images by the binocular image sensing apparatus 6001 of this embodiment will be described below with the aid of the flow chart in FIG. 39. In step S1201, a processing mode is selected and switched. The processing mode includes a through display mode for sensing, processing, and displaying images in real time, a recording mode for temporarily recording sensed images, and a reproduction mode for reproducing the recorded images. The user selects and switches a desired processing from among these three modes. In this embodiment, the mode selector 6018 as a hardware component in the personal computer 6002 in FIG. 38 implements selection and switching of the processing mode. Alternatively, the processing mode may be selected and switched by software.

The flows of processing upon selection of the individual processing modes will be explained below. This processing is implemented when the CPU 6012 executes an application program stored in the memory 6013 of the personal computer 6002.

<Display Panoramic Image> . . . 13th Embodiment

Figure 39:
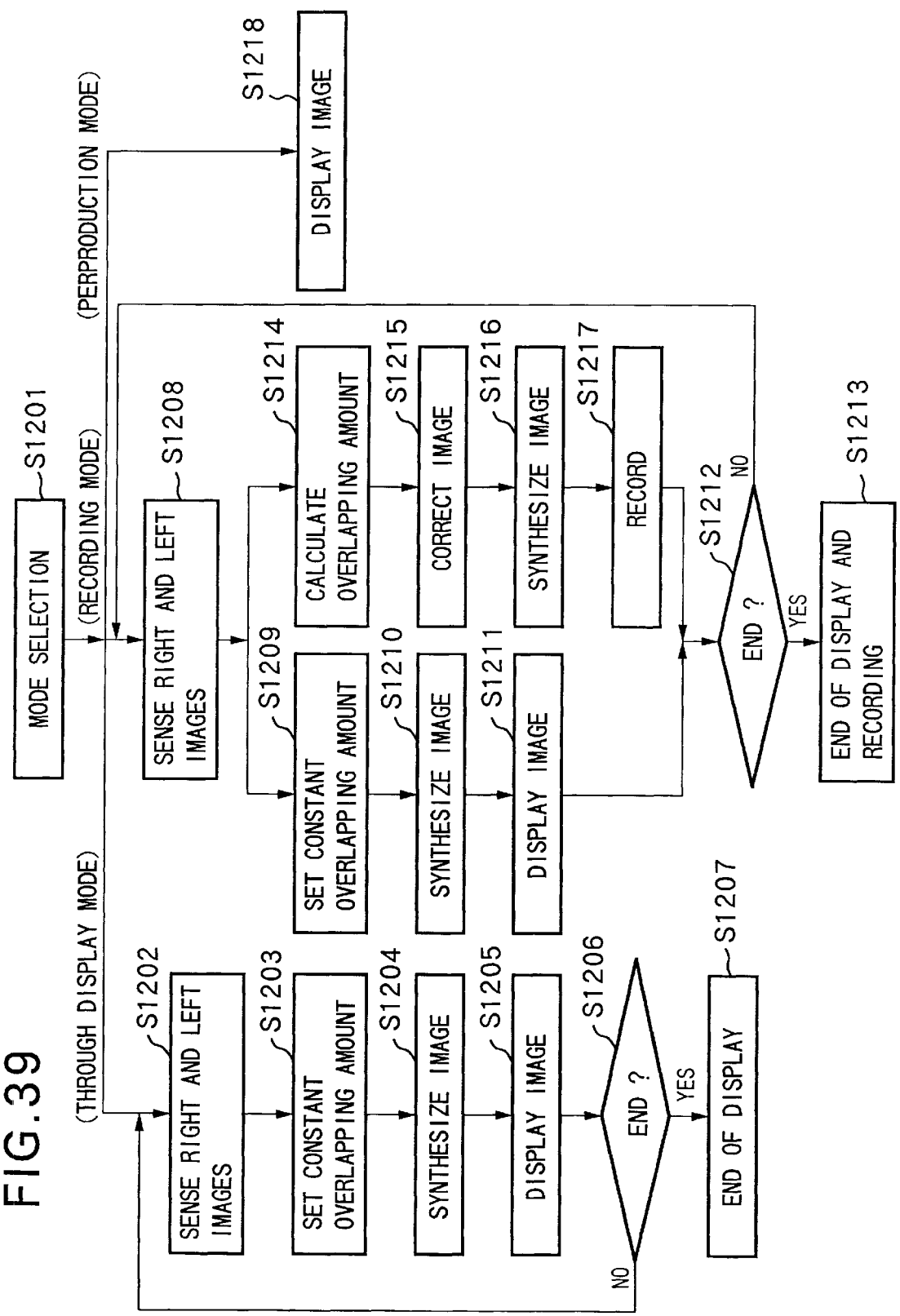
FIG. 39 is a flow;chart showing the flow of the processing of the multi-eye image sensing apparatus.

In the flow chart shown in FIG. 39, when the through display mode is selected, the processing is steps S1202 to S1207 is executed; when the recording mode is selected, the processing in steps S1208 to S1213 is executed; and when the reproduction mode is selected, the processing in step S1218 is executed.

When the through display mode is selected, the CPU sends an instruction to the image sensing apparatus 6001 to sense right and left parallax images. In FIG. 38, the binocular image sensing apparatus 6001 acquires two, right and left images formed via the lenses 6008b and 6008a using the CCDs 6009b and 6009a. The right and left images are synchronously acquired on the basis of a signal from the synchronized signal generator 6005. The image sensing apparatus 6001 converts the acquired image signals into digital image signals by the A/D converters 6006b and 6006a, and stores these digital signals in the memory 6007. Furthermore, the image sensing apparatus 6001 inputs the stored image signals to the personal computer 6002 via the interface cable 6010. The input image signals are transferred to the memory 6013 via the CPU 6019.

Since the CCDs 6009b and 6009a synchronously execute image sensing, even if analog-to-digital conversion of image signals and image transfer from the binocular image sensing apparatus 6001 to the personal computer 6002 are not synchronously performed, the two, right and left images transferred to the memory 6013 are synchronized with each other.

The personal computer 6002 generates a single panoramic synthesized image on the basis of the two, right and left transferred parallax images in steps S1203 to S1205.

Figure 40:
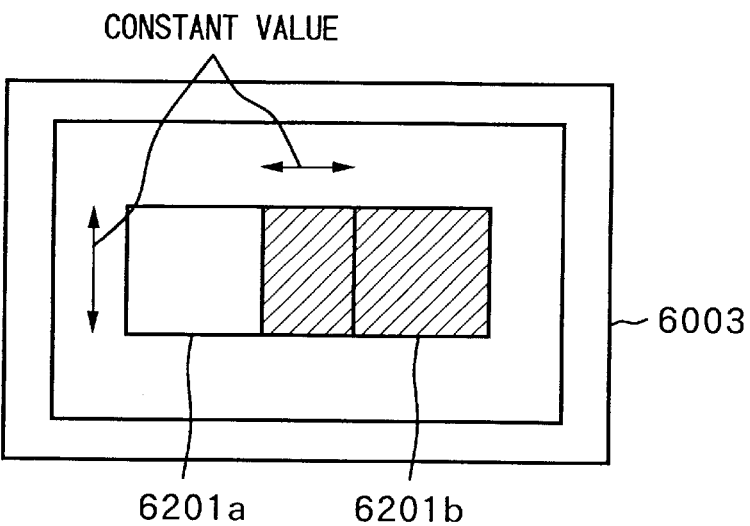
FIG. 40 is an explanatory view of a panoramic synthesis method in a through display mode of the multi-eye image sensing apparatus.

FIG. 40 shows a method of displaying a panoramic synthesized image on the display apparatus 6003 in the through display mode. In FIG. 40, reference numeral 6201a denotes a left image; and 6201b, a right image. Upon synthesizing the two, right and left images 6201b and 6201a into a single panoramic image, an overlapping region for joining the two, right and left images sensed from one view point must be determined. The overlapping region is defined by the number of pixels (to be referred to as an "overlapping amount" in this embodiment) in the horizontal direction of that region. In the through display mode, the application program sets that overlapping amount at a given value in step S1203. Note that the user may set an appropriate value as the overlapping amount. In step S1204, the image synthesizer 6015 in FIG. 38 determines overlapping regions of the two, right and left images 6201b and 6201a on the basis of the set value in step S1204, and generates a panoramic image by making the overlapping regions of the two images overlap each other. The panoramic image is synthesized by substitution of pixel values of one of the right and left images into the overlapping regions between the two images 6201b and 6201a.

The synthesized panoramic image is transferred to the VRAM 6020 by the display controller 6014 in FIG. 38 and is displayed on the display apparatus 6003 in step S1205. Such images corresponding to the number of frames desired by the user are displayed on the display apparatus 6003, and it is checked in step S1206 if image display is to end. If NO in step S1206, the flow returns to step S1202; otherwise, display on the display apparatus 6003 ends in step S1207.

In this manner, in the through display mode, a predetermined overlapping amount is set in advance, and panoramic synthesis processing is performed using the set value.

<Record Panoramic Image> . . . 13th Embodiment

The processing executed upon selection of the recording mode will be explained below.

Figure 41:
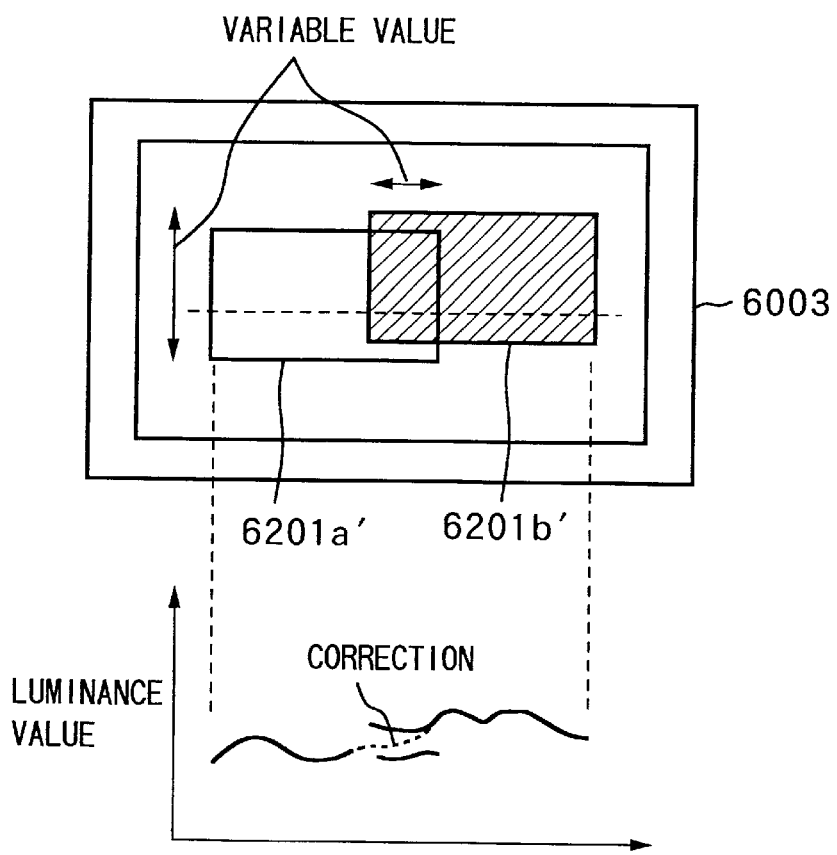
FIG. 41 is an explanatory view of a panoramic synthesis method in a recording mode of the multi-eye image sensing apparatus.

FIG. 41 shows the panoramic image sensing/display method in the recording mode. When the recording mode is selected, right and left images are sensed in step S1208. In the recording mode, the two, right and left image signals are sensed in the same manner as in the through display mode described above. In the recording mode as well, the display apparatus 6003 performs display based on the through-display mode. That is, parallel to recording of images to be synthesized into a panoramic image, the overlapping amount is set at a given value in step S1209. The image synthesizer 6015 in FIG. 38 synthesizes the two, right and left images 6201b and 6201a into a panoramic image on the basis of the set value in step S1210. The synthesized panoramic image is transferred to the VRAM 6020 by the display controller 6014 in FIG. 38 and is displayed on the display apparatus 6003 in step S1211. The user can record a panoramic synthesized image while observing the image displayed on the display apparatus 6003.

Note that the overlapping region is not always simple unlike in FIG. 40. For example, the luminance of the overlapping region may deviate from each other as in images 6201b' and 6201a' shown in FIG. 41.

When two images 6201b' and 6201a' are synthesized into a single panoramic synthesized image upon panoramic display in the through display mode, the two images 6201b and 6201a are directly synthesized by assigning a predetermined overlapping amount. In this recording mode, before panoramic synthesis, the overlapping amount of the two, right and left images 6201b' and 6201a' is calculated in step S1214. This calculation is made by the image correction/overlapping amount calculator 6016 in FIG. 38. That is, the image correction/overlapping amount calculator 6016 detects the overlapping regions of the images 6201b' and 6201a' by finding correspondences among their pixel values using an algorithm such as template matching, and then calculates the overlapping amount. Hence, in the recording mode, the overlapping amount used in image synthesis is a variable value.

In step S1215, the image correction/overlapping amount calculator 6016 corrects the sensed images, i.e., compensates for the luminance and color differences between the two, right and left images that may be produced by the image sensing optical systems 6004b and 6004a, and corrects trapezoidal distortion.

FIG. 41 shows the correction state of luminance values that may become discontinuous at the joint portion between the right and left parallax images 6201b' and 6201a'. After such corrections and calculation of the overlapping amount, the image synthesizer 6015 synthesizes a panoramic image in step S1216. This synthesis is substantially the same as that in step S1204 in the through display mode, except for the substitution method of the overlapping amount as a parameter between the two, right and left images. Also, the two images to be synthesized have been subjected to image correction in the recording mode.

The panoramic synthesized image is transferred to and recorded in the storage device 6017 in step S1217. In this case, images for a plurality of frames are recorded in correspondence with user's setting. In step S1212, it is checked if display and recording are to end. If NO in step S1212, the flow returns to step S1208; otherwise, display and recording end in step S1213. In this embodiment, the panoramic synthesized image is recorded. Alternatively, the two, right and left corrected images, and the overlapping amount as attribute information may be recorded.

<Reproduce Recorded Image> . . . 13th Embodiment

Finally, the processing executed upon selection of the reproduction mode will be explained below.

When the reproduction mode is selected, a file of moving images stored in the storage device 6017 is read and is displayed on the display apparatus 6003 in step S1218. In this case, images are transferred to the VRAM 6020 under the control of the display controller 6014 in FIG. 38, and are displayed ion the display apparatus 6003 as in the above-mentioned through display mode.

As described above, display corresponding to the user's purpose can be done by switching the modes. In the through display mode, since a predetermined overlapping amount is set in advance upon generation of the panoramic synthesized image to be displayed, the processing time per frame can be short, and moving images with a high frame rate can be presented in real time. In the recording mode, since the panoramic synthesized image is generated after image correction and accurate calculation of the overlapping amount, when the recorded image is displayed on the display apparatus 6003 in the reproduction mode later, a smoothly joined panoramic synthesized image with high image quality can be obtained.

In this embodiment, the image correction/overlapping amount calculator 6016 and the image synthesizer 6015 are arranged in the personal computer 6002, but may be arranged in the binocular image sensing apparatus 6001. In place of the personal computer 6002, an apparatus such as a workstation may be used. As the interface cable 6010 for connecting the binocular image sensing apparatus 6001 and the personal computer 6002, two, right and left images may be separately transferred using two interfaces, or two, right and left image signals may be time-divisionally transferred to the personal computer 6002 using a single interface. In addition, the CPU bus 6019 in the personal computer 6002 may adopt various types of buses such as an ISA bus, PCI bus, and the like.

<14th Embodiment> . . . Stereoscopic View

The 14th embodiment of the present invention will be described below with reference to FIGS. 42 and 43.

The above-mentioned 13th embodiment obtains a panoramic synthesized image, while this embodiment obtains an image for stereoscopic view. Note that the system arrangement having a binocular image sensing apparatus in this embodiment is the same as that shown in FIG. 38 in the 13th embodiment described above, and the flow chart of image sensing/display processing for stereoscopic view of moving images by the binocular image sensing apparatus of this embodiment is the same as that shown in FIG. 39 in the 13th embodiment described above. Hence, the following explanation will be given by quoting these figures.

In step S1201, the processing mode is selected and switched. The processing mode of the 14th embodiment includes three modes, i.e., a "through display mode", "recording mode", and "reproduction mode" as in the 13th embodiment described above. The user selects and switches a desired processing from among these three modes. In this embodiment as well, the mode selector 6018 as a hardware arrangement in the personal computer 6002 in FIG. 38 implements selection and switching of the processing mode. Alternatively, the processing mode may be selected and switched by software.

<Through Display Mode> . . . 14th Embodiment

When the through display mode is selected, two, right and left images are sensed in step S1202. The method of sensing two, right and left images by the binocular image sensing apparatus 6001 is the same as that in the panoramic image sensing apparatus as described above. However, in image sensing/display for panoramic view, two images are sensed while matching the view points of the two images, while in image sensing/display for stereoscopic view, the image sensing optical systems 6004b and 6004a are set at an interval given by the base distance, and images are sensed from two different view points.

The two, right and left sensed images are transferred to the personal computer 6002 to generate a single image for stereoscopic view.

Figure 42:
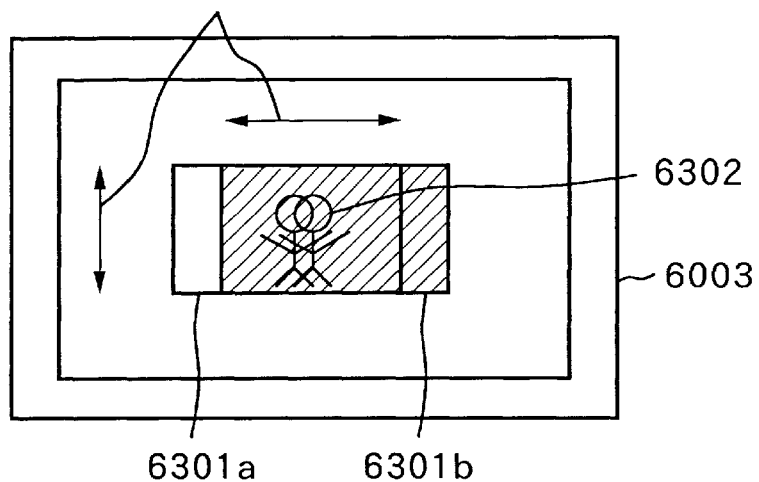
FIG. 42 is an explanatory view of a method of creating an image for stereoscopic view in a through display mode of a multi-eye image sensing apparatus according to the 14th embodiment of the present invention.

FIG. 42 shows the method of displaying an image for stereoscopic view on the display apparatus 6003 in the through display mode. Referring to FIG. 42, reference numeral 6301a denotes a left parallax image; 6301b, a right parallax image; and 6302, a principal object. Note that an overlapping amount for generating an image for stereoscopic view from the two, right and left images 6301b and 6301a must be determined. The overlapping amount in the image for stereoscopic view indicates an amount the two, right and left images are made to overlap each other. By changing this overlapping amount, the parallax of the generated image for stereoscopic view, i.e., stereoscopic expression, can be controlled.

This overlapping amount is set at a predetermined value in step S1203. In this embodiment, the overlapping amount value is set to reduce the parallax of the principal object 6302 in each sensed image. Such overlapping amount is set to allow easy fusing of images of the principal object 6302, but may be freely set by the user. In step S1204, the image synthesizer 6015 in FIG. 38 generates a single image for stereoscopic view on the basis of the set value.

Upon displaying an image for stereoscopic view, as described in the paragraphs of the prior art, a method of alternately outputting right and left images onto the display apparatus, and observing the images via liquid crystal shutter spectacles that perform shuttering in synchronism with the switching timings of the two images, and a method of alternately arranging two, right and left images in units of horizontal lines, placing on the images a sheet that alternately changes the direction of polarization in units of lines, and observing the images via spectacles that have different directions of polarization on the right and left sides are available. In this manner, a plurality of methods of displaying an image for stereoscopic view are available, and any of these methods can be applied in this embodiment.

The image generated in this manner is transferred to the VRAM 6020 by the display controller 6014 (FIG. 38) in the same manner as in the image sensing/display for panoramic view described above, and is displayed on the display apparatus 6003 in step S1205. In step S1206, images corresponding to the time and the number of frames set by the user are displayed, and it is checked if display is to end. If NO in step S1206, the flow returns to step S1202; otherwise, display of the display apparatus 6003 ends in step S1207.

As described above, an image for stereoscopic view is directly generated from the two, right and left images in the through display mode, and is displayed on the display apparatus 6003. In this manner, image sensing/display for stereoscopic view of moving images with a high frame rate can be realized.

<Recording Mode> . . . 14th Embodiment

The processing executed upon selection of the recording mode will be described below.

Figure 43:
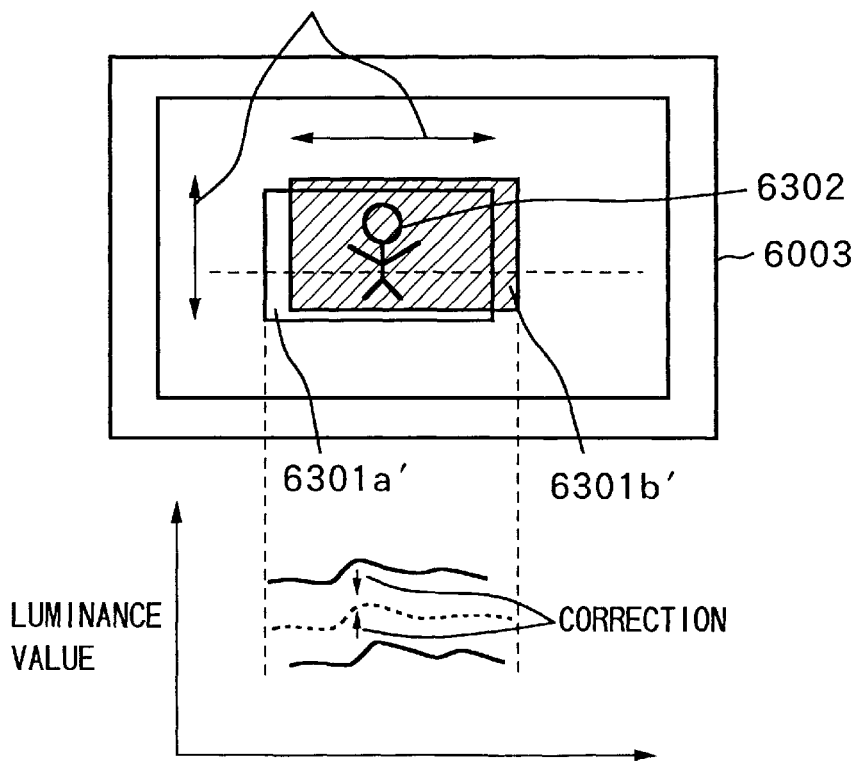
FIG. 43 is an explanatory view of a method of creating an image for stereoscopic view in a recording mode of the multi-eye image sensing apparatus.

FIG. 43 shows the image sensing/display method for stereoscopic view in the recording mode. In FIG. 43, reference numeral 6301a' denotes a left parallax image; 6301b', a right parallax image; and 6302, a principal object. When the recording mode is selected, right and left parallax images are sensed in step S1208. The binocular image sensing apparatus 6001 senses two, right and left image signals in the same manner as in the above-mentioned through display mode.

In the recording mode as well, display in the through display mode is done on the display apparatus 6003. More specifically, parallel to recording of an image for stereoscopic view, the overlapping amount is set at a predetermined value in step S1209. In step S1210, the image synthesizer 6015 in FIG. 38 synthesizes an image for stereoscopic view from the two, right and left images 6301b and 6301a on the basis of the set value. The synthesized image for stereoscopic view is transferred to the VRAM 6020 by the display controller 6014 (FIG. 38) and is displayed on the display apparatus 6003 in step S1211. The user can record an image for stereoscopic view while observing the image displayed on the display apparatus 6003.

However, in recording a panoramic synthesized image, when an image for stereoscopic view is generated based on the two images 6301b and 6301a in the through display mode, the two images 6301b and 6301a are directly synthesized by assigning a predetermined overlapping amount. In the recording mode of the 14th embodiment, before an image for stereoscopic view is generated, the image correction/overlapping amount calculator 6016 (FIG. 38) calculates the overlapping amount between two, right and left images 6301b' and 6301a' in step S1214. The overlapping amount of the two, right and left images 6301b' and 6301a' is set by extracting the images of the principal object 6302 from the two, right and left sensed images 6301b' and 6301a' and setting the parallax at zero. That is, the overlapping amount indicates an amount the two, right and left images 6301b' and 6301a' overlap each other when their images of the principal object 6302 just overlap each other. Hence, the overlapping amount used for generating an image for stereoscopic view is a variable value. In this embodiment, the parallaxis set at zero, but may be set at a value other than zero.

In step S1215, the image correction/overlapping amount calculator 6016 corrects the sensed images, i.e., compensates for the luminance and color differences between the two, right and left images produced by the image sensing optical systems 6004b and 6004a of the binocular image sensing apparatus 6001, and corrects trapezoidal distortion. FIG. 43 shows the correction state of luminance values that may become discontinuous at the joint portion between the right and left parallax images 6301b' and 6301a'. After such corrections and calculation of the overlapping amount, the image synthesizer 6015 (FIG. 38) synthesizes an image for stereoscopic view in step S1216. This synthesis is substantially the same as that in step S1204 in the through display mode, except for the substitution method of the overlapping amount as a parameter between the two, right and left images. Also, the two images to be synthesized have been subjected to image correction in the recording mode.

The image for stereoscopic view generated in this manner is transferred to and recorded in the storage device 6017 (FIG. 38) in step S1217. In this case, images for a plurality of frames are recorded in correspondence with user's setting. In step S1212, it is checked if display and recording are to end. If NO in step S1212, the flow returns to step S1208; otherwise, display and recording end in step S1213.

In this embodiment, the image for stereoscopic view is recorded. Alternatively, the two, right and left corrected images, and the overlapping amount as attribute information may be recorded.

<Reproduction Mode> . . . 14th Embodiment

Finally, the processing executed upon selection of the reproduction mode will be explained below.

When the reproduction mode is selected, a file of moving images stored in the storage device 6017 (FIG. 38) is read and is displayed on the display apparatus 6003 in step S1218. In this case, images are transferred to the VRAM 6020 under the control of the display controller 6014 in FIG. 38, and are displayed on the display apparatus 6003 as in the above-mentioned through display mode.

As described above, moving images corresponding to the user's purpose can be displayed by switching the modes. Since an image for stereoscopic view is generated and displayed on the basis of two, right and left moving images sensed in the through display mode, the processing time per frame can be short, and moving images with a high frame rate can be presented in real time. In the recording mode, since an image for stereoscopic view is generated after image correction and calculation of an appropriate overlapping amount are done, when the recorded image is displayed on the display apparatus 6003 in the reproduction mode later, an image for stereoscopic view with high image quality can be obtained.

In the 13th and 14th embodiments described above, the through display mode or recording mode is selected before image sensing, and thereafter, the individual processing steps for sensing images are executed. Alternatively, when the mode selector 6018 turns on/off the recording mode from the through display mode, a processing algorithm that performs synthesis and recording of an image parallel to the through display mode of the display apparatus 6003 can be realized.

Upon image sensing of the binocular image sensing apparatus, the image sensing optical systems are set using mirrors and the like so that the view points of images to be sensed match each other in image sensing/display for panoramic view, while they are set parallel to each other to be separated by 65 mm in image sensing/display for stereoscopic view. However, the layout of these image sensing optical systems can be easily changed. Hence, a single binocular image input/output apparatus can realize both two-dimensional image sensing/display for panoramic view and three-dimensional image sensing/display for stereoscopic view.

<15th Embodiment>

The 15th embodiment of the present invention will be described below with reference to FIGS. 44 to 47.

In this embodiment, the parallax of the principal object in sensed images for stereoscopic view is reduced to zero by changing the convergence angle and base distance of image sensing optical systems, thus allowing the user to easily fuse the images of the principal object.

Figure 44:
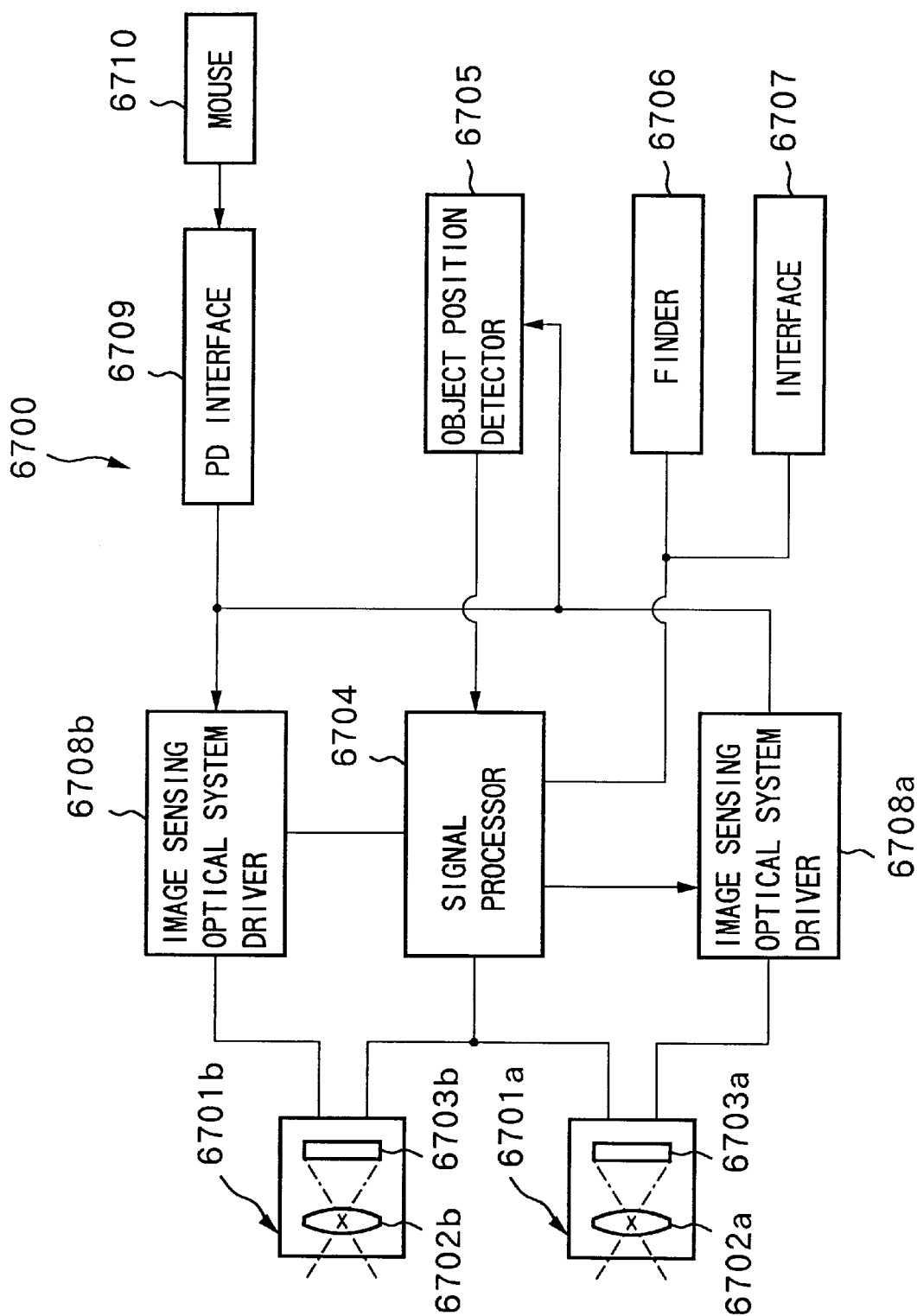
FIG. 44 is a block diagram showing the arrangement of a system having a multi-eye image sensing apparatus according to the 15th embodiment of the present invention.

FIG. 44 is a block diagram showing the arrangement of a binocular image sensing apparatus according to the 15th embodiment of the present invention. In FIG. 44, reference numeral 6700 denotes a binocular image sensing apparatus, which comprises two, right and left image sensing optical systems 6701b and 6701a, a signal processor 6704, an object position detector 6705, a finder 6706, an interface 6707, image sensing optical system drivers 6708b and 6708a for the image sensing optical systems 6701b and 6701a, a pointing device (PD) 6710 such as a mouse or the like, and an interface 6709 for attaining interfacing between the PD and the image sensing apparatus.

The image sensing optical systems 6701b and 6701a respectively comprise lenses 6702b and 6702a, and CCDs 6703b and 6703a as image sensing devices. Images sensed by the two image sensing optical systems 6701b and 6701a are sent to the signal processor 6704, and are subjected to image processing such as synthesis of an image for stereoscopic view, image correction, image output, and the like. The signal processor 6704 is connected to the object position detector 6705, the finder 6706, and the interface 6707. The finder 6706 is used for outputting the image subjected to the image correction and synthesis, and the user can observe an image for stereoscopic view by looking into the finder 6706. When an image is to be edited by an external apparatus (not shown) such as a personal computer or the like, or is displayed on a display apparatus (not shown), the image is transferred to such external apparatus via the interface 6707.

The object position detector 6705 has a calculation unit for calculating the depth of the principal object, selected by the PD 6710, from the image sensing optical system, and a convergence angle required for setting the parallax of the principal object at zero.

Detection of the convergence angle by the object position detector 6705 will be explained below.

More specifically, the user designates one point included in the object of interest using the PD 6710 such as a mouse in an image sensed by the left image sensing optical system and displayed on the finder 6706. The detector 6705 detects the corresponding point of the designated point from the right parallax image. Based on the pair of corresponding points, the detector 6705 calculates parallax at that position, and calculates the position of the principal object, i.e., the depth from the image sensing optical system, on the basis of the parallax. Furthermore, the detector 6705 calculates the convergence angle required when the control based only on the convergence angle is done to set the parallax of the principal object at zero.

Note that the method of selecting the principal object in the image is not limited to that using the PD interface 6709, but the principal object in an image may be automatically extracted. Alternatively, assuming that the principal object is located at the center of an image, the central point of the image is determined in advance, and the parallax of that portion may be adjusted.

Assume that images of a principal object 6094 are sensed by the two image sensing optical systems 6701b and 6701a in FIG. 44. When the object 6904 is selected by the object position detector 6705 in the binocular image sensing apparatus 6700 in FIG. 44, a depth z of the selected object 6904 from each of the two image sensing optical systems 6701b and 6701a is detected.

The object position detector 6705 sends the position information of the principal object 6904 to the image sensing optical system drivers 6708b and 6708a, and the image sensing optical system drivers 6708b and 6708a automatically control the convergence angle and parallel-displacement amount of the image sensing optical systems 6701b and 6701a on the basis of the position information of the principal object 6904.

The convergence angle control and parallel-displacement control of the image sensing optical systems 6701b and 6701a will be explained below.

Figure 1:
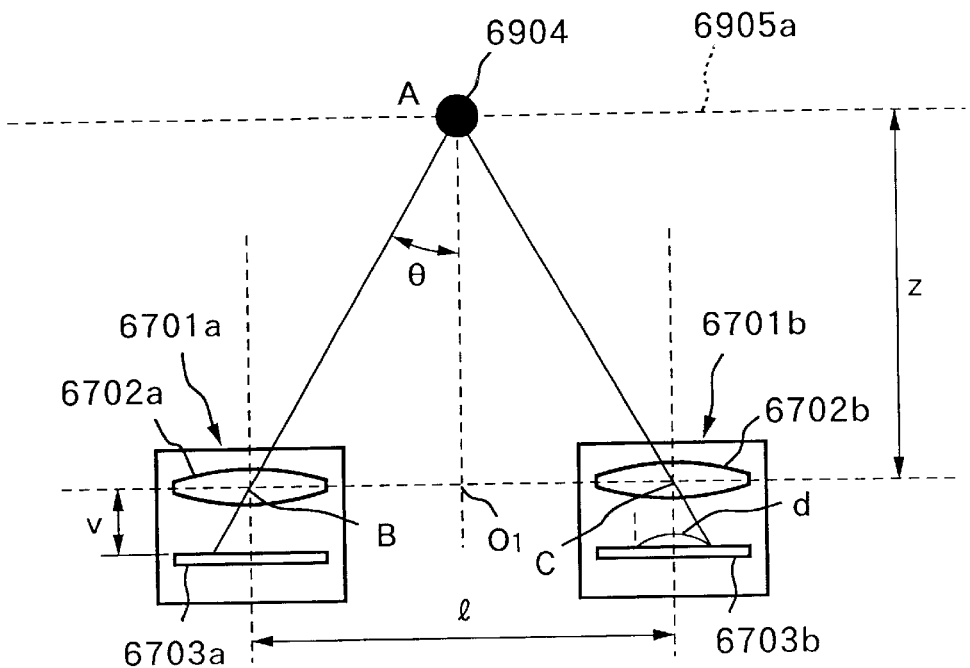
FIG. 1 is an explanatory view of three-dimensional image sensing/image display for stereoscopic view based on parallel view according to the conventional technique.
Figure 2:
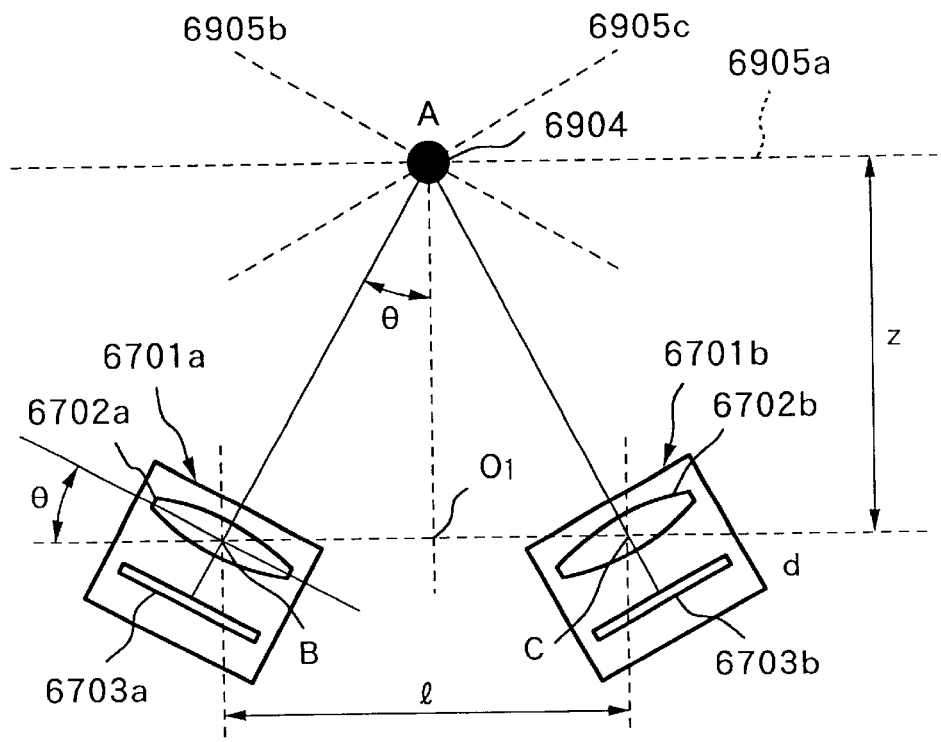
FIG. 2 is an explanatory view of three-dimensional image sensing/image display for stereoscopic view based on convergence angle control.
Figure 3:
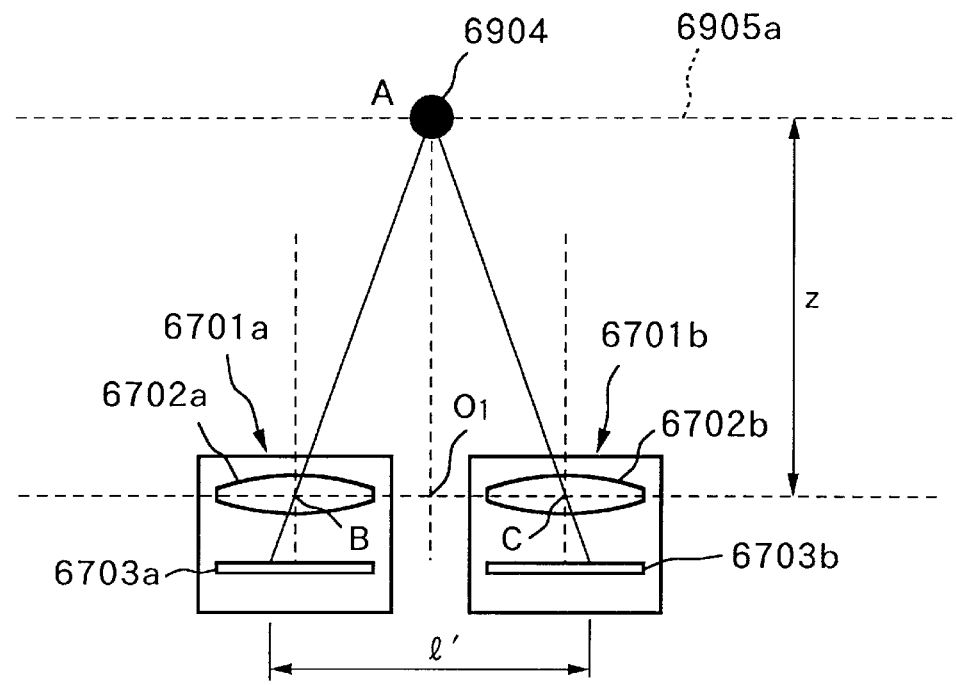
FIG. 3 is an explanatory view of three-dimensional image sensing/image display for stereoscopic view based on base distance control.
Figure 4:
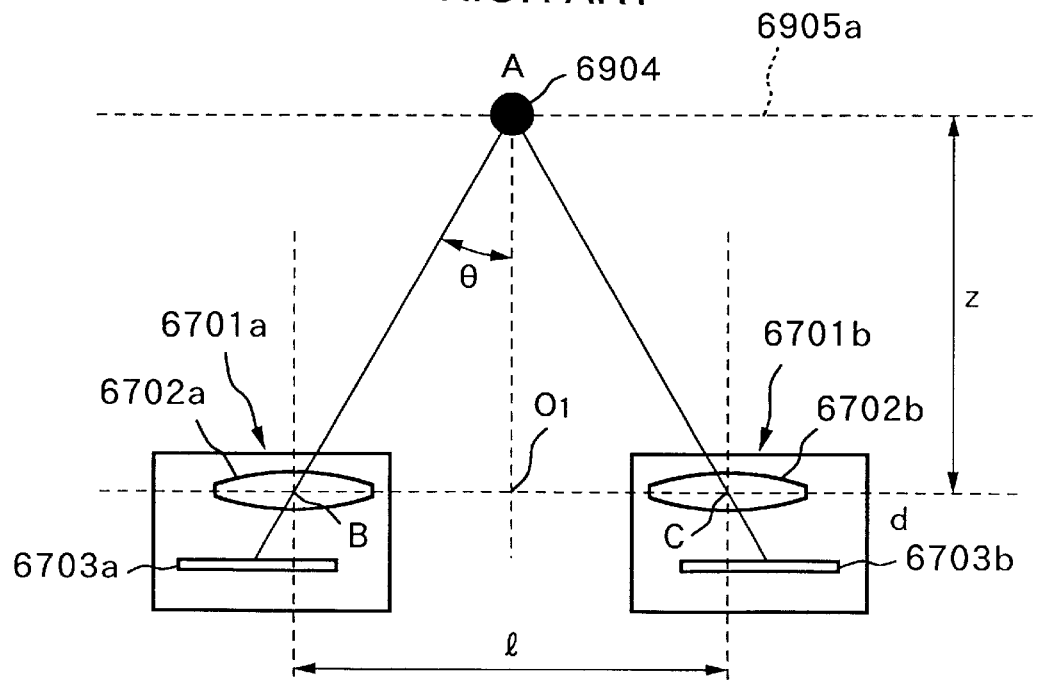
FIG. 4 is an explanatory view of three-dimensional image sensing/image display for stereoscopic view by parallelly displacing CCDs in a multi-eye image sensing apparatus.

As described above, a conventional parallax adjustment method based only on the convergence angle or parallel-displacement is available. As for the control method based on the convergence angle, an angle θ determined by the distances z between the image sensing optical systems 6701b and 6701a and the principal object 6904, and a base distance Q, as shown in FIG. 2, is calculated by equation (1) below, as mentioned previously:

$$\theta = \arctan\frac{l}{2z} \quad (1)$$

When the image sensing optical systems 6701b and 6701a are assigned a convergence angle that equals the angle θ, the parallax of the principal object 6904 can be reduced to zero. However, when the right and left image sensing optical systems 6701b and 6701a are respectively assigned a convergence angle, since they have different conjugate planes 6905c and 6905b, a distorted image is formed in the peripheral image portion excluding the principal object 6904. As the convergence angle becomes larger, this distortion becomes larger and it becomes harder to obtain a good image for stereoscopic view.

Hence, in this embodiment, the convergence angle assigned to each of the image sensing optical systems 6701b and 6701a is set to have a limit value defining on allowable range as an image for stereoscopic view, and is not increased beyond the limit value.

As the limit value of the convergence angle, a value based on given setting conditions or empirically obtained value may be used. The limit value of the convergence angle is held in a memory arranged in each of the image sensing optical system drivers 6708b and 6708a shown in FIG. 44, and it is always be checked during driving the optical system if the convergence angle of each of the image sensing optical systems 6701b and 6701a has reached the limit value.

In this embodiment, the base distance Q between the image sensing optical systems 6701b and 6701a is set at 65 mm, and their convergence angle can be controlled to reduce the parallax to zero for the object position range from infinity to 1 m. That is, in equation (1) above, given l=65 mm z=1 m the limit value of the angle θ is 0.0325 (rad) (=1.86°), and this image sensing optical system can have a convergence angle up to 1.86°.

The method of controlling the image sensing optical systems 6701b and 6701a to reduce, to zero, the parallax of the principal object 6904, which is located 1 m in front of the image sensing optical systems 6701b and 6701a will be explained below with reference to the flow chart in FIG. 45.

Figure 46:
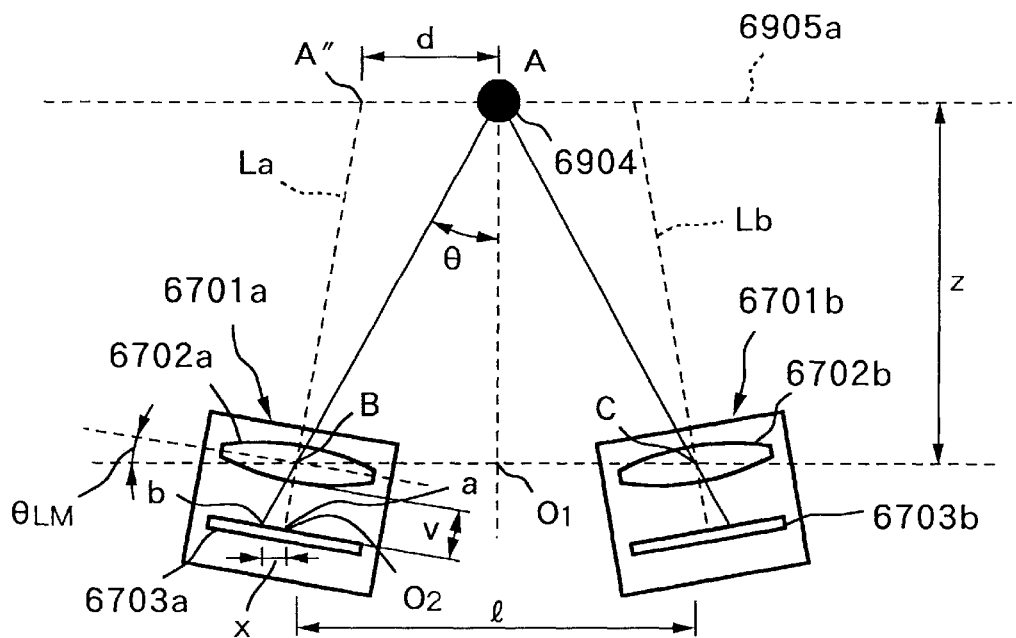
FIG. 46 is an explanatory view of three-dimensional image sensing/image display for stereoscopic view based on convergence angle control up to a convergence limit in the multi-eye image-sensing apparatus.

FIG. 46 shows the layout of the two image sensing optical systems 6701b and 6701a with a convergence angle up to the determined limit value. In FIG. 46, $\theta_{LM}$ represents the limit value of the convergence angle.

Figure 45:
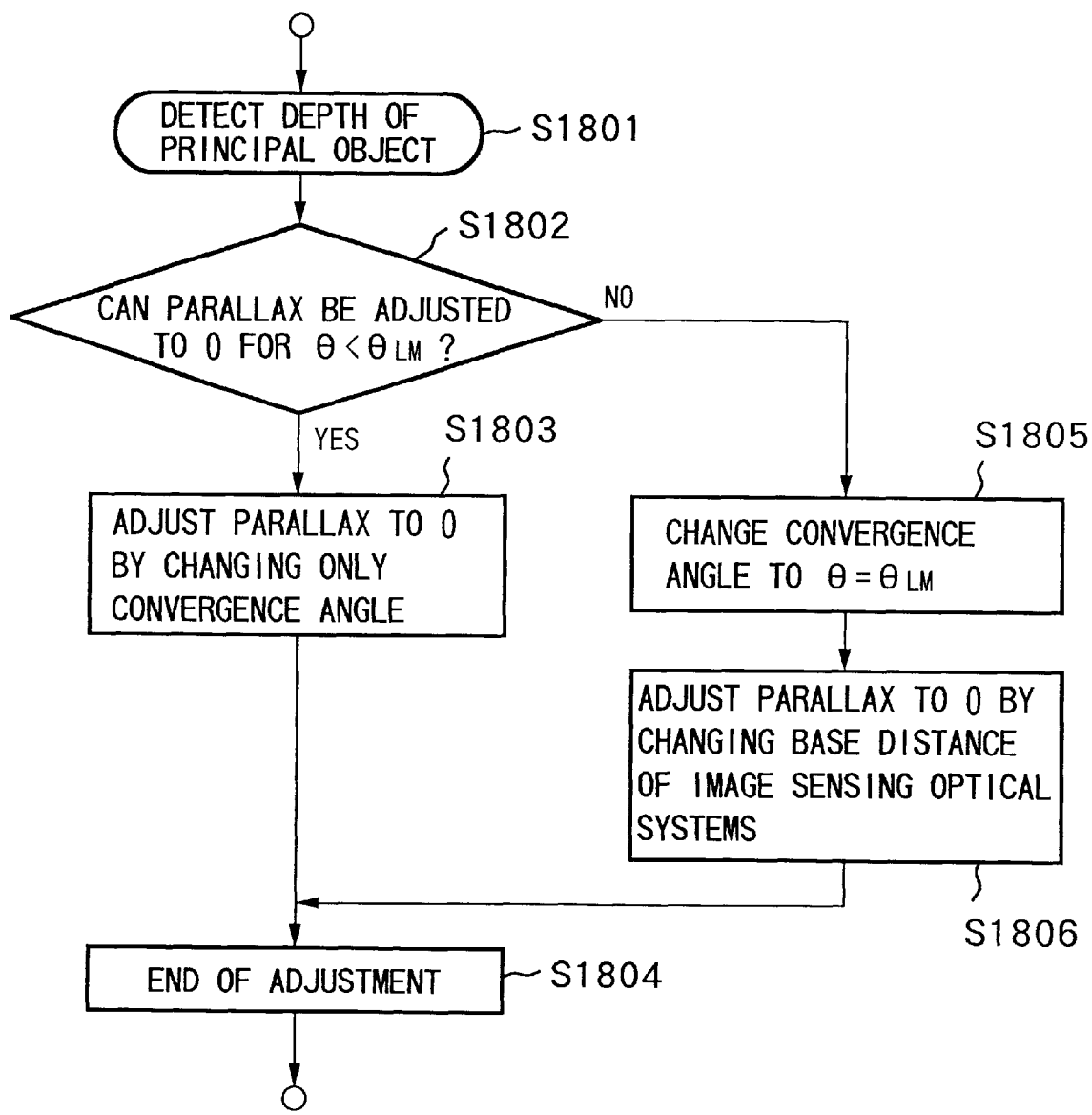
FIG. 45 is a flow chart showing the flow of the processing for reducing the parallax of a principal object to zero in the multi-eye image sensing apparatus.

In FIG. 45, the object position detector 6705 detects the principal object 6904 and detects the depth z from each of the image sensing optical systems 6701b and 6701a in step S1801. In step S1802, the convergence angle θ required for reducing the parallax of the principal object 6904 to zero by controlling only the convergence angle is calculated based on the depth z detected in step S1801. Also, in step S1802, the calculated convergence angle θ is compared with the limit value $\theta_{LM}$ of the convergence angle held in a memory (not shown) of each of the image sensing optical system drivers 6708b and 6708a in advance to check if $$\theta<\theta_{LM}$$

and if the parallax can be adjusted to zero. If the convergence angle required for reducing the parallax to zero is smaller than the limit value $\theta_{LM}$, i.e., if $$\theta<\theta_{LM}$$

and if the parallax can be adjusted to zero, the parallax is adjusted to zero by changing the convergence angle θ alone in step S1803. In step S1804, the adjustment ends.

On the other hand, if it is determined in step S1802 that the convergence angle θ required for reducing the parallax to zero is larger than the limit value $\theta_{LM}$, i.e., that $$\theta>\theta_{LM}$$

and the parallax cannot be adjusted to zero, the convergence angle is changed, in step S1805, until $$\theta=\theta_{LM}$$

holds, that is, the convergence angle is changed up to the limit value, and the drivers 6708b and 6708a change the base distance of the image sensing optical systems 6701b and 6701a to adjust the parallax to zero in step S1806.

Assume that an optical axis $L_a$ of the left image sensing optical system 6701a crosses a conjugate plane 6905a of the image sensing surface upon parallel view at a position A". At this time, a distance d between a position A of the principal object 6904 and the position A" is calculated by equation (2) below:

$$d=l/2-z \cdot \tan \theta_{LM} \quad (2)$$

Hence, by moving the left image sensing optical system 6701a by d in the direction of an origin $O_1$, the intersection A" between the optical axis $L_a$ of the left image sensing optical system 6701a and the conjugate plane 6905a of the image sensing surface can be adjusted to agree with the position A of the principal object 6904.

Also, in FIG. 46, since the right image sensing optical system 6701b is located at a position symmetrical to the left image sensing optical system 6701a about the origin $O_1$, the right image sensing optical system 6701b is similarly par- allelly displaced in the direction of the origin $O_1$ to shorten the base distance Q, thus adjusting the position of its optical axis $L_b$ to agree with the position of the principal object 6904. In this manner, the parallax of the principal object 6904 in the images sensed by the two image sensing optical systems 6701b and 6701a can be adjusted to zero.

Figure 47:
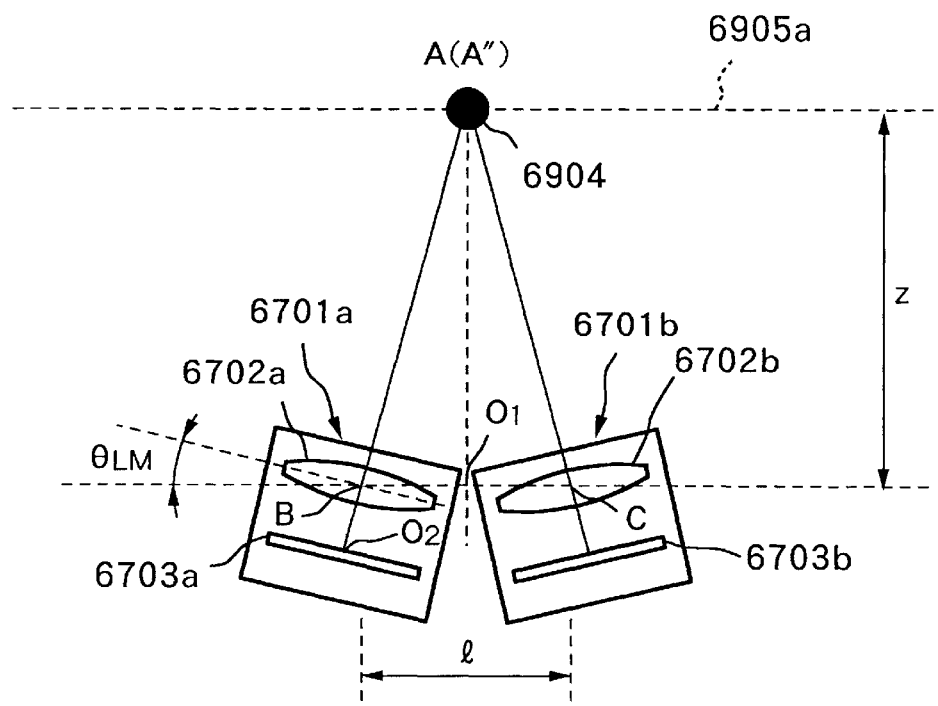
FIG. 47 is an explanatory view of three-dimensional image sensing/image display for stereoscopic view based on convergence angle control up to a convergence limit and base distance control in the multi-eye image sensing apparatus.

FIG. 47 shows the layout of the two image sensing optical systems 6701b and 6701a when the parallax of the principal object 6904 is adjusted to zero by limiting the convergence angle θ to the limit value $\theta_{LM}$ and parallelly displacing the optical systems to shorten the base distance Q.

As described above, the convergence angle θ to be assigned to each of the two image sensing optical systems 6701b and 6701a is set to have the limit value $\theta_{LM}$ that allows images to be observed as a three-dimensional image, and upon adjustment beyond the limit value $\theta_{LM}$, the base distance Q between the two image sensing optical systems 6701b and 6701a is shortened. In this manner, satisfactory images for stereoscopic view that allow the user to easily fuse images of the principal object 6904 can be obtained.

This embodiment is directed to parallax reduction of the principal object 6904 to zero. However, the present invention is not limited to this, but can be applied to a case wherein the parallax is adjusted to an arbitrary parallax amount.

<16th Embodiment>

The 16th embodiment of the present invention will be described below with reference to FIG. 46 and FIGS. 48 to 50.

In this embodiment, the convergence angle θ of each image sensing optical system is changed, and the position of the image sensing device (CCD) in each image sensing optical system is parallelly displaced so as to reduce the parallax of the principal object in images for stereoscopic view to zero, thus allowing the user to easily fuse images of the principal object.

Figure 48:
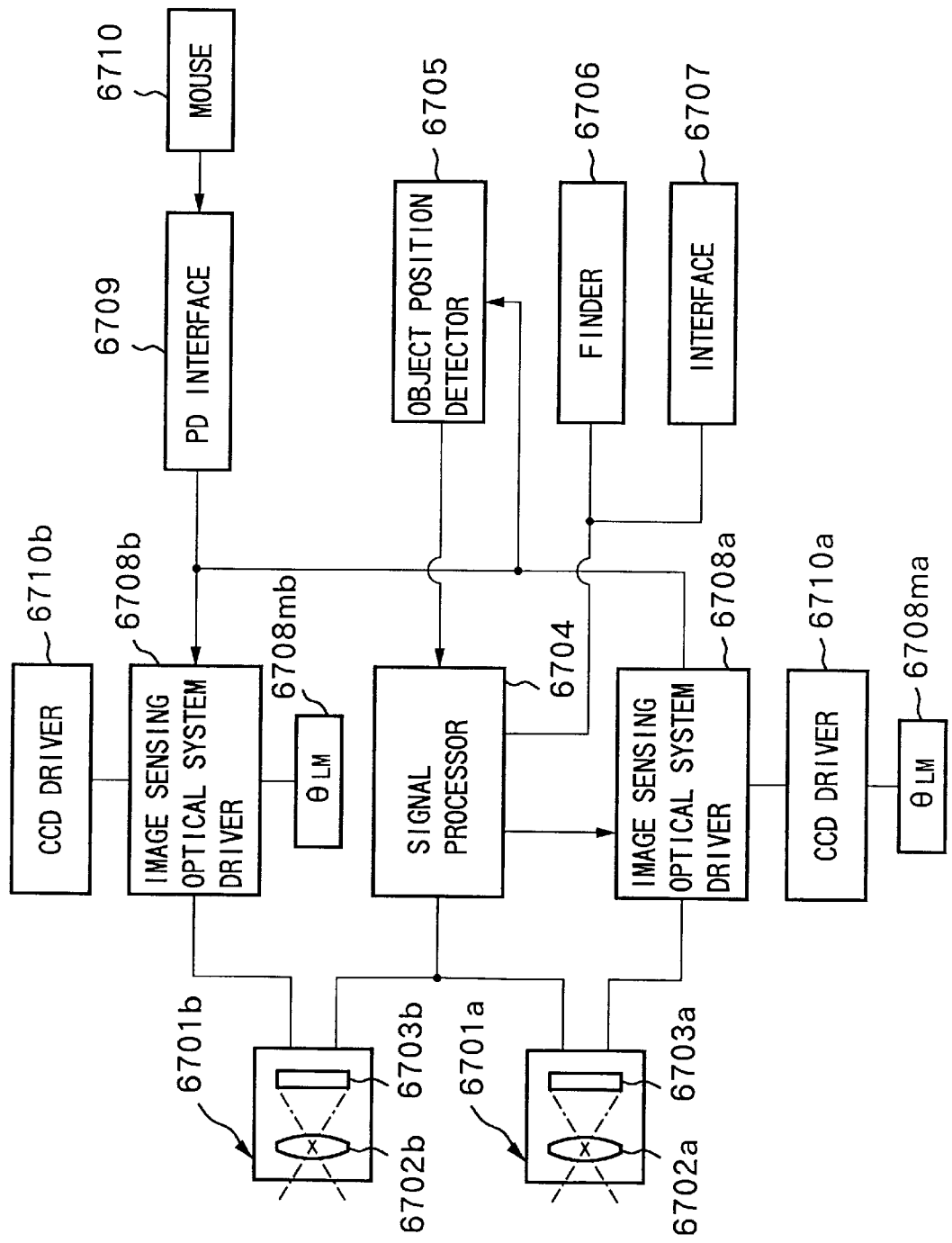
FIG. 48 is a block diagram showing the arrangement of a system having a multi-eye image sensing apparatus according to the 16th embodiment of the present invention.

FIG. 48 is a block diagram showing the arrangement of a binocular image sensing apparatus according to the 16th embodiment of the present invention. The same reference numeral in FIG. 48 denote the same parts as in FIG. 44 in the 15th embodiment. In FIG. 48, the difference from FIG. 44 is that CCD drivers 6710b and 6710a for driving the CCDs 6703b and 6703a are added to the arrangement of FIG. 44.

In this embodiment as well, the image sensing optical systems 6701b and 6701a can be assigned a convergence angle up to the limit value $\theta_{LM}$ determined in FIG. 46, as in the convergence angle control method in the above- mentioned 15th embodiment.

In the 15th embodiment described above, when the convergence angle exceeds its limit value $\theta_{LM}$, the convergence angle is increased up to the limit value $\theta_{LM}$, and the base distance Q between the image sensing optical systems 6701b and 6701a is shortened to control the parallax.

In this embodiment, however, instead of shortening the base distance Q between the image sensing optical systems 6701b and 6701a, the CCDs 6703b and 6703a are parallelly displaced by the CCD drivers 6710b and 6710a to reduce the parallax of the principal object 6904 to zero.

Figure 49:
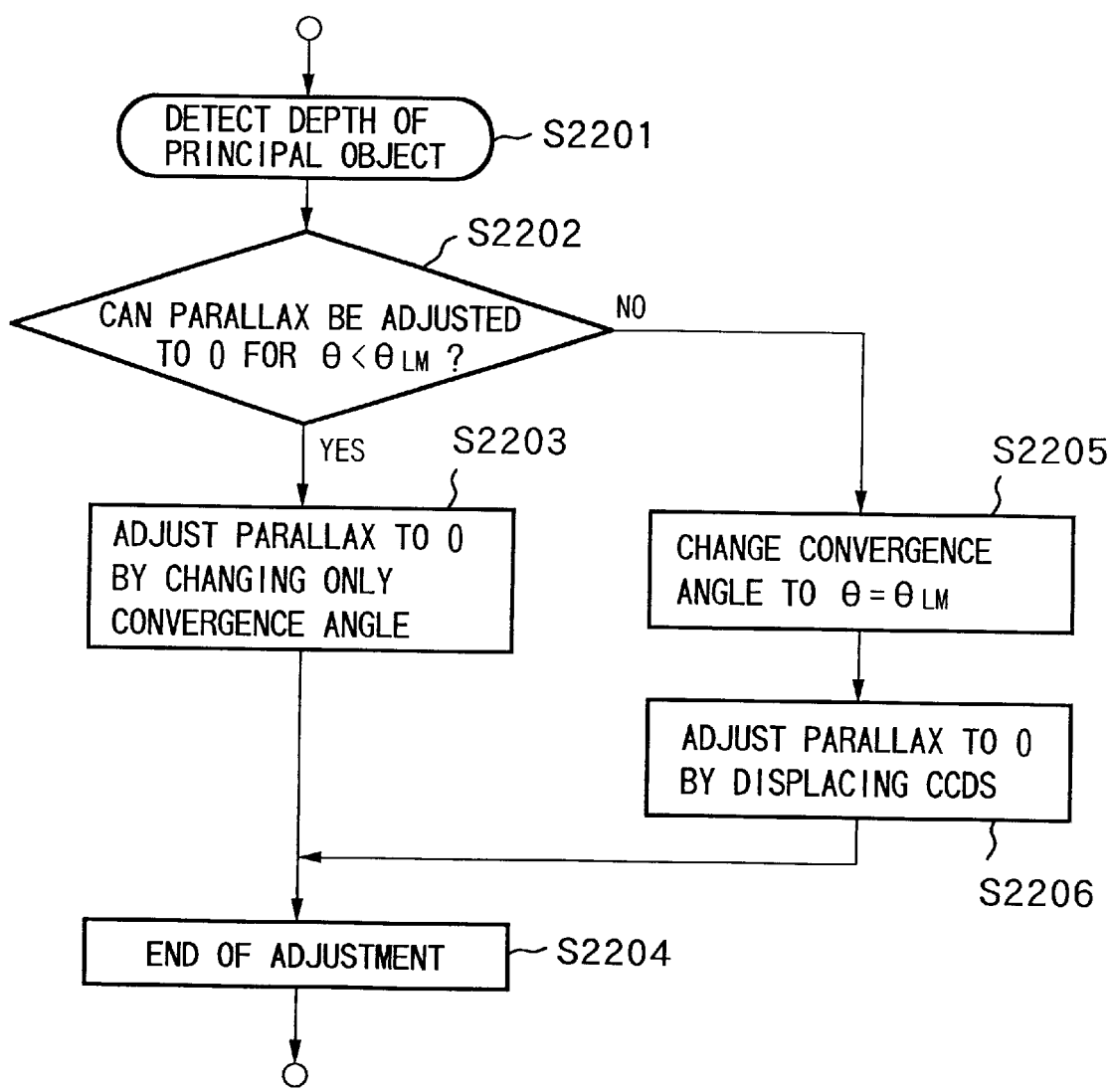
FIG. 49 is a flow chart showing the flow of the processing for reducing the parallax of a principal object to zero in the multi-eye image sensing apparatus.

The flow of the processing for reducing the parallax to zero according to this embodiment will be described below with the aid of the flow chart in FIG. 49.

In step S2201, the object position detector 6705 detects the principal object 6904 and detects the depth z from each of the image sensing optical systems 6701b and 6701a. In step S2202, the convergence angle θ required for reducing the parallax of the principal object 6904 to zero by controlling only the convergence angle is calculated based on the depth z detected in step S2201, and is compared with the limit value $\theta_{LM}$ of the convergence angle held in advance in a memory ($6708_{bm}$, $6708_{am}$) of each of the optical system drivers 6708b and 6708a, so as to check if the parallax d can be adjusted to zero for $\theta < \theta_{LM}$.

If the convergence angle θ required for reducing the parallax of the principal object 6904 to zero is smaller than the limit value $\theta_{LM}$, i.e., if $\theta < \theta_{LM}$ holds, and the parallax can be adjusted to zero, the parallax is reduced to zero by controlling the convergence angle θ alone in step S2203, and the adjustment ends in step S2204.

On the other hand, in some cases, the required convergence angle of each of the image sensing optical systems 6701b and 6701a may be larger than the limit value $\theta_{LM}$. If the convergence angle θ required for reducing the parallax d to zero is larger than the limit value $\theta_{LM}$, i.e., if the parallax cannot be adjusted to zero for $\theta < \theta_{LM}$ the convergence angle θ is increased up to the limit value $\theta_{LM}$ in step S2205, and the parallax is reduced to zero by parallelly displacing the CCDs 6703b and 6703a by the CCD drivers 6710b and 6710a in FIG. 48.

In FIG. 46, the image of the principal object 6904 formed on the CCD 6703a by the left image sensing optical system 6701a is located at a point b. A case will be examined below wherein the image of the principal object 6904 is parallelly displaced to a center $O_2$ of the surface of the CCD 6703a. Let v be the distance between the far-side principal plane of the lens 6702a and the CCD 6703a, and x be the distance between b and $O_2$. Then, x is given by:

$$x = v \cdot \tan(\theta - \theta_{LM}) \qquad (3)$$
$$= v \cdot l - 2z \cdot \tan\frac{\theta_{LM}}{2z} + l \cdot \tan\theta_{LM}$$

Hence, by shifting the CCD 6703a by x in a direction perpendicular to the optical axis $L_a$ so that the point b approaches $O_2$, the position of the image of the principal object 6904 can be moved by the distance x to the center $O_2$ of the CCD 6703a.

Figure 50:
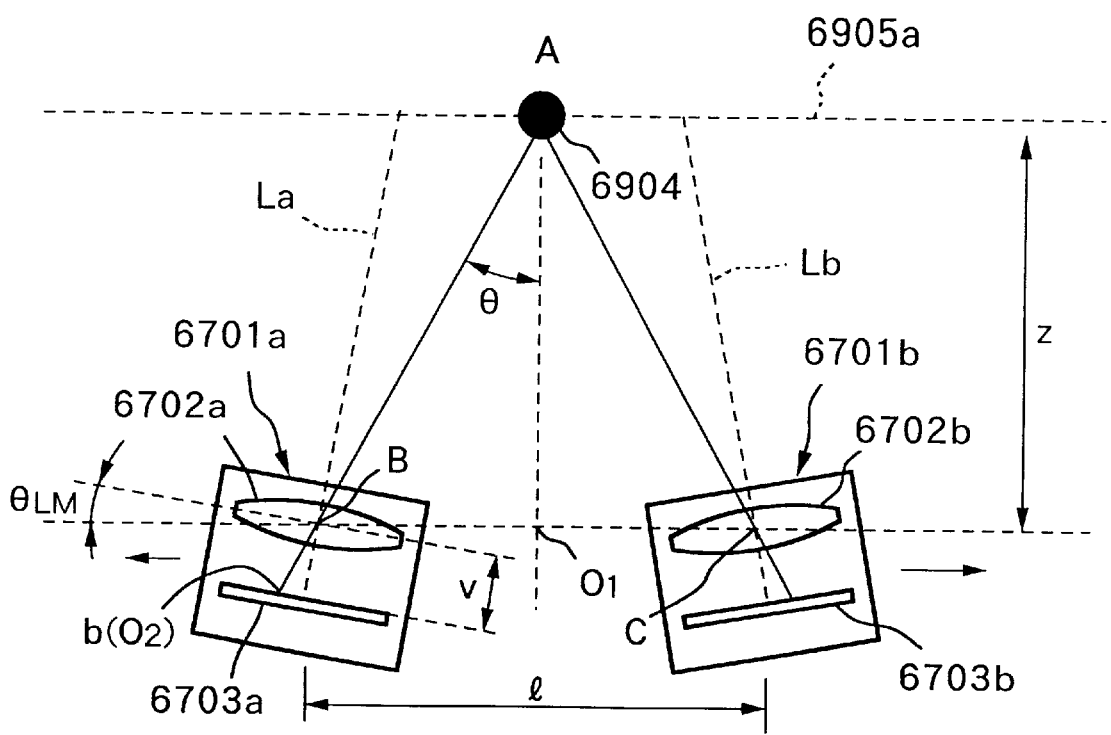
FIG. 50 is an explanatory view of three-dimensional image sensing/image display for stereoscopic view based on convergence angle control up to a convergence limit and CCD parallel-displacement in the multi-eye image sensing apparatus.

FIG. 50 shows the layout of the image sensing optical systems 6701b and 6701a when the parallax of the principal object 6904 is reduced to zero by parallelly displacing the CCD 6703a in the direction perpendicular to the optical axis $L_a$ and in a direction to separate from the origin $O_1$.

<Advantages of 16th Embodiment>

As described above, the convergence angle θ to be assigned to each of the two image sensing optical systems 6701b and 6701a is set to have the limit value $\theta_{LM}$ that allows images to be observed as a three-dimensional image, and upon adjustment beyond the limit value $\theta_{LM}$ the CCDs 6703b and 6703a in the two image sensing optical systems 6701b and 6701a are parallelly displaced in a direction to separate from the origin $O_1$ to reduce the parallax of the principal object 6904 to zero. In this manner, satisfactory images for stereoscopic view that allow the user to easily fuse images of the principal object 6904 can be obtained. On the other hand, in parallax adjustment by only parallel-displacement of the CCDs 6703b and 6703a, since the parallel-displacement amount becomes large, its control is hard to attain. However, according to this embodiment, since the parallel-displacement control is used together with the convergence angle control, the load on the parallel-displacement control can be reduced.

This embodiment is directed to parallax reduction of the principal object 6904 to zero as in the 15th embodiment described above. However, the present invention is not limited to this, but can be applied to a case wherein the parallax is adjusted to an arbitrary parallax amount.

Furthermore, the CCDs are used as image sensing devices. However, the present invention is not limited to such specific devices, but other image sensing devices may be used.

<17th Embodiment>

The 17th embodiment of the present invention will be described below with reference to FIGS. 44, 46, and 51. Note that the arrangement of a binocular image sensing apparatus of this embodiment is the same as that shown in FIG. 44 in the 15th embodiment described above, and will be explained by quoting it.

In the 15th and 16th embodiments described above, the convergence angle θ of each of the image sensing optical systems 6701b and 6701a is changed up to the predetermined limit value $\theta_{LM}$ and the control of the parallax beyond the limit value $\theta_{LM}$ is realized by hardware.

In this embodiment, after the convergence angle θ of each of the image sensing optical systems 6701b and 6701a is changed up to the predetermined limit value $\theta_{LM}$, sensed images themselves upon actually generating an image for stereoscopic view from two, right and left sensed images are parallelly displaced to adjust the parallax of the image for stereoscopic view.

FIG. 51 is an explanatory view of image sensing/display for stereoscopic view by the control of the convergence angle θ up to the limit value $\theta_{LM}$ and software in the binocular image sensing apparatus according to this embodiment. In this embodiment as well, the image sensing optical systems 6701b and 6701a can be assigned a convergence angle up to the limit value $\theta_{LM}$ determined in FIG. 46.

As has been described in the 16th embodiment above, the position of the image of the principal object 6904 on the CCD deviates by x from the center $O_2$ of the CCD. Hence, the positions of the images of the principal object 6904 deviate by 2x from each other on the CCD surfaces. If this deviation amount 2x and an element size s of each CCD are known, a deviation amount p (pixel) in the sensed image can be calculated by the following equation (4):

$$p = \frac{2x}{s} \qquad (4)$$

The image sensing optical system driver 6708a (FIG. 44) calculates the deviation amount x and transfers it to the signal processor 6704, which converts the amount x into the deviation amount p in the sensed image.

The signal processor 6704 displays, on the display of the finder 6706, an image 7402 for stereoscopic view synthesized in a state wherein a right parallax image 7401b is shifted by p (pixel) with respect to a left parallax image 7401a in FIG. 51.

For example, when right and left images are alternately output onto the display of the finder 6706 and the user observes these images via liquid crystal shutter spectacles that switch right and left shutters in synchronism with the display switching timings of the right and left parallax images, the right and left images can be alternately output while being shifted by p (pixels) from each other. On the other hand, when a stripe-pattern image consisting of two, right and left images is generated by alternately arranging the two, right and left images on a predetermined region for a single image for stereoscopic view in units of horizontal lines, the two images can be synthesized to have a shift of p (pixel) to generate the image for stereoscopic view.

<Advantages of 17th Embodiment>

When the parallax control beyond the limit value of the convergence angle is to be done, as described above, a right parallax image is parallelly displaced by software with respect to a left parallax image upon generating an image for stereoscopic view, thus reducing the parallax of the principal object 6904 to zero. With this processing, satisfactory images for stereoscopic view that allow the user to easily fuse images of the principal object 6904 can be obtained without any hardware load.

This embodiment is directed to reduce the parallax of the principal object 6904 to zero as in the 15th embodiment described above. However, the present invention can be applied to a case wherein the parallax is adjusted to an arbitrary parallax amount. According to this embodiment, even when an image for stereoscopic view is generated and reproduced based on right and left sensed images recorded on a memory, it can be displayed to have an arbitrary parallax amount. Furthermore, the principal object 6904 serving as the object to be sensed throughout the third to 17th embodiments is always located on the bisector between the right and left image sensing optical systems 6701*b* and 6701*a*. However, the parallax of even an object present at an arbitrary position within the image sensing range of the binocular image sensing apparatus can be controlled as a principal object.

<18th Embodiment>

The 18th embodiment of the present invention will be described below with reference to FIGS. 44 and 47, and FIGS. 52 to 56. Note that the arrangement of a binocular image sensing apparatus of this embodiment is the same as that shown in FIG. 44 in the 15th embodiment described above, and will be explained by quoting it.

In the 15th and 16th embodiments described above, when the user selects the principal object 6904 in the sensed image via the object position detector 6705, the image sensing optical systems automatically move.

In this embodiment, the user controls the image sensing optical systems via an interface in place of automatically controlling them.

Figure 52:
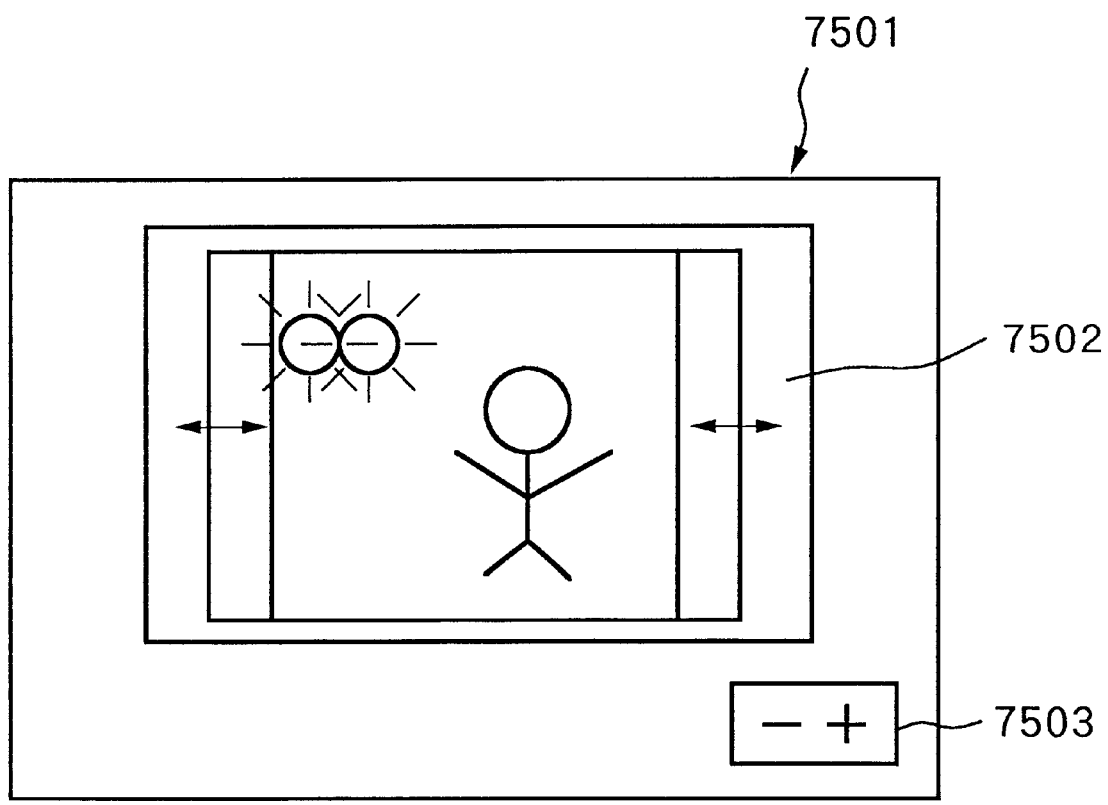
FIG. 52 is an explanatory view of a finder and control button for a multi-eye image sensing apparatus according to the 18th embodiment of the present invention.

FIG. 52 shows a binocular image sensing apparatus with a user interface for convergence angle/parallel-displacement amount control. Referring to FIG. 52, reference numeral 7501 denotes a binocular image sensing apparatus, which has, on its rear surface, a finder 7502 and a control button 7503. The control button 7503 indicates the PD interface 6709.

In FIG. 44, the PD interface 6709 is connected to the two image sensing optical system drivers 6708*b* and 6708*a*. The user sends a control signal to the image sensing optical system drivers 6708*b* and 6708*a* via the control button 7503 to control the two image sensing optical systems 6701*b* and 6701*a*. The control button 7503 has (+) and (−) directions to change the convergence angle, and by pressing this control button 7503, the image sensing optical systems 6701*b* and 6701*a* can be moved.

Figure 53:
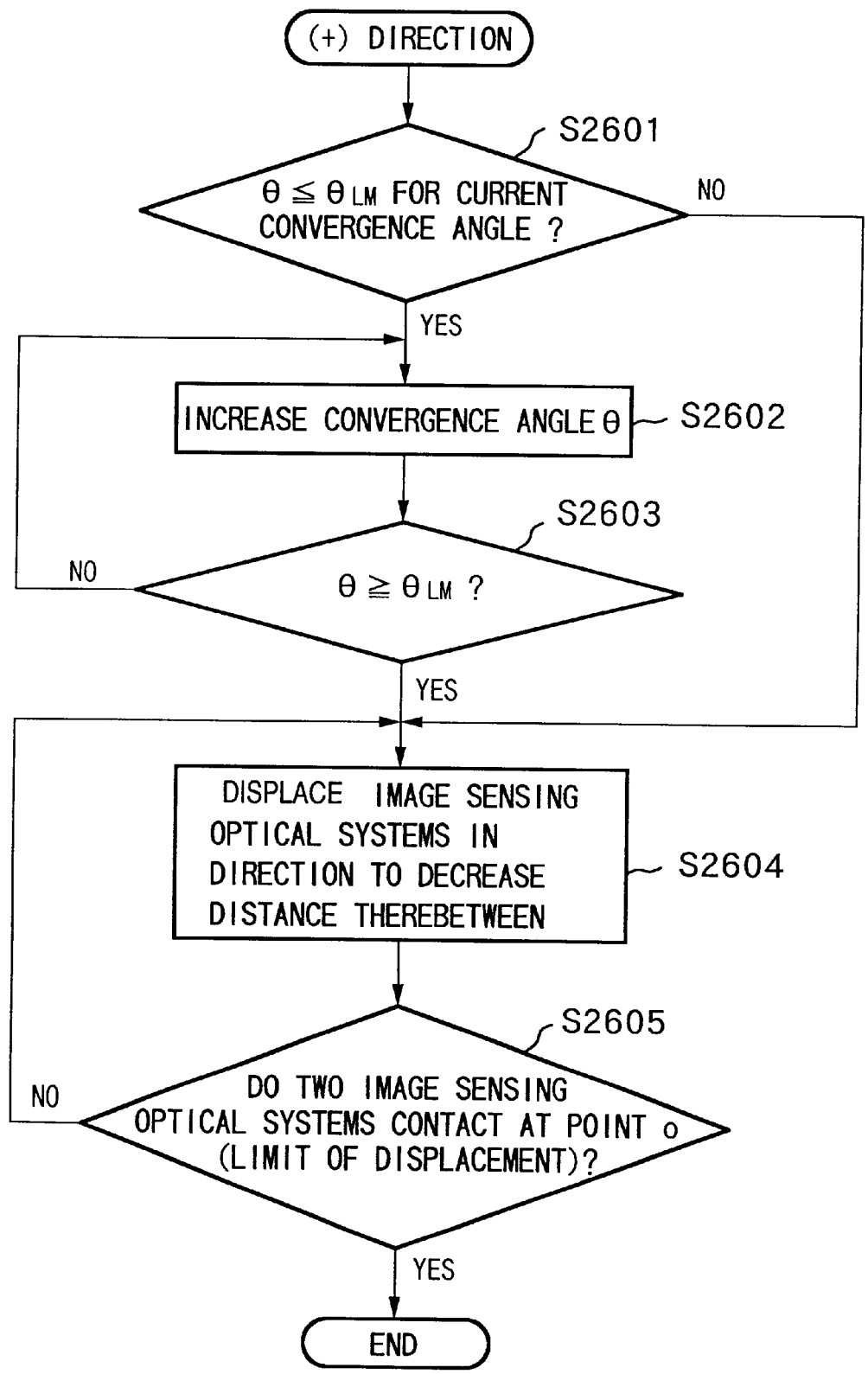
FIG. 53 is a flow chart showing the flow of the processing of a method d of moving image sensing optical systems in the plus (+) direction by a user interface of the multi-eye image sensing apparatus.
Figure 54:
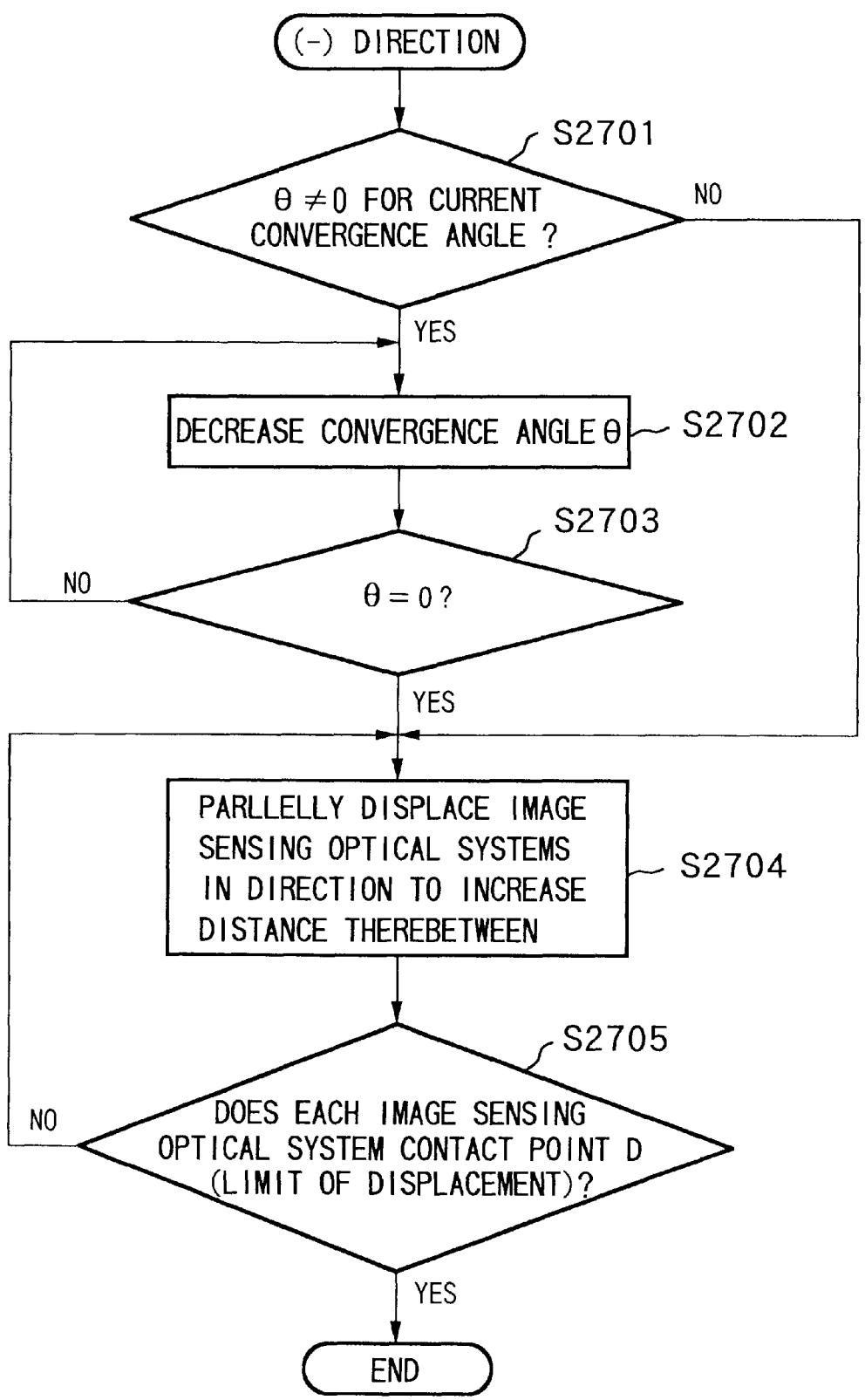
FIG. 54 is a flow chart showing the flow of the processing of a method of moving image sensing optical systems in the minus (−) direction by the user interface of the multi-eye image sensing apparatus.

The flow of the moving processing of the image sensing optical systems 6701*b* and 6701*a* by the control button 7503 will be described below with reference to the flow charts in FIGS. 53 and 54.

Figure 55:
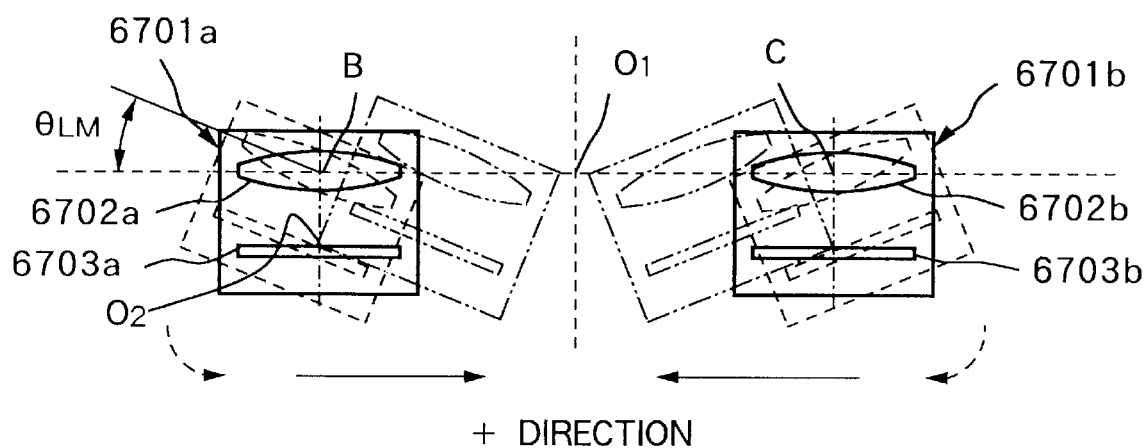
FIG. 55 is an explanatory view of manual convergence angle control up to a convergence limit and base distance control in the (+) direction in the multi-eye image sensing apparatus.
Figure 56:
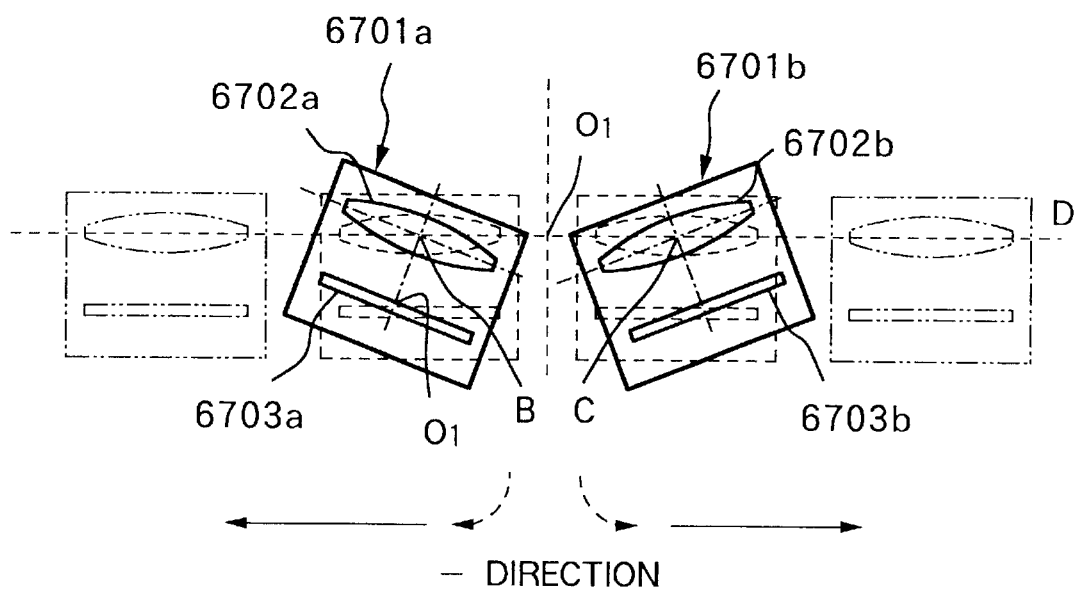
FIG. 56 is an explanatory view of manual convergence angle control up to a convergence limit and base distance control in the (−) direction in the multi-eye image sensing apparatus.

In this embodiment, when the convergence angle is bound to exceed its limit value $\theta_{LM}$, the base distance Q between the image sensing optical systems 6701*b* and 6701*a* is changed to control the parallax, as shown in FIGS. 55 and 56.

The operation upon pressing the control button 7503 in the (+) direction will be described below with the aid of FIG. 53. FIG. 55 shows the operation state of the image sensing optical systems 6701*b* and 6701*a* when the control button 7503 is pressed in the (+) direction.

When the control button 7503 is pressed in the (+) direction, the current convergence angle of each of the image sensing optical systems 6701*b* and 6701*a* is measured and is compared with the predetermined limit value $\theta_{LM}$ ($\theta \leq \theta_{LM}$) in step S2601. If $\theta \leq \theta_{LM}$ holds, i.e., if the current convergence angle is equal to or smaller than $\theta_{LM}$, the image sensing optical systems 6701*b* and 6701*a* are moved to increase their convergence angle in step S2602.

FIG. 55 shows the state wherein the two image sensing optical systems 6701*b* and 6701*a* with a convergence angle not more than the limit value $\theta_{LM}$ have moved from the solid line positions to the broken line positions by increasing their convergence angle.

In this case, while the control button 7503 is pressed in the (+) direction, it is checked in step S2603 if the convergence angle θ at that time of each of the image sensing optical systems 6701*b* and 6701*a* is equal to or smaller than the limit value $\theta_{LM}$. Furthermore, when the control button 7503 is kept pressed in the (+) direction and the convergence angle θ has reached its limit value $\theta_{LM}$, the image sensing optical systems 6701*b* and 6701*a*, in turn, are parallelly displaced in a direction to decrease the distance therebetween in step S2604, as shown in FIG. 55. Initially, the current convergence angle θ of each of the image sensing optical systems 6701*b* and 6701*a* is compared with the predetermined limit value $\theta_{LM}$ in step S2601. In this case, if not $\theta \leq \theta_{LM}$ but $\theta \geq \theta_{LM}$ holds, the flow skips steps S2602 and S2063 and directly executes the processing in step S2604.

While the control button 7503 is held down, the distance between the two image sensing optical systems 6701*b* and 6701*a* gradually decreases, and it is checked in step S2605 if the distance between the two image sensing optical systems 6701*b* and 6701*a* has become zero, i.e., the two image sensing optical systems 6701*b* and 6701*a* contact at an origin $O_1$ in FIG. 55. If NO in step S2605, the flow returns to step S2604; otherwise, the movement of the image sensing optical systems 6701*b* and 6701*a* in the (+) direction ends. FIG. 55 illustrates the state wherein the image sensing optical systems 6701*b* and 6701*a* with the limit convergence angle $\theta_{LM}$ and located at the broken line positions have been parallelly displaced to the double-dashed chain line positions.

In this manner, when the control button 7503 is pressed in the (+) direction, the convergence angle of each of the image sensing optical systems 6701*b* and 6701*a* is increased up to its limit value $\theta_{LM}$, and when the convergence angle has reached its limit value $\theta_{LM}$, the image sensing optical systems 6701*b* and 6701*a* are controlled to be parallelly displaced in a direction to gradually decrease the distance therebetween. Note that the above-mentioned operation is an example, and the optical systems may be parallelly displaced before their convergence angle reaches the limit value $\theta_{LM}$.

The operation upon pressing the control button 7503 in the (−) direction will be described below with the aid of FIG. 54.

FIG. 56 shows the operation state of the image sensing optical systems 6701*b* and 6701*a* when the control button 7503 is pressed in the (−) direction.

When the control button 7503 is pressed in the (−) direction, the current convergence angle θ of each of the image sensing optical systems 6701*b* and 6701*a* is measured and it is checked if the measured convergence angle θ is zero (θ≠0). If θ≠0, the image sensing optical systems 6701*b* and 6701*a* are moved to decrease their convergence angles θ in step S2702.

FIG. 56 depicts the state wherein the image sensing optical systems 6701b and 6701a with convergence angles have moved from the broken line positions to the solid line positions by decreasing their convergence angles.

In step S2703, whether or not the convergence angle θ is zero is checked until the angle θ reaches zero. If the control button 7503 is held down in the (−) direction and the convergence angle θ has reached zero, the two image sensing optical systems 6701b and 6701a, in turn, are parallelly displaced in a direction to increase the distance therebetween in step S2704. Initially, if it is determined in step S2701 that the current convergence angle θ of each of the image sensing optical systems 6701b and 6701a satisfies not θ≠0 but θ=0, the flow skips steps S2702 and S2703 and directly executes the processing in step S2704.

It is then checked in step S2705 if the image sensing optical systems 6701b and 6701a have reached (contacted) a point D as the limit point of parallel-displacement. If NO in step S2705, the flow returns to step S2704; otherwise, the movement of the image sensing optical systems 6701b and 6701a in the (−) direction ends. FIG. 56 illustrates the state wherein the image sensing optical systems 6701b and 6701a located at the broken line positions corresponding to the convergence angle=0 have been parallelly displaced to the double-dashed chain line positions.

In this manner, when the control button 7503 is pressed in the (−) direction, the convergence angle of each of the image sensing optical systems 6701b and 6701a decreases until it reaches zero, and when the convergence angle has reached zero, the image sensing optical systems 6701b and 6701a are parallelly displaced in the direction to increase the distance therebetween. Note that this operation is an example, and the image sensing optical systems 6701b and 6701a may be controlled to be parallelly displaced before the convergence angle reaches zero.

As described above, the user can control the image sensing optical systems 6701b and 6701a using the control button 7503 to assign a convergence angle to the optical systems up to the limit value $θ_{LM}$ and to parallelly displace the optical systems when the convergence angle has reached the limit value $θ_{LM}$. In this manner, the user can freely adjust an image for stereoscopic view with different parallax to his or her taste.

The operation method of the image sensing optical systems 6701b and 6701a in this embodiment is an example, and the convergence angle control and parallel-displacement control can be arbitrarily selected within the range of the predetermined limit value $θ_{LM}$ of the convergence angle to adjust the positions of the image sensing optical systems 6701b and 6701a and to implement the parallax control of the principal object 6904.

In the 15th to 17th embodiments described above, the automatic parallax control in two, right and left images has been described. In this embodiment, the control of the base distance Q between the image sensing optical systems 6701b and 6701a in FIG. 47 has been described. The same applies to the parallel-displacement control of the CCDs 6703b and 6703a. As an example of the control of the image sensing optical systems 6701b and 6701a, the control method using the control button 7503 has been exemplified. Alternatively, any other devices may be used as long as they serve as user interfaces that can control the convergence angle and parallel-displacement amount.

<Store Application Program>

A storage medium of an application program used in the binocular image sensing apparatus of the present invention will be explained below with reference to FIGS. 57 to 59.

Figure 57:
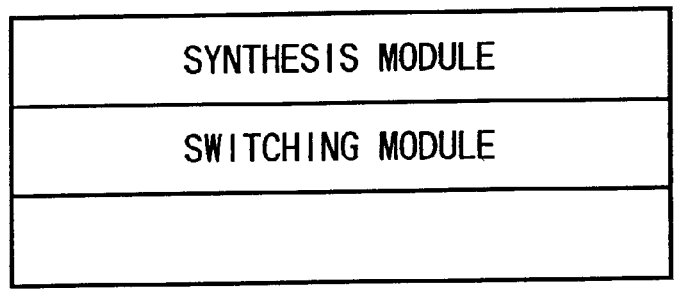
FIG. 57 shows program code modules stored in a storage medium used in a multi-eye image sensing apparatus of the present invention.

A storage medium that stores a program for controlling a binocular image sensing apparatus for sensing a pair of images having parallax using two image sensing optical systems can store program codes of at least a "synthesis module" and "switching module", as shown in FIG. 57.

The "synthesis module" is a program module which has a plurality of synthesis methods for generating a single synthesized image from two, right and left images sensed by two, right and left image sensing optical systems. The "switching module" is a program module for switching the plurality of synthesis methods.

The first method of the plurality of synthesis methods is synthesis method 1 for synthesizing images while giving priority to the synthesis speed, and the second method of the plurality of synthesis methods is synthesis method 2 for synthesizing images while giving priority to the image quality of the synthesized image. In synthesis method 1, two, right and left sensed images are synthesized by giving a predetermined overlapping amount. In synthesis method 2, two, right and left sensed images are subjected to corrections of, e.g., right-and-left differences of luminance levels and color information, and trapezoidal distortions, the overlapping region between the two, right and left images is detected, and the images are synthesized using the overlapping amount calculated based on the detected overlapping region. Furthermore, the "switching module" selects synthesis method 1 in the through display mode, and selects synthesis method 2 in the recording and reproduction modes.

Figure 58:
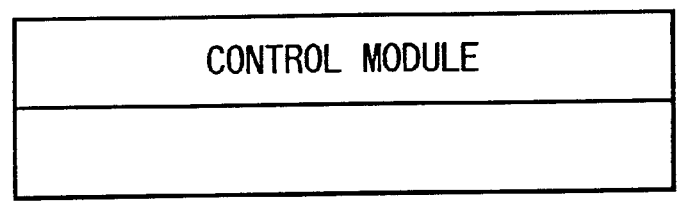
FIG. 58 shows a program code module stored in a storage medium used in a multi-eye image sensing apparatus of the present invention and different from FIG. 57.

Another storage medium that stores a program for controlling the above-mentioned binocular image sensing apparatus can store a program code of at least a "control module", as shown in FIG. 58.

The "control module" is a program module for controlling to adjust the parallax of the principal object selected from the sensed image. The "control module" sets the limit value of the convergence angle of each image sensing optical system. When the convergence angle has reached the limit value, the "control module" parallelly displaces the image to be displayed to adjust the parallax of the principal object in that image. The parallel-displacement indicates that of the image sensing optical systems, and when the convergence angle of the image sensing optical system has reached the limit value, the "control module" shortens the base distance of the image sensing optical systems to adjust the parallax of the principal object in the image. Also, the parallel-displacement indicates that of image sensing devices in the image sensing optical systems, and when the convergence angle of the image sensing optical system has reached the limit value, the "control module" parallelly displaces the image sensing devices in the image sensing optical systems to be separate from the centers of the two image sensing optical systems to sense images, thereby adjusting the parallax of the principal object in the image. Furthermore, the parallel-displacement indicates that of right and left sensed images, and when the convergence angle of the image sensing optical system has reached the limit value, the "control module" parallelly displaces the right and left sensed images to generate an image for stereoscopic view, thereby adjusting the parallax of the principal object in the image.

Figure 59:
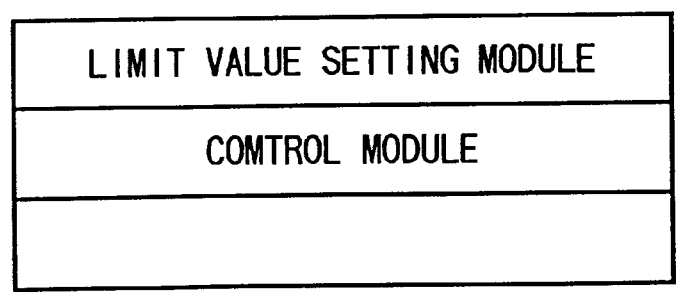
FIG. 59 shows program code modules stored in a storage medium used in a multi-eye image sensing apparatus of the present invention and different from FIGS. 57 and 58.

Furthermore, still another storage medium that stores a program for controlling the above-mentioned binocular image sensing apparatus can store program codes of a "limit value setting module" and "control module", as shown in FIG. 59.

The "limit value setting module" is a program module for setting the limit value of the convergence angle of each image sensing optical system. The "control module" is a program module for controlling the image sensing optical systems by controlling the convergence angle or parallel-displacement amount when the convergence angle is equal to or smaller than the limit value set by the "limit value setting module", and controlling the image sensing optical systems by controlling the parallel-displacement amount when the convergence angle has reached the limit value.

<Other Modification>

The invention that is disclosed in the binocular imaging systems according to the various embodiments above also can be applied a multi-eye camera, especially when a panoramic operation is performed.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
   an image sensing means for sensing a plurality of images for forming a three-dimensional image and outputting a plurality of image signals representing the images having a predetermined three-dimensional data format;
   an input means for inputting a three-dimensional image signal having a predetermined three-dimensional data format different from the predetermined three-dimensional data format of said plurality of image signals outputted by said image sensing means, from an external device;
   a selecting means for selectively outputting said plurality of image signals outputted from said image sensing means and said three-dimensional image signal;
   a display means for displaying the selected output of said selecting means; and
   a converting means for converting the selected output of said selecting means to a display format conforming to a characteristic of said display means.

2. The apparatus according to claim 1, wherein the three-dimensional image signal includes right and left two-dimensional image data.

3. The apparatus according to claim 1, wherein the three-dimensional image signal is descriptive data for generating a three-dimensional image.

4. The apparatus according to claim 1, wherein at least one of said image sensing means comprises an adapter device for inputting said three-dimensional image signal.

5. The apparatus according to claim 1, further comprising output means for outputting said plurality of image signals input from said image sensing means, and a synchronization signal synchronized with each of said plurality of image signals.

6. An image sensing method comprising:
   a step of selecting one of a plurality of image synthesis methods different from each other in quality of synthesized image; and
   a step of synthesizing two, right and left images sensed by an image sensing optical system to a single synthesized image in accordance with the selected image synthesis method,
   wherein the plurality of image synthesis methods include at least a first synthesis method for synthesizing images while giving priority to a synthesis speed.

7. The method according to claim 6, wherein the plurality of image synthesis methods further include a second synthesis method for synthesizing images while giving priority to image quality of the synthesized image.

8. The method according to claim 7, wherein the first synthesis method synthesizes the two, right and left sensed images by giving a predetermined overlapping amount, and
   the second synthesis method corrects right-and-left differences of luminance levels and color information, and trapezoidal distortions of the two, right and left sensed images, detects an overlapping region between the two images, and synthesizes the two images using an overlapping amount calculated based on the overlapping region.

9. The method according to claim 6, wherein the selection step includes the step of selecting the first synthesis method in a through display mode and selecting the second synthesis method in recording and reproduction modes.

10. The method according to claim 6, wherein the synthesized image is a panoramic synthesized image.

11. The method according to claim 6, wherein the synthesized image is an image for stereoscopic view.

12. The method of claim 6, wherein the plurality of image synthesis methods are also different from each other in image overlap determination.

13. An image sensing apparatus comprising:
   a synthesis means having a plurality of synthesis methods for generating a single synthesized image from two, right and left images sensed by an optical system, the plurality of synthesis methods being different from each other in quality of synthesized image; and,
   a switching means for switching the plurality of synthesis methods,
   wherein the plurality of image synthesis methods include at least a first synthesis method for synthesizing the images while giving priority to a synthesis speed.

14. The method according to claim 13, wherein the plurality of synthesis methods further include a second synthesis method for synthesizing images while giving priority to image quality of the synthesized image.

15. The apparatus according to claim 14, wherein the first synthesis method synthesizes the two, right and left sensed images by giving a predetermined overlapping amount, and
   the second synthesis method corrects right-and-left differences of luminance levels and color information, and trapezoidal distortions of the two, right and left sensed images, detects an overlapping region between the two images, and synthesizes the two images using an overlapping amount calculated based on the overlapping region.

16. The apparatus according to claim 13, wherein said switching means selects the first synthesis method in a through display mode, and selects the second synthesis method in recording and reproduction modes.

17. The apparatus according to claim 13, wherein the synthesized image is a panoramic synthesized image.

18. The apparatus according to claim 13, wherein the synthesized image is an image for stereoscopic view.

19. The image sensing apparatus of claim 13, wherein the plurality of synthesis methods are also different from each other in image overlap determination.

20. A storage medium that stores a program which is executed by a computer and controls an image sensing apparatus, comprising:
   a synthesis program code means for describing a plurality of different synthesis methods for generating a single synthesized image from two, right and left images sensed by an optical system, the plurality of synthesis methods being different from each other in quality of synthesized image; and, a switching program code means for switching the plurality of synthesis methods, wherein the plurality of image synthesis methods include at least a first synthesis method for synthesizing the images while giving priority to a synthesis speed.

21. The medium according to claim 20, wherein the plurality of synthesis methods further include a second synthesis method for synthesizing images while giving priority to the quality of synthesized image.

22. The medium according to claim 21, wherein the first synthesis method synthesizes the two, right and left sensed images by giving a predetermined overlapping amount, and the second synthesis method corrects right-and-left differences of luminance levels and color information, and trapezoidal distortions of the two, right and left sensed images, detects an overlapping region between the two images, and synthesizes the two images using an overlapping amount calculated based on the overlapping region.

23. The medium according to claim 20, wherein said switching program code means selects a program of the first synthesis method in a through display mode and selects a program of the second synthesis method in recording and reproduction modes.

24. The medium according to claim 20, wherein the synthesized image is a panoramic synthesized image.

25. The medium according to claim 20, wherein the synthesized image is an image for stereoscopic view.

26. The storage medium of claim 20, wherein the synthesis methods are also different from each other in image overlap determination.

27. An image sensing method, comprising:

a step of selecting one of a plurality of image synthesis methods different from each other in quality of synthesized image; and a step of synthesizing two, right and left images sensed by two, right and left image sensing optical systems to a single synthesized image in accordance with the selected image synthesis method;

wherein the plurality of image synthesis methods are different from each other in image overlap determination.

28. An image sensing apparatus, comprising:

synthesis means having a plurality of synthesis methods for generating a single synthesized image from two, right and left images sensed by two, right and left image sensing optical systems, the plurality of synthesis methods being different from each other in quality of synthesized image; and switching means for switching the plurality of synthesis methods;

wherein the plurality of image synthesis methods are different from each other in image overlap determination.

29. A storage medium that stores a program which is executed by a computer and controls an image sensing apparatus, comprising:

synthesis program code means for describing a plurality of different synthesis methods for generating a single synthesized image from two, right and left images sensed by two, right and left image sensing optical systems, the plurality of synthesis methods being different from each other in quality of synthesized image; and switching program code means for switching the plurality of synthesis methods;

wherein the plurality of image synthesis methods are different from each other in image overlap determination.

* * * * *